US00RE44885E

(19) United States
(12) Reissued Patent
James et al.

(10) Patent Number: US RE44,885 E
(45) Date of Reissued Patent: May 13, 2014

(54) THREAD CONTROL IN MULTI-NEEDLE CHAIN STITCH QUILTING

(75) Inventors: Michael A. James, Davie, FL (US); Jeff Kaetterhenry, Algonquin, IL (US)

(73) Assignee: L&P Property Management Company, South Gate, CA (US)

(21) Appl. No.: 13/475,412

(22) Filed: May 18, 2012

Related U.S. Patent Documents

Reissue of:
(64) Patent No.: 8,061,288
Issued: Nov. 22, 2011
Appl. No.: 12/371,738
Filed: Feb. 16, 2009

U.S. Applications:
(63) Continuation of application No. 13/830,220, filed on Mar. 14, 2013, which is a continuation of application No. 11/744,561, filed on May 4, 2007, now Pat. No. 7,770,530, which is a continuation-in-part of application No. 11/744,389, filed on May 4, 2007, now Pat. No. 7,789,028, which is a continuation of application No. PCT/US2006/035233, filed on Sep. 8, 2006, and a continuation-in-part of application No. 11/040,499, filed on Jan. 21, 2005, now Pat. No. 7,143,705, which is a continuation-in-part of application No. 10/804,833, filed on Mar. 19, 2004, now Pat. No. 7,073,453, which is a continuation-in-part of application No. PCT/US03/07083, filed on Mar. 6, 2003.

(60) Provisional application No. 60/763,172, filed on Jan. 27, 2006, provisional application No. 60/762,471, filed on Jan. 26, 2006, provisional application No. 60/715,423, filed on Sep. 9, 2005, provisional application No. 60/362,179, filed on Mar. 6, 2002, provisional application No. 60/446,417, filed on Feb. 11, 2003, provisional application No. 60/446,430, filed on Feb. 11, 2003, provisional application No. 60/446,419, filed on Feb. 11, 2003, provisional application No. 60/447,773, filed on Feb. 14, 2003, provisional application No. 60/446,426, filed on Feb. 11, 2003, provisional application No. 60/446,529, filed on Feb. 11, 2003.

(51) Int. Cl.
*D05B 11/00* (2006.01)
*D05B 65/00* (2006.01)

(52) U.S. Cl.
USPC ..... 112/475.08; 112/117; 112/197; 112/286

(58) Field of Classification Search
USPC ..... 112/117, 163–167, 199–202, 285–298, 112/475.01–475.08, 475.17
See application file for complete search history.

(56) References Cited

U.S. PATENT DOCUMENTS 2,649,065 A 8/1953 Casper
3,183,866 A 5/1965 Walbert et al.

(Continued)

OTHER PUBLICATIONS

U.S. Patent and Trademark Office, Search Report and Written Opinion, from corresponding PCT/US06/35233, dated Jul. 25, 2008.

*Primary Examiner* — Ismael Izaguirre
(74) *Attorney, Agent, or Firm* — Wood, Herron & Evans, LLP

(57) ABSTRACT

A multi-needle chain-stitch quilting machine and method of operation thereof are provided that imparts relative motion between the needles and the material that is controlled so as to pull needle thread tails from the needle side of the quilted material. The feature of controlling thread tails may be optional to provide selection of either a high speed mode of operation without thread tail control or a quality mode of operation with reduction or removal of needle thread tails from the face of the quilted material. Thread trimmers may be included at each needle location on the looper side of the material to cut both needle and looper threads.

42 Claims, 57 Drawing Sheets

(56) References Cited

U.S. PATENT DOCUMENTS

| | | | | | |
|---|---|---|---|---|---|
| 3,749,041 | A | * | 7/1973 | Bowin | 112/295 |
| 3,935,827 | A | * | 2/1976 | Winter | 112/292 |
| 4,006,696 | A | | 2/1977 | Robertson | |
| 4,352,333 | A | * | 10/1982 | Yamazawa | 112/291 |
| 4,501,208 | A | | 2/1985 | Landoni | |
| 4,569,297 | A | | 2/1986 | Dusch | |
| 4,658,752 | A | * | 4/1987 | Keilmann et al. | 112/475.17 |
| 4,838,187 | A | | 6/1989 | Tatum | |
| 5,005,499 | A | | 4/1991 | Landoni et al. | |
| 5,154,130 | A | | 10/1992 | Gribetz et al. | |
| 5,269,238 | A | | 12/1993 | Landoni | |
| 5,289,791 | A | | 3/1994 | Sanders et al. | |
| 5,509,365 | A | | 4/1996 | Cash | |
| 5,603,270 | A | | 2/1997 | White et al. | |
| 5,676,077 | A | | 10/1997 | Landoni | |
| 5,782,193 | A | | 7/1998 | Schwarzberger et al. | |
| 5,784,990 | A | * | 7/1998 | Shimizu et al. | 112/470.05 |
| 5,873,315 | A | | 2/1999 | Codos | |
| 5,927,221 | A | | 7/1999 | Porter et al. | |
| 5,931,106 | A | * | 8/1999 | Papajewski et al. | 112/70 |
| 6,026,756 | A | | 2/2000 | Frazer et al. | |
| 6,065,412 | A | | 5/2000 | Schwarzberger et al. | |
| 6,178,903 | B1 | | 1/2001 | Bondanza et al. | |
| 6,223,666 | B1 | | 5/2001 | Resta | |
| 6,237,517 | B1 | | 5/2001 | Bondanza et al. | |
| 6,273,013 | B1 | | 8/2001 | Carey, Jr. | |
| 6,805,063 | B2 | * | 10/2004 | Enns et al. | 112/239 |
| 6,895,878 | B2 | | 5/2005 | Stutznacker | |
| 7,073,453 | B2 | | 7/2006 | Frazer et al. | |
| 7,143,705 | B2 | | 12/2006 | Frazer et al. | |
| 7,789,028 | B2 | | 9/2010 | James et al. | |
| 2004/0237864 | A1 | | 12/2004 | Frazer et al. | |
| 2005/0178307 | A1 | | 8/2005 | Frazer et al. | |
| 2007/0261620 | A1 | | 11/2007 | James et al. | |
| 2011/0203506 | A1 | | 8/2011 | Price et al. | |

* cited by examiner

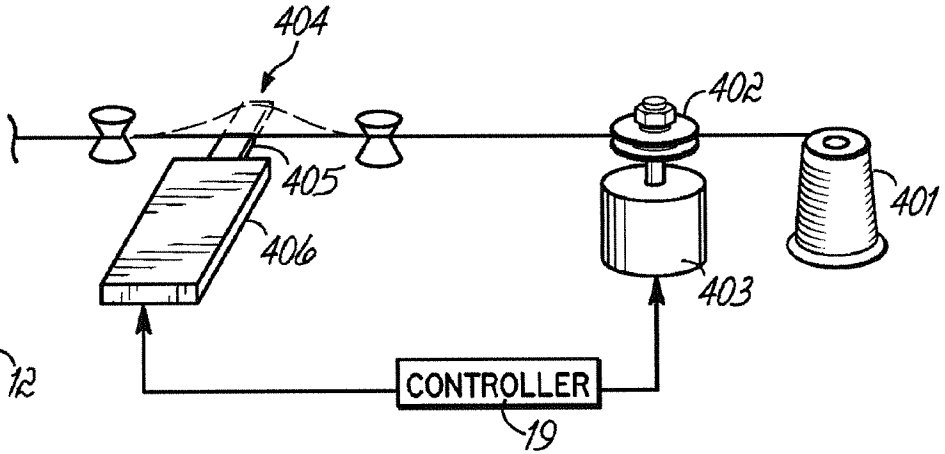
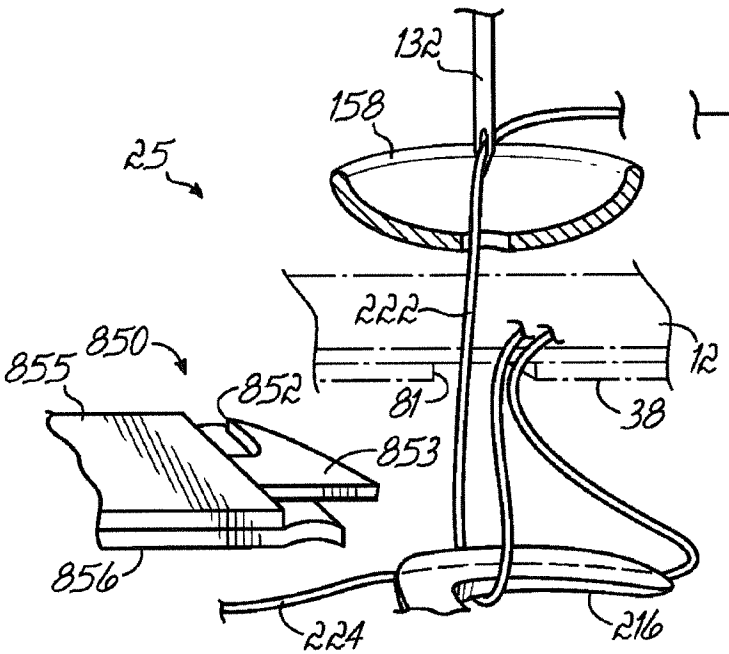
FIG. 5E

THREAD CONTROL IN MULTI-NEEDLE CHAIN STITCH QUILTING

Matter enclosed in heavy brackets [ ] appears in the original patent but forms no part of this reissue specification; matter printed in italics indicates the additions made by reissue.

*This is a parent of Continuation Reissue application Ser. No. 13/830,220 filed Mar. 14, 2013.*

This is *a Reissue Application of U.S. Pat. No. 8,061,288 (Ser. No. 12/371,738, filed Feb. 6, 2009), which is* a Continuation of U.S. patent application Ser. No. 11/744,561 filed May 4, 2007 now U.S. Pat. No. 7,770,530; which is a Continuation-in-Part of U.S. patent application Ser. No. 11/744,389 filed May 4, 2007 now U.S. Pat. No. 7,789,028; which is a Continuation of PCT application US2006/035233 filed Sep. 8, 2006; which claims the benefit of U.S. Provisional Application Ser. Nos. 60/715,423 filed Sep. 9, 2005; 60/762,471 filed Jan. 26, 2006; and 60/763,172 filed Jan. 27, 2006; all hereby expressly incorporated herein by reference and to all of which priority is claimed. PCT application US2006/035233 is also a Continuation-in-Part of U.S. patent application Ser. No. 11/040,499 filed Jan. 21, 2005, now U.S. Pat. No. 7,143,705; which is a Continuation-In-Part of U.S. patent application Ser. No. 10/804,833 filed Mar. 19, 2004, now U.S. Pat. No. 7,073,453; which is a Continuation-In-Part of PCT Application No. PCT/US03/07083 filed Mar. 6, 2003; which claims the benefit of U.S. Provisional Patent Applications: Ser. No. 60/446,417 filed Feb. 11, 2003; Ser. No. 60/446,430 filed Feb. 11, 2003; Ser. No. 60/446,419 filed Feb. 11, 2003; Ser. No. 60/446,426 filed Feb. 11, 2003; Ser. No. 60/446,529 filed Feb. 11, 2003; and Ser. No. 60/447,773 filed Feb. 14, 2003; all of which applications are hereby expressly incorporated herein by reference and to all of which priority is claimed.

This application is also related to PCT Application PCT/US2005/008312 filed Mar. 11, 2005; which claims the benefit of U.S. application Ser. Nos. 10/804,833 and 11/040,499 and is hereby also expressly incorporated by reference herein. PCT Application No. PCT/US03/07083 also claims the benefit of U.S. Provisional Patent Application Ser. No. 60/362,179 filed Mar. 6, 2002, which is also hereby expressly incorporated by reference herein.

FIELD OF THE INVENTION

This invention relates to quilting, and particularly relates to quilting with high-speed multi-needle quilting machines on wide webs of multi-layered material. More particularly, the invention relates to multi-needle quilting of products such as mattress covers and other quilted products on wide webs of multi-layered material.

BACKGROUND OF THE INVENTION

Quilting is a sewing process by which layers of textile material and other fabric are joined to produce compressible panels that are both decorative and functional. Stitch patterns are used to decorate the panels with sewn designs while the stitches themselves join the various layers of material that make up the quilts. The manufacture of mattress covers involves the application of large scale quilting processes. The large scale quilting processes usually use high-speed multi-needle quilting machines to form series of mattress cover panels along webs of the multiple-layered materials. These large scale quilting processes typically use chain-stitch sewing heads which produce resilient stitch chains that can be supplied by large spools of thread. Some such machines can be run at up to 1500 or more stitches per minute and drive one or more rows of needles each to simultaneously stitch patterns across webs that are ninety inches or more in width. Higher speeds, greater pattern flexibility and increased operating efficiency are constant goals for the quilting processes used in the bedding industry. Traditional multi-needle quilting machines, while fast and efficient, have been less useful in producing high-end-market mattress cover products and comforters, which are often made on the slower but more flexible single or dual needle quilting machines.

Conventional multi-needle quilting machines have three axes of motion. An X-axis can be considered as the longitudinal direction of motion of a web of the material as it moves through the quilting station. Frequently, such bi-directional motion is provided in which the web of material can move in either a forward or a reverse direction to facilitate sewing in any direction, such as is needed for the quilting of 360 degrees patterns on the material. Material accumulators usually accompany such bi-directional machines so that sections of a web can be reversed without changing the direction of the entire length of web material along the quilting line. A Y-axis of motion is also provided by moving the web from side to side, also for funning quilted patterns. Usually the quilting mechanism remains stationary in the quilting process and the motion of the material is controlled to affect the quilting of various patterns.

The X-axis and the Y-axis are parallel to the plane of the material being quilted, which traditionally is a horizontal plane. A third axis, a Z-axis, is perpendicular to the plane of the material and defines the nominal direction of motion of reciprocating needles that form the quilting stitches. The needles, typically on an upper sewing head above the plane of the material, cooperate with loopers on the opposite or lower side of the material, which reciprocate perpendicular to the Z-axis, typically in the X-axis direction. The upper portion of the sewing mechanism that includes the needle drive is, in a conventional multi-needle quilting machine, carried by a large stationary bridge. The lower portion of the sewing mechanism that includes the looper drives is attached to a cast iron table. There may be, for example, three rows of sewing elements attached to each respective upper and lower structure. All of the needles are commonly linked to and driven by a single main shaft.

Conventional multi-needle quilting machines use a single large presser foot plate that compresses the entire web section of material in the sewing area across the width of the web. On a typical machine that is used in the mattress industry, this presser foot plate might, during each stitch, compress an area of material that is over 800 square inches in size to a thickness of as little as ¼ inch. When the needles are withdrawn from the material following each stitch formation, the presser foot plate must still compress the material to about 7/16 inch. Since the material must, while still under the presser foot plate, move relative to the stitching elements to form the pattern, patterns are typically distorted by the drag forces exerted on it parallel to the plane of the material. These conventional machines are large and heavy, and occupy a substantial area on the floor of a bedding manufacturing plant.

Further, multi-needle quilting machines lack flexibility. Most provide a line or an array of fixed needles that operate simultaneously to sew the same pattern and identical series of stitches. Changing the pattern requires the physical setting, rearrangement or removal of needles and the threading of the altered arrangement of needles. Such reconfiguration takes operator time and substantial machine down-time.

Traditional chain stitch machines used for quilting reciprocate one or more needles through thick multi-layered material using a crank mechanism driven by a rotary shaft. The force of a drive motor, as well as inertia of the linkage, forces the needle through the material. The needle motion so produced is traditionally sinusoidal, that is, it is defined by a curve represented by the equation y=sine x. For purposes of this application, motion that does not satisfy that equation will be characterized as non-sinusoidal. Thus, the needle motion carries a needle tip from a raised position of for example, one inch above the material, downward through material compressed to approximately ¼ inch, to a point about ½ inch below the material where its motion reverses. The needle carries a needle thread through the material and presents a loop on the looper side of the material to be picked up by a looper thread. On the looper side of a material, a looper or hook is reciprocated about a shaft in a sinusoidal rotary motion. The looper is positioned relative to the needle such that its tip enters the needle thread loop presented by the needle to extend a loop of looper thread through the needle thread loop on the looper side of the material. The motion of the looper is synchronized with motion of the needle so that the needle thread loop is picked up by the looper thread when the needle is at the downward extent of its cycle. The needle then rises and withdraws from the material and leaves the needle thread extending around the looper and looper thread loop.

When the needle is withdrawn from the material, the material is shifted relative to the stitching elements and the needle again descends through the material at a distance equal to one stitch length from the previous point of needle penetration, forming one stitch. When again through the material, the needle inserts the next loop of needle thread through a loop formed in the looper thread that was previously poked by the looper through the previous needle thread loop. At this point in the cycle, the looper itself has already withdraw from the needle thread loop, in its sinusoidal reciprocating motion, leaving the looper thread loop extending around a stitch assisting element, known as a retainer in many machines, which holds the looper thread loop open for the next decent of a needle. In this process, needle thread loops are formed and passed through looper thread loops as looper thread loops are alternatively formed and passed through needle thread loops, thereby producing a chain of loops of alternating needle and looper thread along the looper side of the material, leaving a series of stitches formed only of the needle thread visible on the needle side of the material.

The traditional sinusoidal motion of the needle and looper in a chain stitch forming machine have, through years of experience, been adjusted to maintain reliable loop-taking by the thread so that stitches are not missed in the sewing process. In high speed quilting machines, the motion of the needle is such that the needle tip is present below the plane of the material, or a needle plate that supports the material, for approximately ⅓ of the cycle of the needle, or 120 degrees of the needle cycle.

During the portion of the needle cycle when the needle extends through the material, no motion of the material relative to the needle is preferred. Inertia of machine components and material causes some of the between-stitch motion of material relative to the needle to occur with the needle through the material. This results in needle deflection, which can cause missed stitches as the looper misses a needle thread loop or the needle misses a looper thread loop, or causes loss of pattern definition as material stretches and distorts. Further, limiting the time of needle penetration of the fabric defines the speed of the needle through the fabric, which determines the ability of the needle to penetrate thick multi-layered material. Increase of the needle speed then requires increasing the distance of needle travel, which causes excess needle thread slack below the fabric that must be pulled up to tighten the stitches during the formation of the stitches. Accordingly, the traditional needle motion has imposed limitations on chain stitch sewing and particularly on high speed quilting.

Further, looper heads on known multi-needle quilting machines provide the looper motion by moving cam followers over a cam surface, which requires lubrication and creates a wear component requiring maintenance.

Additionally, chain stitch forming elements used on multi-needle quilting machines typically each include a needle that reciprocates through the material from the facing side thereof and a looper or hook that oscillates in a path on the back side of the material through top-thread loops formed on the back side of the material by the penetrating needle. Chain stitching involves the forming of a cascading series or chain of alternating interlocking between a top thread and a bottom thread on the back side of the material by the interaction of the needle and looper on the backside of the material, which simultaneously forms a clean series of top-thread stitches on the top side of the material. The reliable forming of the series of stitches requires that the paths of the needle and looper of each stitching element set be accurately established, so that neither the needle nor the looper misses the take-up of the loop of the opposing thread. The missing of such a loop produces a missed stitch, which is a defect in the stitching pattern.

Initially, and periodically in the course of the use of a quilting machine, the relative positions of the needle and the looper must be adjusted. Typically, this involves the adjusting of the transverse adjustment of the position of the looper on its axis of oscillation. In multi-needle quilting machines, such an adjustment is made to bring the path of the looper in close proximity to the side of the needle just above the eye in the needle through which is passed the top thread. At this position, a loop of the needle thread is formed beside the needle through which the looper tip inserts a loop of the bottom thread. The formations of these loops and the interlocking chain of stitches is described in detail in U.S. Pat. No. 5,154,130, hereby expressly incorporated herein by reference.

Looper adjustment has been typically a manual process. The adjustment is made with the machine shut down by a technician using some sort of a hand tool to loosen, reposition, check and tighten the looper so that it passes close to or lightly against the needle when the needle is near the bottom-most point in the needle's path of travel on the bottom side of the material being quilted. The adjustment takes a certain amount of operator time. In a multi-needle quilting machine, the number of needles may be many, and the adjustment time may be large. It is not uncommon that the quilting line would be shut down for the major portion of an hour or more just for needle adjustment.

Furthermore, since the looper adjustment has been a manual process, difficulties of access to the adjusting elements, difficulties in determining the relative looper and needle positions, and difficulties in holding the adjusting elements in position while securing or locking the locking components of the assemblies has served as a source of adjustment error.

Chain stitch forming elements used on multi-needle quilting machines typically each include a needle that reciprocates through the material from the facing side thereof and a looper or hook that oscillates in a path on the back side of the material through top-thread loops formed on the back side of the material by the penetrating needle. Chain stitching involves the forming of a cascading series or chain of alternating interlocking between a top thread and a bottom thread on the back side of the material by the interaction of the needle and looper on the backside of the material, which simultaneously forms a clean series of top-thread stitches on the top side of the material. The top thread or needle thread penetrates the fabric from the top side or facing side of the fabric and forms loops on the bottom side or back side of the fabric. The bottom thread remains exclusively on the back side of the fabric where it forms a chain of alternating interlocking loops with the loops of the top thread.

High speed multi-needle quilting machines, such as those that are used in the manufacture of mattress covers, often sew patterns in disconnected series of pattern components. In such sewing, tack stitches are made and, at the end of the quilting of a pattern component, at least the top thread is cut. Then the fabric advances relative to the needles to the beginning of a new pattern component, where more tack stitches are made and sewing recommences. One such high speed multi-needle quilting machine is described in U.S. Pat. No. 5,154,130, referred to above. This patent particularly describes in detail one method of cutting thread in such multi-needle quilting machines. Accordingly, there is a need for more reliable and more efficient thread management in multi-needle quilting machines.

These characteristics and requirements of high-speed multi-needle quilting machines, and the deficiencies discussed above, impede the achievement of higher speeds and greater pattern flexibility in conventional quilting machines. Accordingly, there is a need to overcome these obstacles and to increase the operating efficiency of quilting processes, particularly for the high volume quilting used in the bedding industry.

Further, there is a constant need for easy ways to change materials supplied, usually in web form, to multi-needle quilting machines. With web supplies, this need includes the need for ways to splice the length of material to be fed from a new supply to the trailing edge of the web of material that has been fed to the machine. In many quilting machines, particularly in the machines set forth in the applications identified above where the web moves vertically upwardly through the quilting station, the material supply enters the machine from near the floor. This is particularly helpful in minimizing the resistance on the web that could cause distortion of the material when stretchable material is being quilted. Sometimes such stretchable materials are used as ticking in mattress covers, for example. When entering the machine from a position near the floor, it is often difficult to change materials and to splice a new supply of material to the web entering the machine. Accordingly, improvement in such material supplies is needed.

SUMMARY OF THE INVENTION

A primary objective of the present invention is to improve the efficiency and economy of quilt making, particularly in high-speed, large-scale quilting applications such as are found in the bedding industry. Particular objectives of the invention include increasing quilting speeds, reducing the size and cost of quilting equipment, and increasing the flexibility in quilt patterns produced over those of the prior art.

A further objective of the present invention is to provide flexibility in the arrangement of needles in a multi-needle quilting machine. An additional objective of the invention is to reduce machine down-time and operator time needed to change needle settings in multi-needle quilting machine operation.

A particular objective of the invention is to provide a quilting head that is adaptable to various configurations of a multi-needle quilting machine, and that can be used in a number of machines of various sizes, types and orientations, for example, in single or multi-needle machines, in machines having one or more rows of needles, machines having needles variously spaced, and machines having needles oriented vertically, horizontally or otherwise. Another particular objective of the invention is to provide sewing heads that can be operated differently in the same machine, such as to sew in different directions, to sew different patterns or to sew at different rates.

Another objective of the present invention is to improve reliability of sewing element adjustment in quilting machines. A more particular objective of the invention is to provide for looper adjustment that can be carried out quickly and positively by a quilting machine operator. A further objective of the invention is to provide a reliable indication of when the looper of a chain stitch sewing head of a quilting machine is in or out of proper adjustment.

A further objective of the present invention is to provide for the cutting of thread in a multi-needle quilting machine. A more particular objective of the invention is to provide for thread cutting in a multi-needle quilting machine that has separately operable or separately movable, replaceable or reconfigurable heads. Another objective of the invention is to provide for more reliable monitoring and/or control of thread tension in a quilting machine, particularly a multi-needle quilting machine. A more particular objective of the invention is the automatic maintenance and adjustment of thread tension in such quilting machines.

According to principles of the present invention, a multi-needle quilting machine is provided in which the needles reciprocate in other than a vertical direction as used by multi-needle quilting machines of the prior art. The quilting machine of the present invention provides several axes of motion that differ from those of conventional multi-needle quilting machines. In the illustrated embodiments of the invention, the substrate is supported in a vertical plane while the needles reciprocate in a horizontal direction. While support of the substrate in a vertical plane with needles oriented horizontally is preferred and has important advantages, other non-horizontal substrate orientations (i.e., having a significant vertical component to the plane orientation and referred to herein as generally vertical) and non-vertical needle orientations (i.e., having a significant horizontal component to the needle orientation and referred to herein as generally horizontal) are compatible with many of the features of the invention, while some features of the invention can provide advantages with any substrate or needle orientation.

One preferred embodiment of a quilting machine, according to certain principles of the present invention, provides two or more bridges that are capable of separate or independent control. Each bridge may be provided with a row of sewing needles. The needles may be driven together, each separately or independently, or in various combinations.

In accordance with the illustrated embodiment of the invention, seven axes of motion are provided. These include an X0-axis that is unidirectional, which provides for feed of the material in only one downstream direction. In another embodiment, bidirectional X-axis motion is provided. This X-axis motion is brought about by the rotation of feed rolls that advance the material in web form through a quilting station.

Further in accordance with the illustrated embodiment, independently movable bridges that carry the needle and looper stitching mechanisms are provided with two axes of motion, X1, Y1 and X2, Y2, respectively. The Y-axis motion moves the respective bridge side-to-side, parallel to the web and transverse to its extent and direction of motion, while the X-axis motion moves the bridge up and down parallel to the web and parallel to its direction of motion. In the alternative embodiment, where bi-directional motion of the web is provided, the X-axis motion of the bridge is not necessarily provided. The X, Y motions of the bridges are brought about by separately controlled X and Y drives for each of the bridges. Preferably, the Y-axis motion of the bridges has a range of about 18 inches, 9 inches in each direction on each side of a center position, and the X-axis motion of the bridges has a range of 36 inches relative to the motion of the web, whether the web or the bridges move in the X direction.

According to certain principles of the present invention, a quilting machine is provided with one or more quilting heads that can operate with a needle in a horizontal or vertical orientation. According to other aspects of the invention, a self-contained sewing head is provided that can be operated alone or in combination with one or more other such sewing heads, either in synchronism in the same motion or independently to sew the same or a different pattern, in the same or in a different direction, or at the same or at a different speed or stitch rate.

One preferred embodiment of a quilting machine according to certain principles of the present invention, provides sewing heads that can be ganged together on a stationary platform or a movable bridge, and can be so arranged with one or more other sewing heads that are ganged together in a separate and independent group on another platform or bridge, to operate in combination with other heads or independently and separately controlled.

In the illustrated embodiment of the invention, the bridges are separately and independently supported and moved, and several separately and independently operable sewing heads are supported on each bridge. The bridges each are capable of being controlled and moved, separately and independently, both transversely and longitudinally relative to the plane of the material being quilted. The bridges are mounted on common leg supports that are spaced around the path of the material to be quilted, which extends vertically, with the bridges guided by a common linear-bearing slide system incorporated into each leg support. Each leg also carries a plurality of counterweights, one for each bridge. Each bridge is independently driven vertically and horizontally-transversely by different independently controllable servo motors. Motors for each bridge produce the bridge vertical and horizontal movements.

Further, according to certain aspects of the present invention, each bridge has an independently controllable drive for reciprocating the sewing elements, the needles and loopers. The drive is most practically a rotary input, as from a rotary shaft, that operates the reciprocating linkages of the elements. The independent operation of the drives on each of the bridges allows for independent sewing operation of the sewing heads or groups of sewing heads, or the idling of one or more heads while one or more others are sewing. The heads each have elements that respond to controls from a controller, preferably in response to digital signals delivered to all the heads on a common bus, with each controllable element provided with a decoding circuit that selects the signals from the bus that are intended for the respective element.

In an illustrated embodiment of the invention, each sewing head, including each needle head and each looper head, is linked to a common rotary drive through an independently controllable clutch that can be operated by a machine controller to turn the heads on or off, thereby providing pattern flexibility. Further, the heads may be configured in sewing element pairs, each needle head with a corresponding similarly modular looper head. While the heads of each pair can be individually turned on or off, they are typically turned on and off together, either simultaneously or at different phases in their cycles, as may be most desirable. Alternatively, only the needle heads may be provided with selective drive linkages, while the looper heads may be linked to the output of a needle drive motor so as to run continuously. This linkage may be direct and permanent, or may be adjustable, switchable or capable of being phased in relation to the needle drive, such as by providing a differential drive mechanism in the looper drive train. When direct drive is employed, the looper head drive is linked to an input drive shaft through a gear box, rather than a clutch. Each of the looper heads is further provided with an alignment disk on the looper drive shaft to allow precise phase setting of each looper head relative to the other looper heads or the needle drive when the looper head is installed in the machine. Further, each looper head housing is provided with adjustments in two dimensions in a plane perpendicular to the needle to facilitate alignment of the looper head with a corresponding needle head upon looper head installation.

Further in accordance with other principles of the invention, a plurality of presser feet are provided, each for one needle on each needle head. This allows for a reduction in the total amount of material that needs to be compressed, reducing the power and the forces needed to operate the quilter. Each of the needles, as well as the corresponding loopers, may be separately movable and controllable, or moved and controlled in combinations of fewer than all of those on a bridge, and can be selectively enabled and disabled. Enabling and disabling of the needles and loopers is provided and preferably achieved by computer controlled actuators, such as electric, pneumatic, magnetic or other types of actuators or motors or shiftable linkages.

The need for less overall pressure and force by the sewing elements and by the presser foot plates allows for lighter weight construction of the quilting machine and for a smaller machine having a smaller footprint in the bedding plant. Further, the use of individual presser feet avoids much of the pattern distortion caused by the presser arrangements of the past. These advantages are further enhanced by wider spacing between the needle plate on the looper side of the fabric and the raised presser feet on the needle side of the fabric. This spacing can be up to several inches.

According to further principles of the present invention, the needle in a chain stitch forming machine may be driven in motion that differs from a traditional sinusoidal motion. In an illustrated embodiment of the invention, a needle of a chain stitch forming head, or each needle of a plurality of chain stitch forming heads, is driven so as to remain in a raised position for a greater portion of its cycle and to penetrate the material during a smaller portion of its cycle than would be the case with a traditional sinusoidal needle motion. Also in accordance with this illustrated embodiment of the invention, the needle is driven so that it moves downwardly through the material at a faster speed than it moves as it withdraws from the material. In alternative embodiments of the invention, a sinusoidal motion is provided.

In one embodiment of asymmetric, non-sinusoidal needle motion, the needle descends through the material to a depth approximately the same as that presented by sinusoidal motion, but moves faster and thus arrives at its lowest point of travel in a smaller portion of its cycle than with traditional sinusoidal motion. Nonetheless, the needle rises from its lowest point of travel more slowly than it descends, being present below the material for at least as long or longer than with the traditional sinusoidal motion, to allow sufficient time for pickup of the needle thread loop by the looper. As a result, more material penetrating force is developed by the needle than with the prior art and less needle deflection and material distortion is produced than with the prior art, due primarily to the extension of the needle through the material for less time.

One embodiment of a quilting machine according to certain principles of the present invention, provides a mechanical linkage in which an articulated lever or drive causes the needle motion to depart from a sinusoidal curve. A cam and cam follower arrangement may also provide a curve that departs from a sinusoidal curve. Similar linkage may also drive a presser foot.

Mechanical and electrical embodiments of the invention can be adapted to produce needle motion according to the present invention. In one embodiment of the invention, the stitching elements, particularly the needle, of each needle pair is driven by a servo motor, preferably a linear servo motor, with the motion of the needle controlled to precisely follow a preferred curve. In one preferred embodiment of a non-sinusoidal motion, the curve carries the needle tip slightly upward beyond the traditional 0 degree top position in its cycle and maintains it above the traditional curve, descending more rapidly than is traditionally the case until the bottommost position of the needle tip, or the 180 degree position of the needle drive, is reached. Then the needle rises to its 0 degree position either along or slightly below the traditional position of the needle.

A quilting machine having a servo-controlled quilting head suitable for implementing this motion is described in U.S. patent application Ser. No. 09/686,041, hereby expressly incorporated by reference herein. With such an apparatus, the quilting head servo is controlled by a programmed controller to execute a sewing motion. With the present invention, the controller is programmed to operate the sewing head to drive the needle in a motion as described herein. In an alternative embodiment, the needle head of a quilting machine is provided with mechanical linkage that is configured to impart non-sinusoidal motion to the needle as described above. A mechanism for imparting this motion may be formed with asymmetrically weighted linkages and components that have a mass distribution that will offset the asymmetrical forces generated by the asymmetrical motion, minimizing the inducement of vibration from irregular acceleration resulting from the non-harmonic, non-sinusoidal motion that differs from the traditional harmonic sine function. In some embodiments, the sewing heads themselves are provided with housing structures which, when the heads are mounted on the bridges, serve to reinforce, strengthen and stiffen the bridges, to minimize vibration.

In addition, in accordance with the principles of the present invention, the looper heads convert an input rotary motion into two independent motions without requiring cam followers sliding over cams. Therefore, the looper heads are high speed, balanced mechanisms that have a minimum number of parts and do not require lubrication, thereby minimizing maintenance requirements. Similarly, the needle heads are constructed so as to require no lubrication.

According to other principles of the present invention, a looper adjustment feature is provided for adjusting the looper-needle relationship in a chain-stitch quilting machine, and particularly for use on a multi-needle quilting machine. The adjustment feature includes a readily accessible looper holder having an adjustment element by which the tip of the looper can be moved toward and away from the needle. In one embodiment, a single bi-directionally adjustable screw or other element moves the looper tip in either direction. A separate locking element is also preferably provided. For adjusting the looper, the controller advances the stitching elements to a loop-take-time adjustment position where they stop and enter a safely lock mode, for adjustment of the loopers. Then, when adjustment is completed, the controller reverses the stitching elements so that no stitch is formed in the material.

According to another aspect of the invention, a needle-looper proximity sensor is provided that is coupled to an indicator, which signals, to an operator adjusting the looper, the position of the looper relative to the needle of a stitching element set. Preferably, a color coded light illuminates to indicate the position of the looper relative to the needle, with one indication when the setting is correct and one or more other indications when the setting is incorrect. The incorrect indication may include one color coded illumination when the looper is either too close or too far from the needle, with another indication when the looper is too far in the other direction.

In an illustrated embodiment of the invention, a looper holder is provided with an accessible adjustment mechanism by which an operator can adjust the transverse position of a looper relative to a needle in either direction with a single adjustment motion. The mechanism includes a looper holder in which a looper element is mounted to pivot so as to carry the tip of the looper transversely relative to the needle of the stitching mechanism. Adjustment of the looper tip position is changed by turning a single adjustment screw one way or the other to move the looper tip right or left relative to the needle. The looper is spring biased in its holder against the tip of the adjustment screw so that, as the screw is turned one way, the spring yields to the force of the screw and, as the screw is turned the other way, the spring rotates the looper toward the screw. The adjustment screw and spring hold the looper in its adjusted position and a lock screw, which is provided on the holder, can be tightened to hold the looper in its adjusted position.

According to other features of the invention, a sensor is provided to signal the position of the looper tip relative to the needle, which may be in the form of an electrical circuit that detects contact between the looper and needle. Indicator lights may be provided, for example, to tell the operator who is making a looper adjustment when the needle is in contact with the needle, so that the contact make/brake point can be accurately considered in the adjustment. The sensor may alternatively be some other looper and/or needle position monitoring device.

According to principles of the present invention, a multiple needle quilting machine is provided with individual thread cutting devices at each needle position. The thread cutting devices are preferably located on each of the looper heads of a multi-needle chain stitch quilting machine, and each of the devices are separately operable. In the preferred embodiment, each looper head of a multi-needle quilting machine is provided with a thread cutting device with a movable blade or blade set that cuts at least the top thread upon a command from a machine controller. The device also preferably cuts the bottom thread, and when doing so, also preferably holds the bottom or looper thread until the stitching resumes, usually at a new location on the fabric being quilted. Where the quilting machine has separately actuatable or separately controllable sewing heads, or heads that can be individually mounted or removed, the looper component of each such head is provided with a separately controllable thread cutting device.

In order to reduce the likelihood of missed stitches, active or passive looper thread tail guides can be used to manipulate or otherwise guide the looper thread tail below the needle plate upon startup. In certain embodiments, a looper thread deflector is provided to guide the looper thread so the needle does not miss the looper thread triangle. In addition, particularly at startup of a pattern following the cutting of the looper thread, a split-start control method is provided as an alternative feature for avoiding missed stitches at startup. The split start feature is one use of the feature that allows the needle and looper drives to be decoupled and moved separately. With the split start feature, the initial motion of the needle and looper proceeding separately upon startup so as to render the pickup of the stitches predictable. This is achieved by insuring that the looper picks up the top-thread loop before the needle picks up the bottom thread loop triangle, which is a method that can be provided with alternatives to the split start, such as looper thread manipulation. This is assisted by a pair of needle guards at each looper drive location, one on the looper and one on the looper housing, both of which are adjustable. The dual needle guards limit needle deflection perpendicular to the plane of motion of the looper, which increases the reliability of stitch formation.

Alternative solutions are provided to wipe the cut top thread to the top of the material, including a thread wiper mechanism and a bridge movement wipe cycle that remove the cut top thread from the material after it has been cut before the start of a new pattern component. In addition, a thread tuck cycle is provided that places the cut top-thread tail on the back side of the material at the beginning of the stitching of a pattern curve. The tuck cycle also reduces the likelihood of missing stitches on start up. The wipe and tuck cycles may be combined as part of the tacking, thread cutting, jumping, tacking and startup sequence between patterns.

A tack-stitch sequence sewing method is also provided that minimizes needle deflection and further reduces the likelihood of missing stitches, which is particularly useful during the start up tack sequence. The sequence involves stitching a distance, for example approximately one inch, in the direction of the pattern, then returning along the same line to the original position before starting the normal sewing of the pattern along the sewing line. In this sequence, long stitches are used coupled with intermittent feed of the stitching elements relative to the material. This intermittent feed includes the alternate cycling of the needle through the material without feeding the material relative to the needle and then the pausing of the needle cycle with the needle withdrawn from the material while the material is moved relative to the needle. The stopping of the material or the needle is not necessarily absolute, but may rather be a smooth slowing of the needle or material motion while the other moves more rapidly. This sequence of stitches may be applied whenever stitching reverses direction in a pattern, particularly when the reversal causes the stitching to be applied back over previously formed stitches in the pattern. It is particularly useful during the start-up tack, and either may or may not also be applied for the ending tack. During sewing, continuous feed, rather than intermittent feed, is preferably employed. For the transition from an intermittent feed stitch sequence to the continuous feed stitching at the beginning of sewing of a pattern where the threads have been previously cut, a series of intermittent-continuous transition stitches are used.

Further in accordance with principles of the invention, each thread of a quilting or other sewing machine is provided with a thread tension monitoring device. A thread tension control device for each such thread is made to automatically vary its adjustment so as to regulate the tension of the thread in response to the monitoring thereof. Preferably, a closed loop feedback control is provided for each of the threads of the machine. Each is operable to separately measure the tension of the thread and to correct the tension on a thread-by-thread basis.

The bridge drive system that is provided allows the bridges to be moved and controlled separately and moves the bridges precisely and quickly, maintaining their orientation without binding. This feature is used to perform novel sewing methods by which the bridges can be started and stopped separately in a synchronized manner to align patterns and avoid waste material between patterns. In addition, tack stitches can be sewn at different times by the needles of different bridges.

The separately controllable motions of the different bridges and the different degrees of motion provide a capability for producing a wider range of patterns and greater flexibility in selecting and producing patterns. Unique quilt patterns, such as patterns in which different patterns are produced by different needles or different needle combinations, can be produced. For example, the different bridges can be moved to sew different patterns at the same time.

A number of new patterns and pattern sewing techniques are provided by the features of the present invention. Some of these are provided, at least in part, as a result of the features of the equipment according to principles of the invention. And some of these are provided, at least in part, by methods and techniques according to other principles of the invention. Particular applications are set forth in connection with the discussion of the figures and the operation of the equipment in the detailed description below. For example, combination patterns can be formed of different pattern components that are sewn simultaneously or in a time-shared fashion by two different bridges that move independently. One continuous pattern can be sewn while discrete TACK-AND-JUMP patterns or a second different continuous pattern can be sewn along with the first pattern. An intermediate quilted product that includes one or more continuous patterns extending along more than one panel or portion of a panel on a continuous web provide speed and efficiency in quilting patterns that previously could be sewn on only single needle quilting machines or other slow machines, as well as new quilted patterns.

The mechanism has lower inertia than conventional quilting machines. Increased quilting speeds by ⅓ are provided, for example, to 2000 stitches per minute.

The need for less overall pressure and force by the sewing elements and by the presser foot plates allows for lighter weight construction of the quilting machine and for a smaller machine having a smaller footprint in the bedding plant. Further, the use of individual presser feet avoids much of the pattern distortion caused by the presser arrangements of the past.

In addition, the elimination of the need to move the material to be quilted from side to side and the elimination of the need to squeeze the material under a large presser foot plate allows the machine to have a simple material path, which allows for a smaller machine size and is more adaptable to automated material handling.

In accordance with still other features of the present invention, a split start feature is provided that can be implemented using a single drive servo for the needles and loopers. A phase shifting mechanism is provided to accomplish this with both needles and loopers being driven from the same motor. Further, in accordance with the invention, the phase of the loopers is advanced relative to that of the needles, then the loopers and needles are moved together maintaining the phase difference between them, then the loopers and needles are brought back into phase, by retracting the loopers for example or slowing or stopping the loopers relative to the needles while the needles catch up, from which point the cycle continues with the needles and loopers in phase.

In accordance with still further features of the present invention, a startup or end tack stitch apparatus and method are provided in which the tack stitch sequence can vary to accommodate different materials or products. The method and apparatus can provide for manual selection of the tack stitch sequence, for manual specification of the product or material type followed by machine response to the selection to set the appropriate tack stitch sequence, for automatic detection or analysis of the product or material type to determine the appropriate tack stitch sequence, or to selectable modes providing any or all of these features. In addition or as an alternative to the tack stitch sequence variation, other machine operating parameters such as thread pull-off, material movements and other functions may be varied in response to the differences in product or material. For example, where material is thicker or denser than ordinarily encountered, a slower, more aggressive or longer intermittent stitch tack sequence may be appropriate.

These and other objectives and advantages of the present invention will be more readily apparent from the following detailed description of the drawings of the preferred embodiment of the invention, in which:

BRIEF DESCRIPTION OF THE DRAWINGS

FIG. 6I is an enlarged perspective view of the bridge of FIG. 6H illustrating the needle head assembly side of the bridge.

DETAILED DESCRIPTION OF THE DRAWINGS

Figure 1:
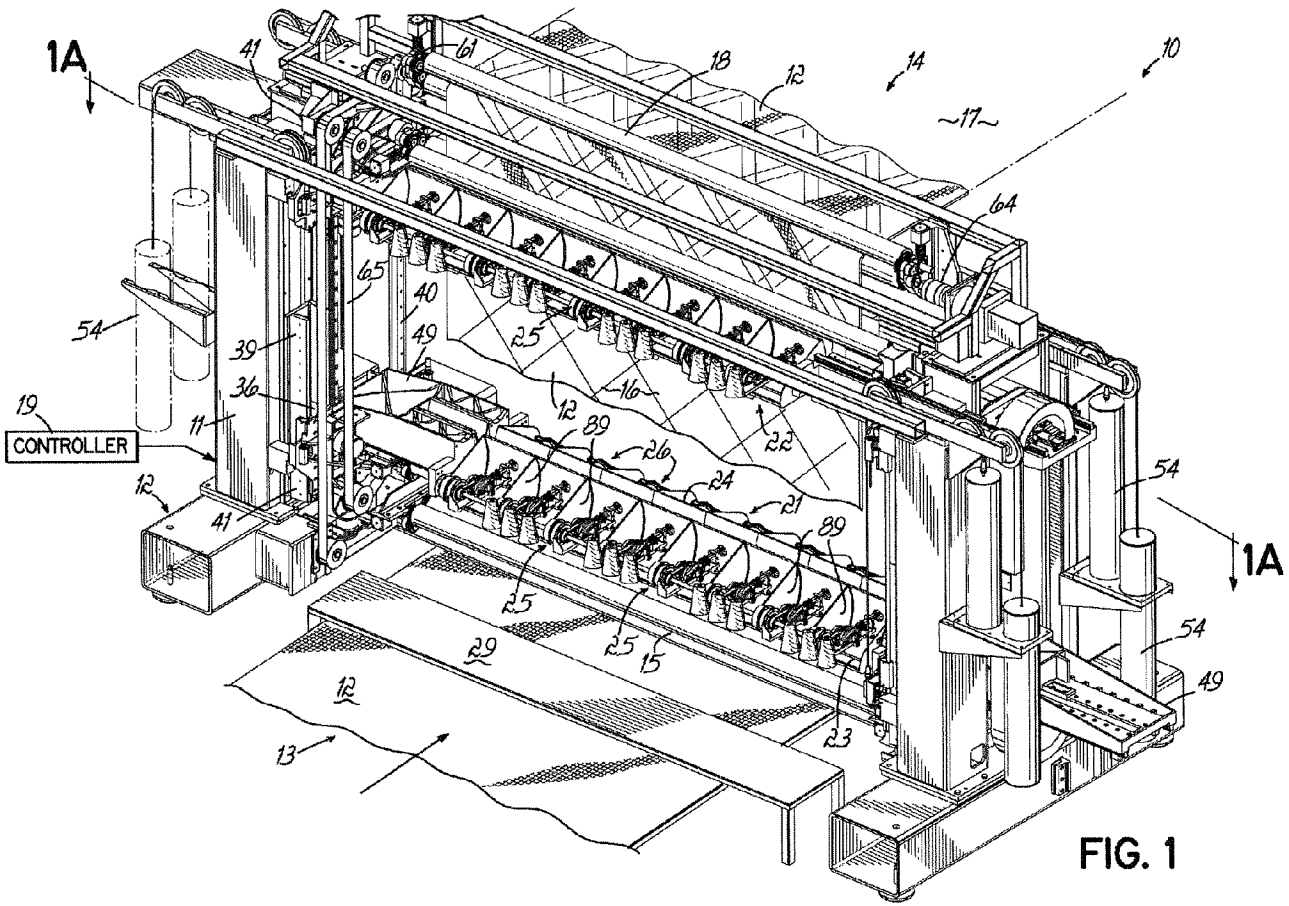
FIG. 1 is a perspective view of a quilting machine embodying principles of the present invention.
Figure 1A:
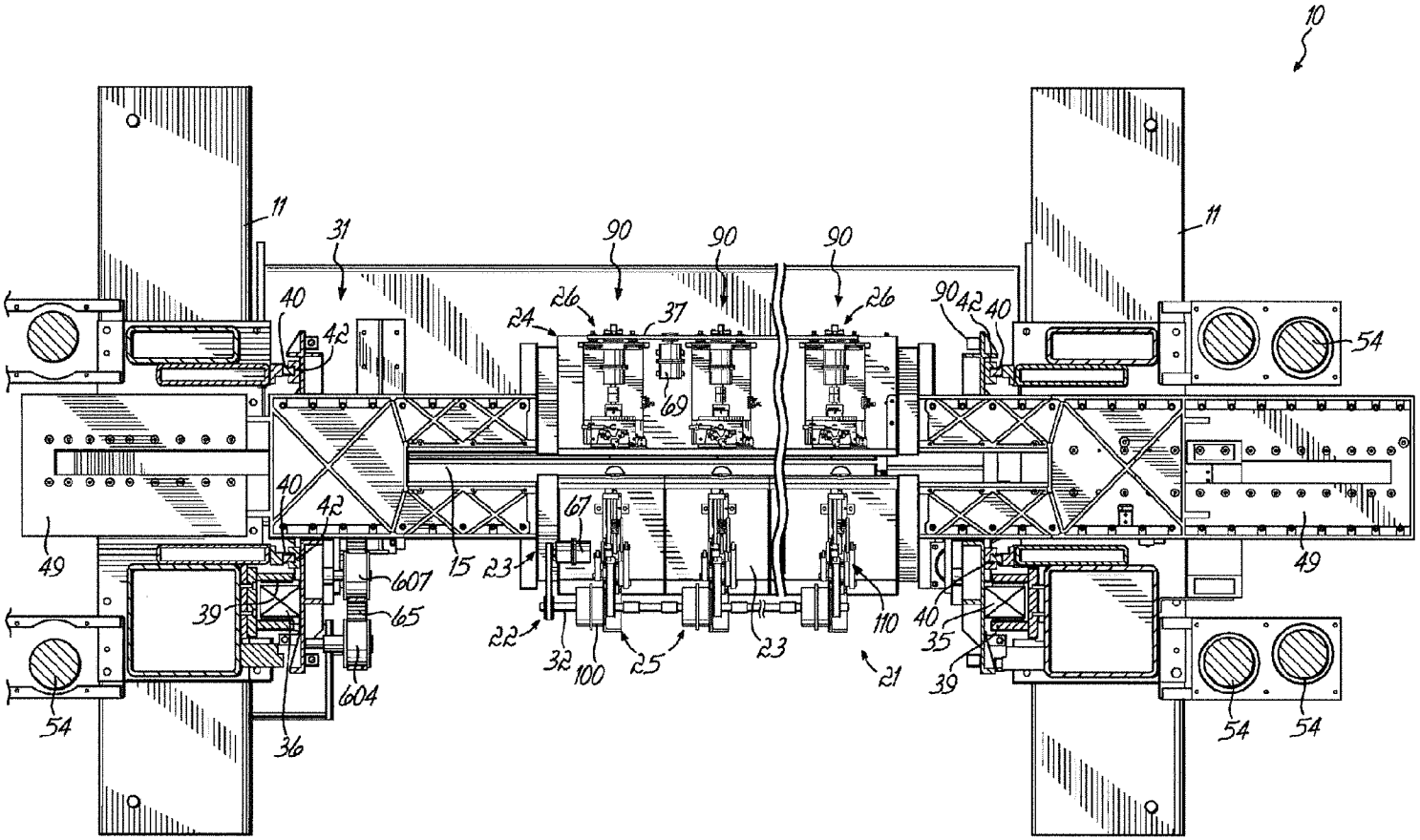
FIG. 1A is a cross-sectional top view of the quilting machine of FIG. 1 taken along the line 1A-1A of FIG. 1 illustrating particularly the lower bridge.

FIGS. 1 and 1A illustrate a multi-needle quilting machine 10 according to one embodiment of the invention. The machine 10 is of a type used for quilting wide width webs of multi-layered material 12, such as the materials used in the bedding industry in the manufacture of mattress covers. The machine 10, as configured, may be provided with a smaller footprint and thus occupies less floor area compared with machines of the prior art, or in the alternative, can be provided with more features in the same floor space as machines of the prior art. The machine 10, for example, has a footprint that is about one-third of the floor area as the machine described in U.S. Pat. No. 5,154,130, which has been manufactured by the assignee of the present invention for this industry for a number of years.

The machine 10 is built on a frame 11 that has an upstream or entry end 13 and a downstream or exit end 14. The web 12, extending in a generally horizontal entry plane, enters the machine 10 beneath a catwalk 29 at the entry end 13 of the machine 10 at the bottom of the frame 11, where it passes either around a single entry idler roller 15 or between a pair of entry idler rollers at the bottom of the frame 11, where it turns upwardly and extends in a generally vertical quilting plane 16 through the center of the frame 11. At the top of the frame 11, the web 12 again passes between a pair of web drive rollers 18 and turns downstream in a generally horizontal exit plane 17. One or both of the pairs of rollers at the top and bottom of the frame may be linked to drive motors or brakes that may control the motion of the web 12 through the machine 10 and control the tension on the web 12, particularly in the quilting plane 16. Alternatively, one or more other sets of rollers, as described below, may be provided for one or more of these purposes. The machine 10 operates under the control of a programmable controller 19.

Figure 8:
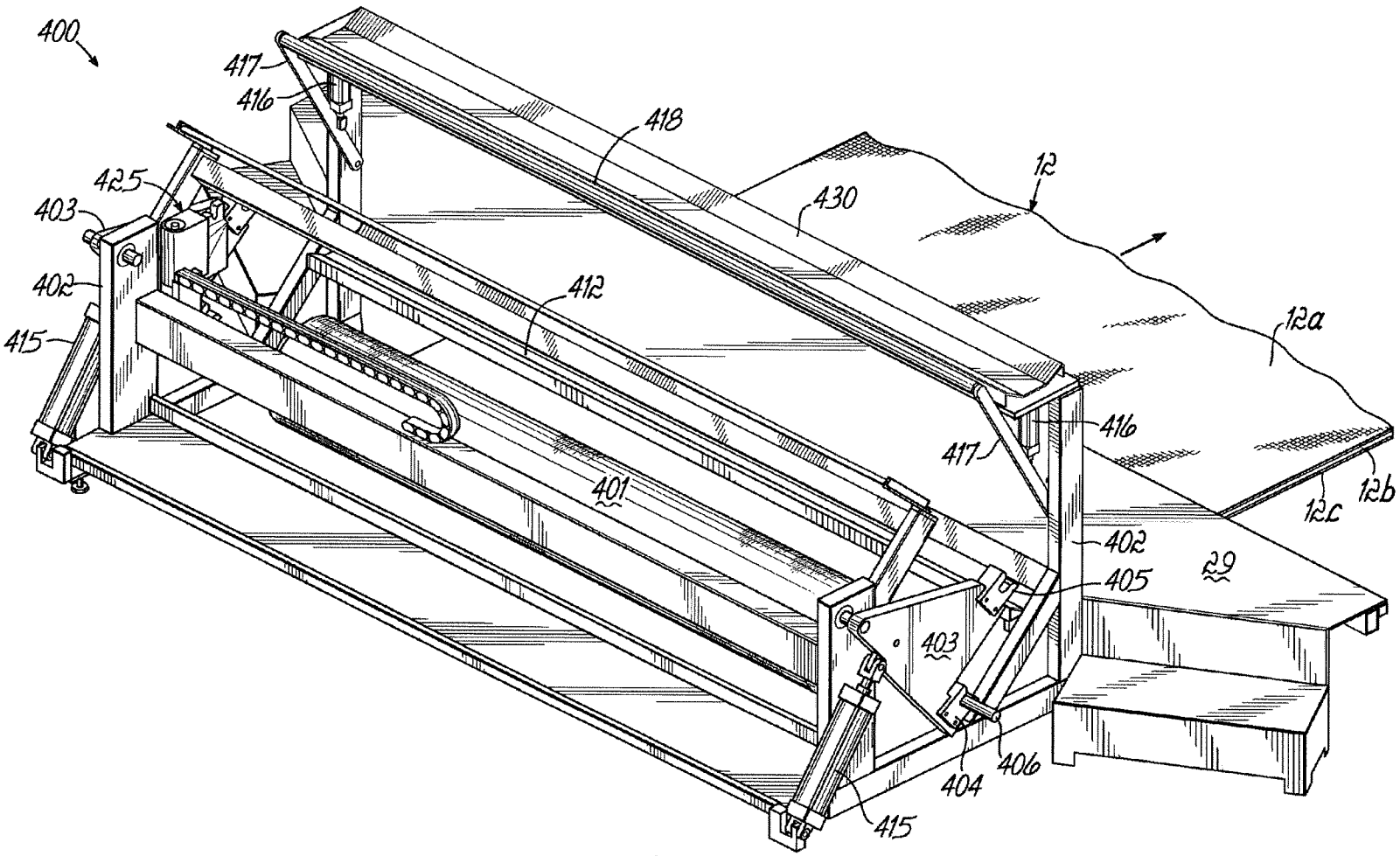
FIG. 8 is an isometric view of a facing material supply and splicing station configured for installation immediately upstream of the quilting machine of FIG. 1.

At the entry end 13 of the machine 10 are the rolls of material that make up the web of multi-layered material 12 that enters this entry region 13 in web form from beneath catwalk 29, which is provided for a machine operator to walk across the front of the machine 10. The top or facing layer 12a of the material 12, or, in the case of mattress cover quilting, the ticking layer, is fed beneath this catwalk from a supply station 400 located upstream of the catwalk 29. The supply station 400 is that illustrated in perspective in FIG. 8. The remaining layers of material, including the fill 12b and the backing layer 12c are fed from supplies (not shown) upstream of the facing layer supply station 400. The facing layer A is supplied to the machine 10 from a supply roll 401 supported at the supply station 400. As illustrated in FIG. 8, and in the side elevational view of FIG. 8A.

Figure 8A:
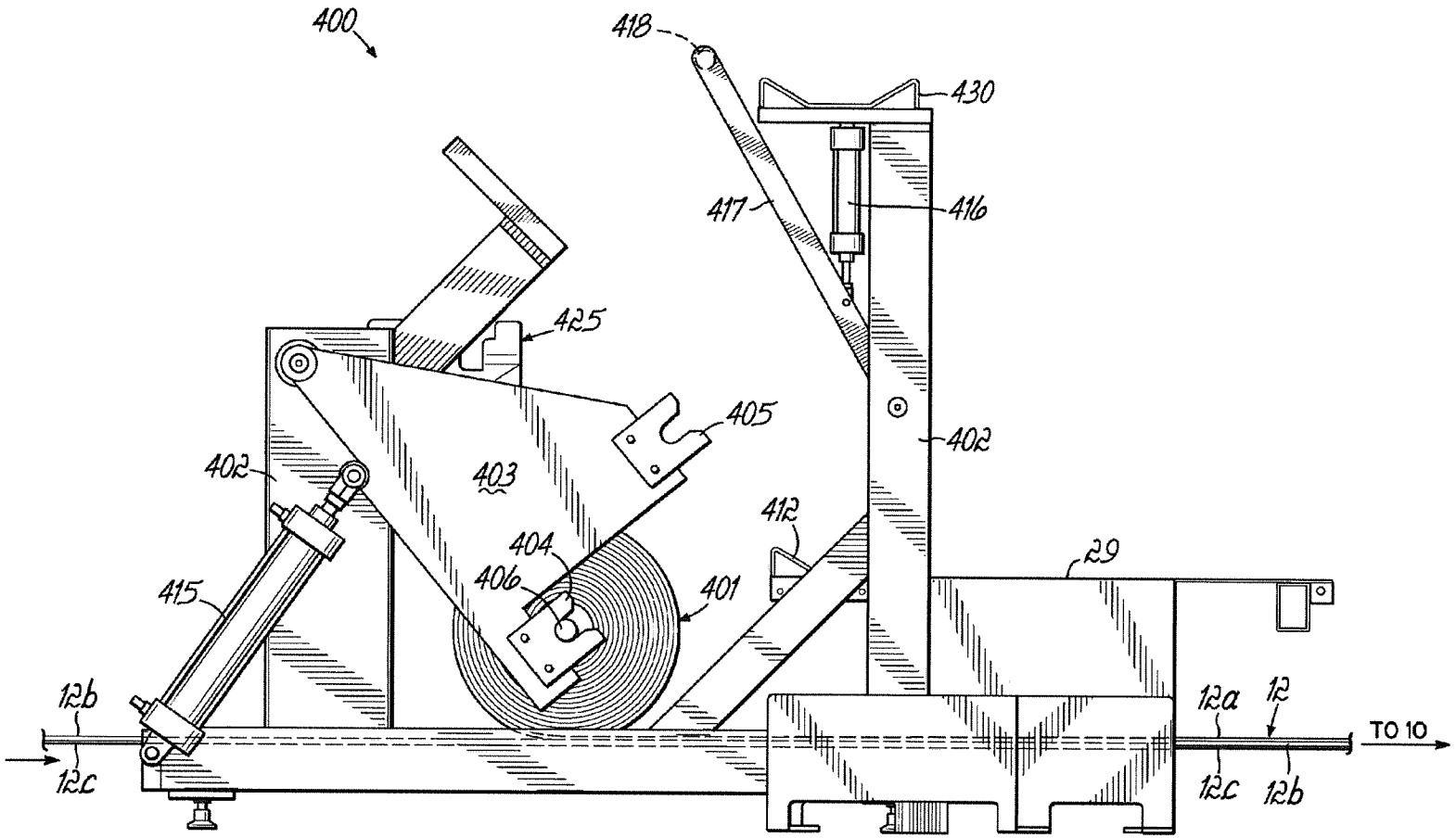
FIGS. 8A-8L are a sequence of diagrams illustrating the change and splicing of facing material with the station of FIG. 8.

The supply station 401 includes a frame 402 that can be set in a fixed position against the upstream side of the catwalk 29 of the quilting machine 10. A supply roll cradle 403 is pivotally mounted to the frame 402 and carries, at its remote end, two pair of notched mounting blocks, including lower blocks 404 and upper blocks 405. The blocks 404 and 405 are configured to support the opposite ends of an axial rod, such as axial rod 406, which extends through the center of, and supports, the supply roll 401. When material is being fed from the supply roll 401, the roll 401 is supported on the blocks 404, as illustrated in FIG. 8A, with the facing layer of material 12a extending horizontally from the roll 401, under the catwalk 29, and to the machine 10.

Figure 8B:
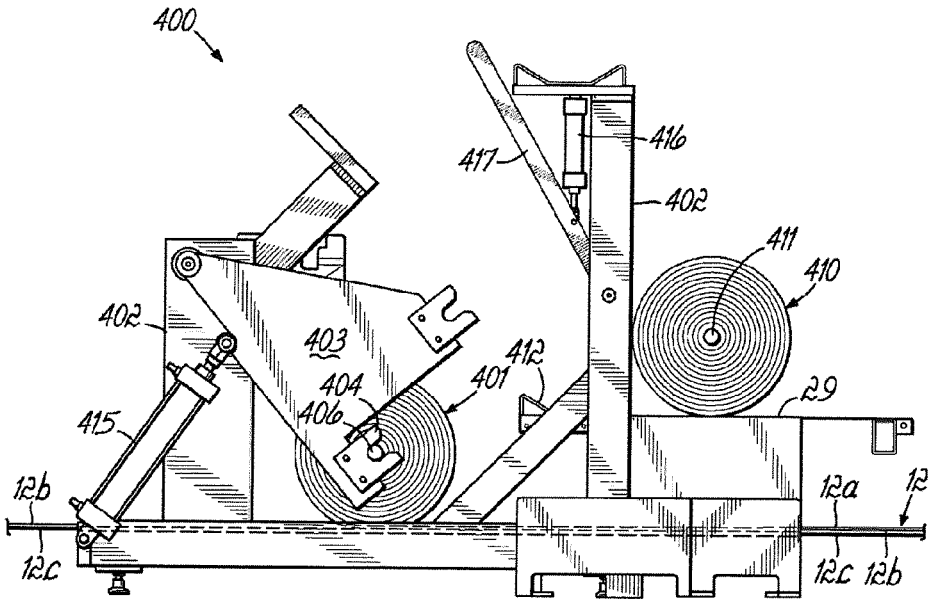
Figure 8C:
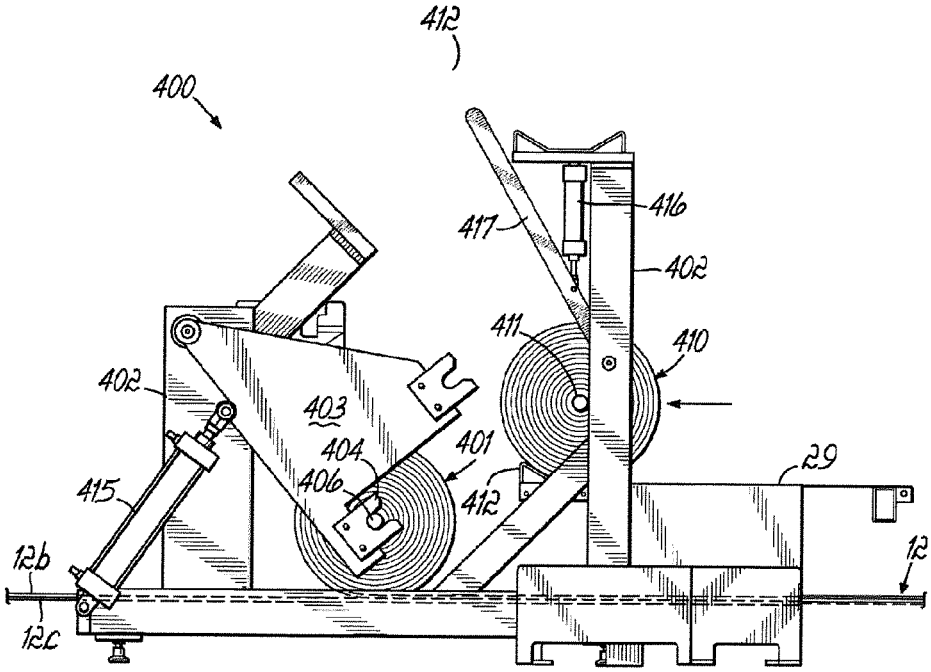
Figure 8D:
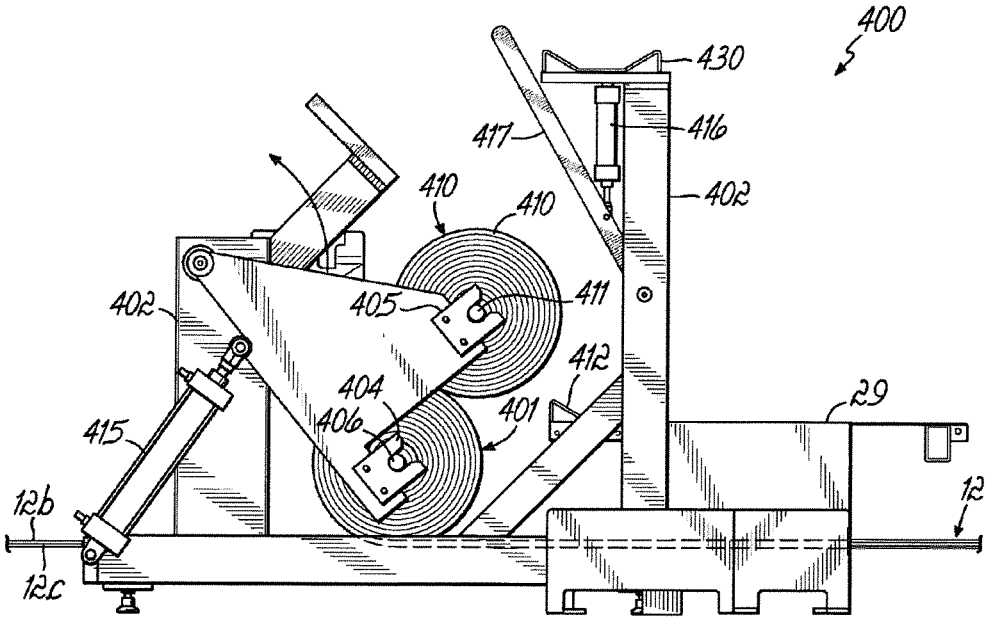

When a material change is desired, a new roll of facing material 410 is set on the catwalk 29, which serves as a pre-staging area, as illustrated in FIG. 8B. The roll 410 may have an axial rod 411 extending through the hole in the center of the roll 410. The extensions of this rod 411 from the ends of the roll 410 can serve as handles for use by a pair of attendants for placing the roll 410 on the catwalk 29. From its position on the catwalk 29, the new roll 410 is staged for replacing the roll 401 by rolling it onto a tray 412 immediately adjacent the catwalk 29, as illustrated in FIG. 8C. From this position, the roll 410 is moved to the cradle 403 by lifting from the tray 412 the axial rod 411 by its ends and placing them in the upper blocks 405 of the cradle 403, as illustrated in FIG. 8D.

Figure 8E:
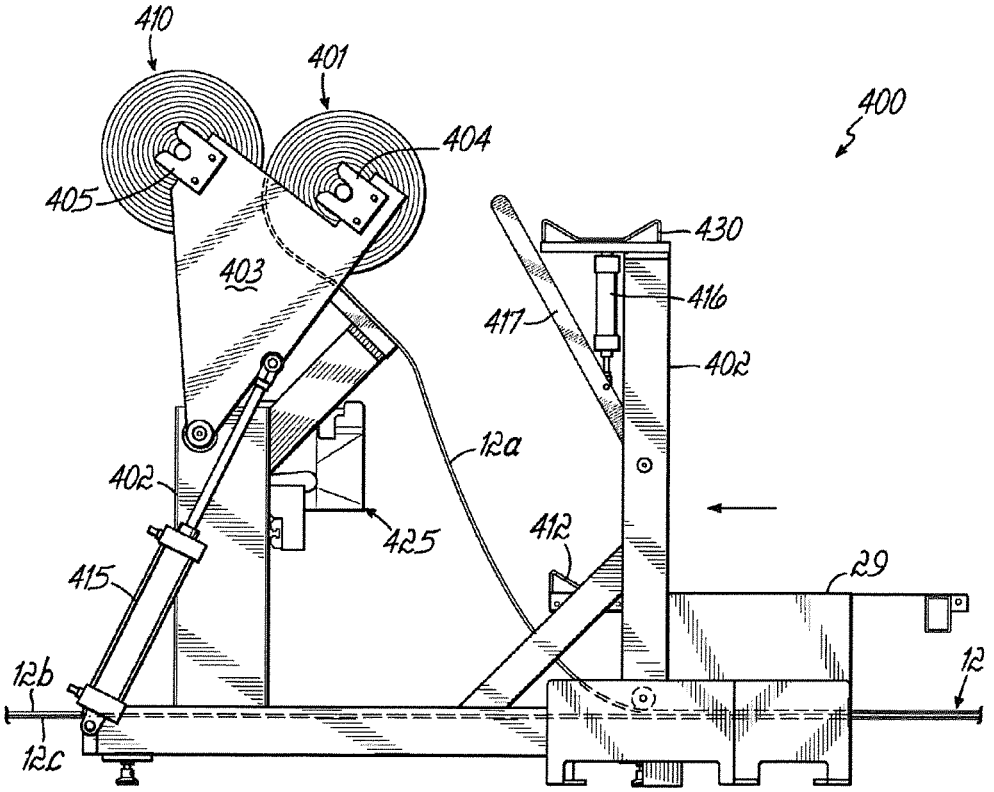
Figure 8F:
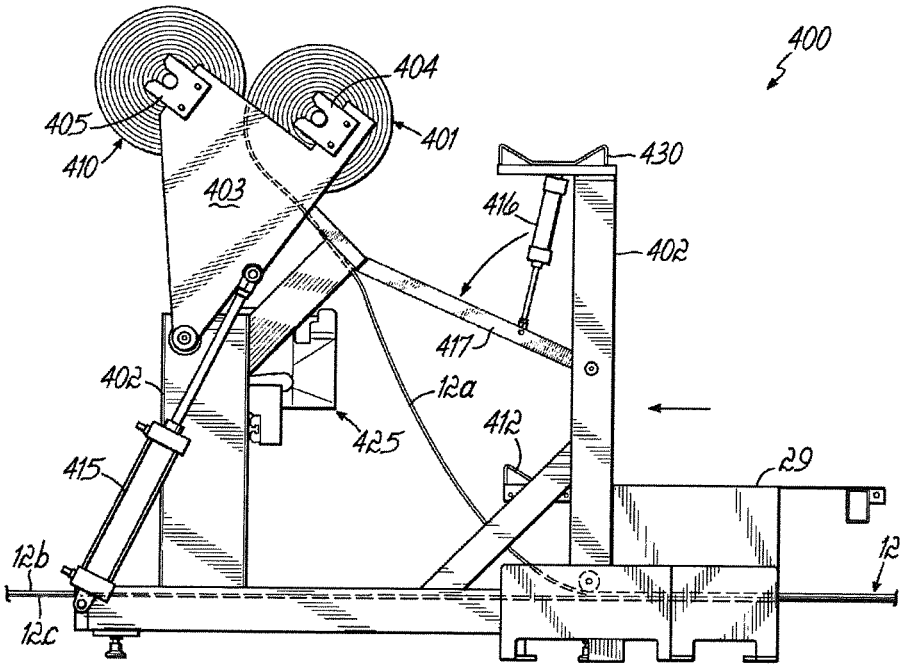
Figure 8G:
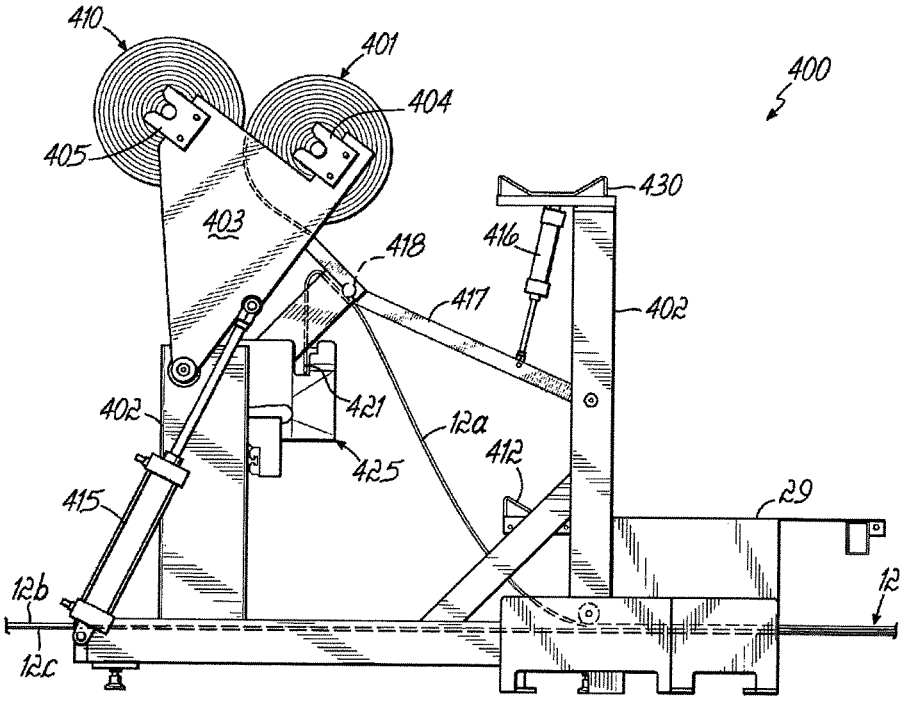

After the new roll 410 has been mounted on the cradle 403, a hydraulic or pneumatic cylinder 415 is activated to lift the cradle 403 above the frame 402 by pivoting the cradle 403 upward on the frame 402. This leaves the rolls 403 and in the positions illustrated in FIG. 8E, with the web of facing material 12a extending from the roll 401, below the catwalk 29, to the machine 10. At this point, another cylinder 416 is activated to lower a clamping arm 417, which clamps the material 12a against a clamping bar 418 on the frame 402, as illustrated in FIG. 8F. At this point, the material 12a is cut from the roll 401, which may be done manually with a knife or scissors, along a transverse line at location 420, providing just enough tailing material to allow the trailing edge 421 of the material 12a to drop into a splicing position in a splicer mechanism 425, as illustrated in FIG. 8G.

Figure 8H:
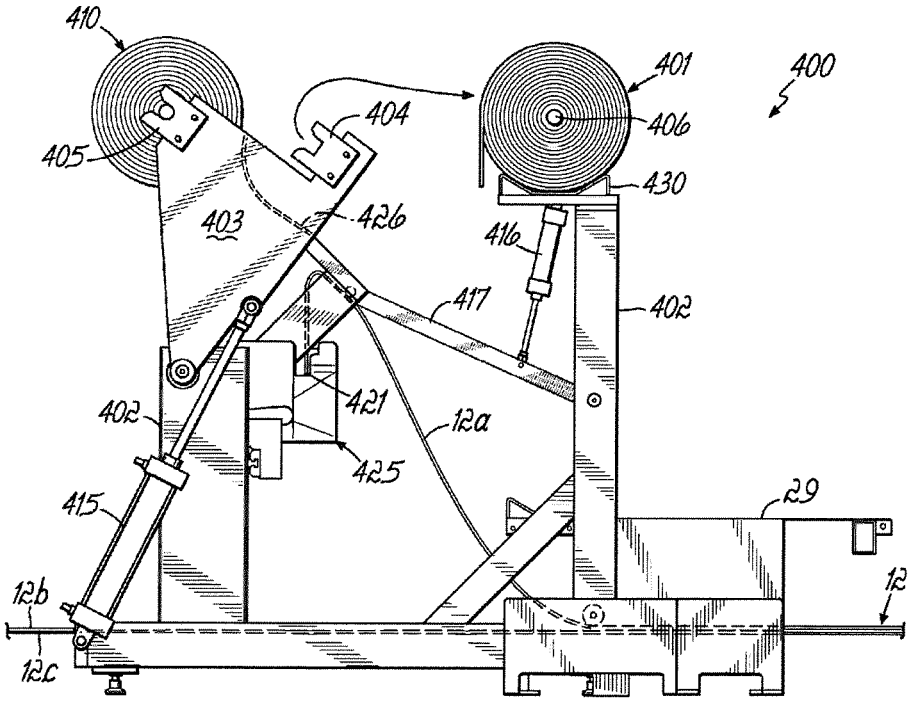
Figure 8I:
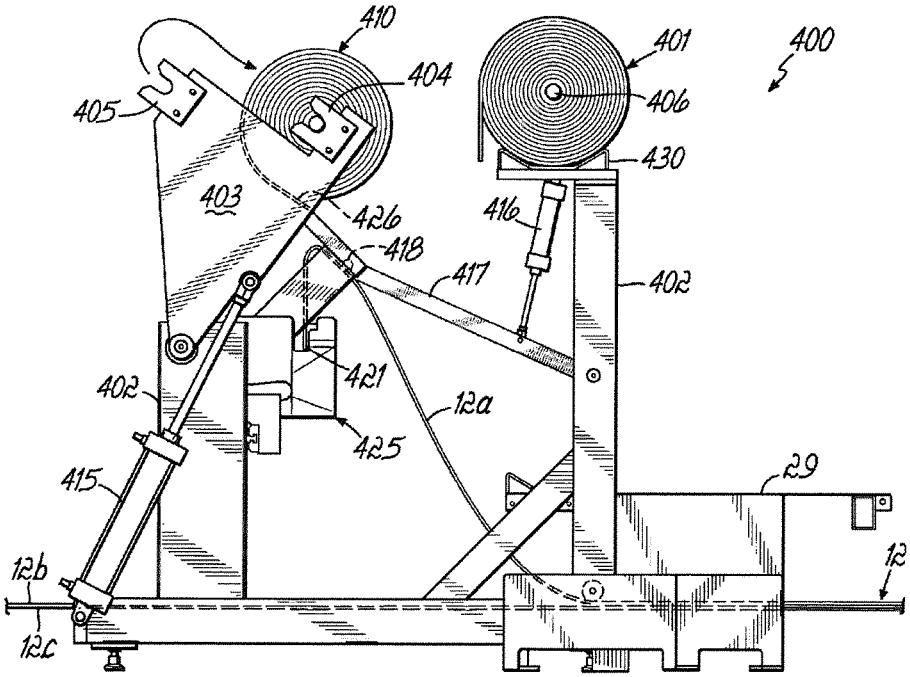
Figure 8J:
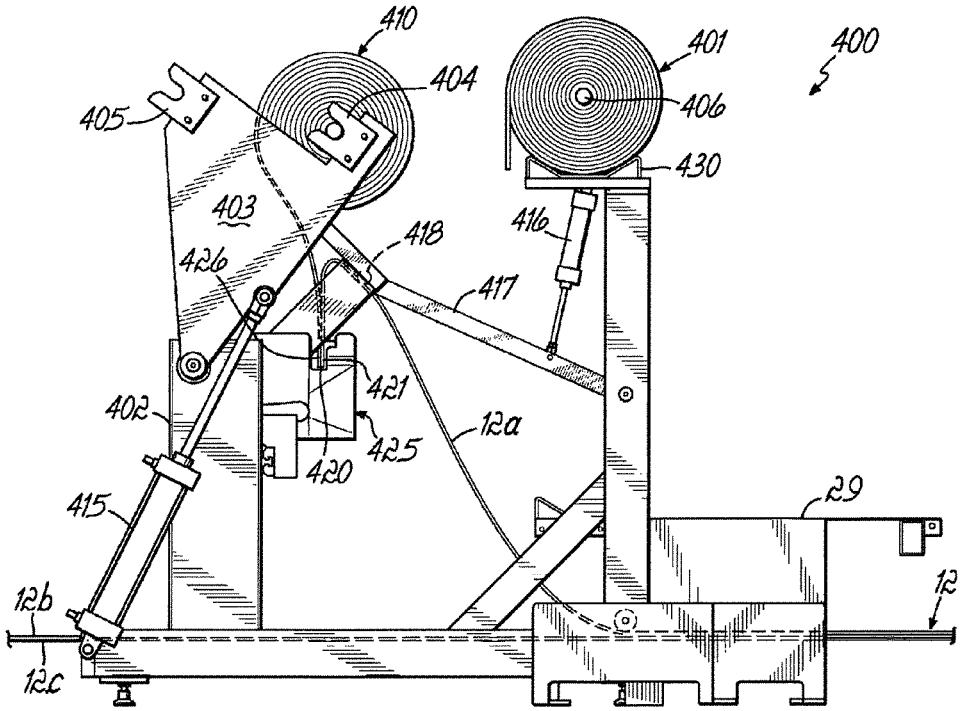
Figure 8K:
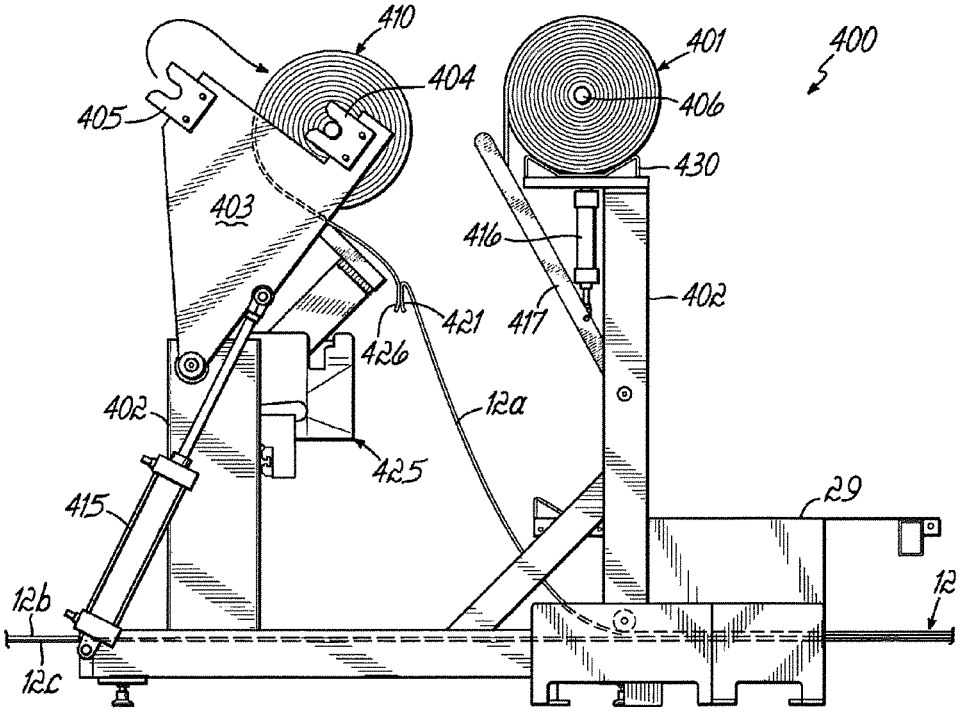
Figure 8L:
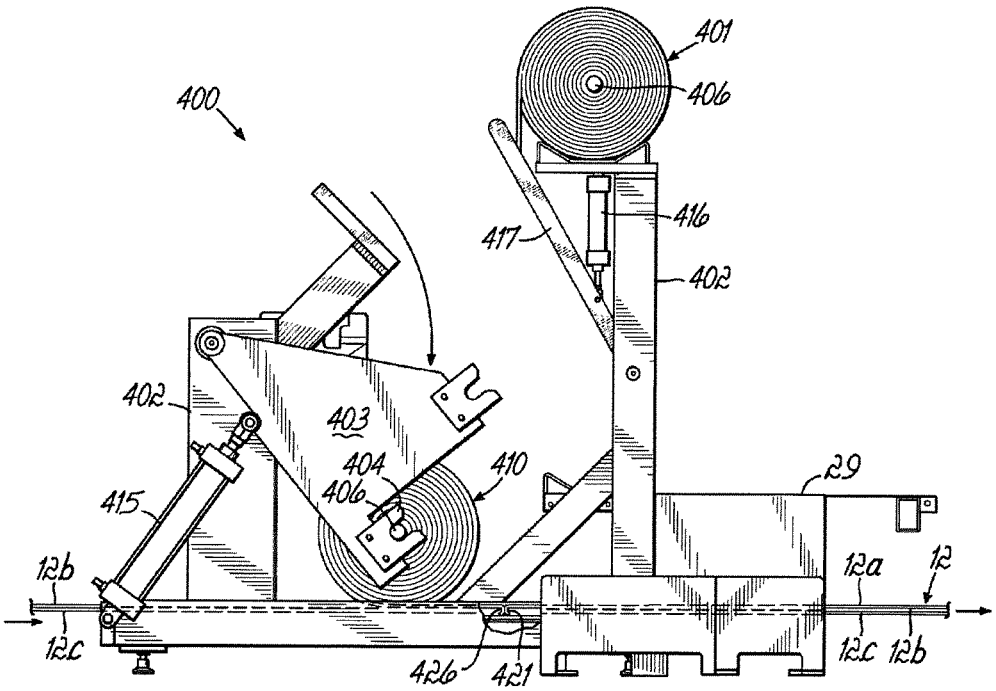

Once the trailing edge 421 is in the splicing mechanism 425, held between the clamping arm 417 and the clamping bar 418, and the material 12a has been cut from the roll 401, the roll 401 can be lifted by rod 406 and removed from the lower blocks 404 of the cradle 403 and placed in a tray 430 at the top of the frame 402, as illustrated in FIG. 8H. Then, the new roll 410 can be moved from upper blocks 405 of the cradle 403 to the lower blocks 404, where it will replace the pervious roll 401 of facing material 12a, as illustrated in FIG. 81. Then the leading edge 426 of material from the roll 410 is placed adjacent the trailing edge 421 of the facing material 12a, in the splicer 425, where the materials from rolls 410 and 401 are spliced together by sewing a transverse row of single-lock chain stitches with the splicer 425, to form a continuous web of facing material 12a, as illustrated in FIG. 8J. Then the clamping arm 417 can be pivoted up out of its clamping position by actuation of the cylinder 416, leaving the new material from roll 410 extending from roll 410 spliced to the old material from roll 401 that extends into the quilting machine 10, as illustrated in FIG. 8K. Whereupon, the cylinder 415 can be activated to lower the carriage 403 to bring the roll 410 into the former position of the original roll 401, at which the machine 10 can be run with facing material supplied from the new roll 410, as illustrated in FIG. 8L.

While the description above discusses a device used for splicing webs of material together when replacing one web of material with another, the device can be used for easily and efficiently splicing a short length of material to a web to feed one or a few panels of material into a quilter. This can be advantageous in providing custom printed panels to a quilter, for example, as described in U.S. Pat. Nos. 6,263,816 and 6,435,117, hereby expressly incorporated by reference herein.

Alternative embodiments can be devised using the principles and features set forth above. For example, the material 12a can be guided through the splicer mechanism 425 and spliced to the leading edge of the material from roll 410 before the material 12a is cut from the roll 401.

On the frame 11 is mounted a motion system that includes a plurality of bridges, including a lower bridge 21 and an upper bridge 22, that move vertically on the frame, but which may include more than the two bridges illustrated. Each of the bridges 21, 22 has a front member 23 and a back member 24 (FIG. 1A) that each extend horizontally generally parallel to, and on opposite sides of, the quilting plane 16. Each front member 23 has mounted thereon a plurality of needle head assemblies 25, each configured to reciprocate a needle in longitudinal horizontal paths perpendicular to the quilting plane 16. Between adjacent needle head assemblies 25, a rib or stiffener plate 89 is provided to structurally stiffen the bridge and to resist dynamic deformation from the sewing forces applied by the needle drives. Each of the needle head assemblies 25 can be separately activated and controlled by the machine controller 19. A plurality of looper head assemblies 26, one corresponding to each of the needle head assemblies 25, are mounted on each of the back members 24 of each of the bridges 21, 22. The looper head assemblies 26 each are configured to oscillate a looper or hook in a plane generally perpendicular to the quilting plane 16 to intersect the longitudinal paths of the needles of the corresponding needle head assemblies 25. The looper head assemblies 26 may also be separately activated and controlled by the machine controller 19. Each needle head assembly 25 and its corresponding looper head assembly 26 make up a stitching element pair 90, in which the stitching elements cooperate to form a single series of double lock chain stitches. In the embodiment shown in FIGS. 1 and 1A, there are seven such stitching element pairs 90, including seven needle head assemblies 25 on the front members 23 of each bridge 21,22, and seven corresponding looper head assemblies 26 on the rear member 24 of each bridge 21,22. Stitching element pairs 90 are illustrated in more detail in FIG. 1B.

No single-piece needle plate is provided. Rather, a six-inch square needle plate 38 is provided parallel to the quilting plane 16 on the looper side of the plane 16 on each of the looper heads 26. This needle plate 38 has a single needle hole 81 that moves with the looper head 26. All of the needle plates 38 typically lie in the same plane.

Similarly, no common presser foot plate is provided. Instead, as described below, each needle head assembly 25 includes a respective one of a plurality of separate presser feet 158. Such local presser feet are provided in lieu of a single presser foot plate of the prior art that extends over the entire area of the multiple row array of needles. A plurality of presser feet are provided on each front member 23 of each bridge 21, 22, each to compress material around a single needle. Preferably, each needle assembly 25 is provided with its own local presser foot 158 having only sufficient area around the needle to compress the material 12 for sewing stitches with the respective needle assembly.

Each of the needle assemblies 25 on the front members 23 of the bridges 21,22 is supplied with thread from a corresponding spool of needle thread 27 mounted across on the frame 11 on the upstream or needle side of the quilting plane 16. Similarly, each of the looper assemblies 26 on the back members 24 of the bridges 21,22 is supplied with thread from a corresponding spool of looper thread 28 mounted across the frame 11, on the downstream or looper side of the quilting plane 16.

Figure 1B:
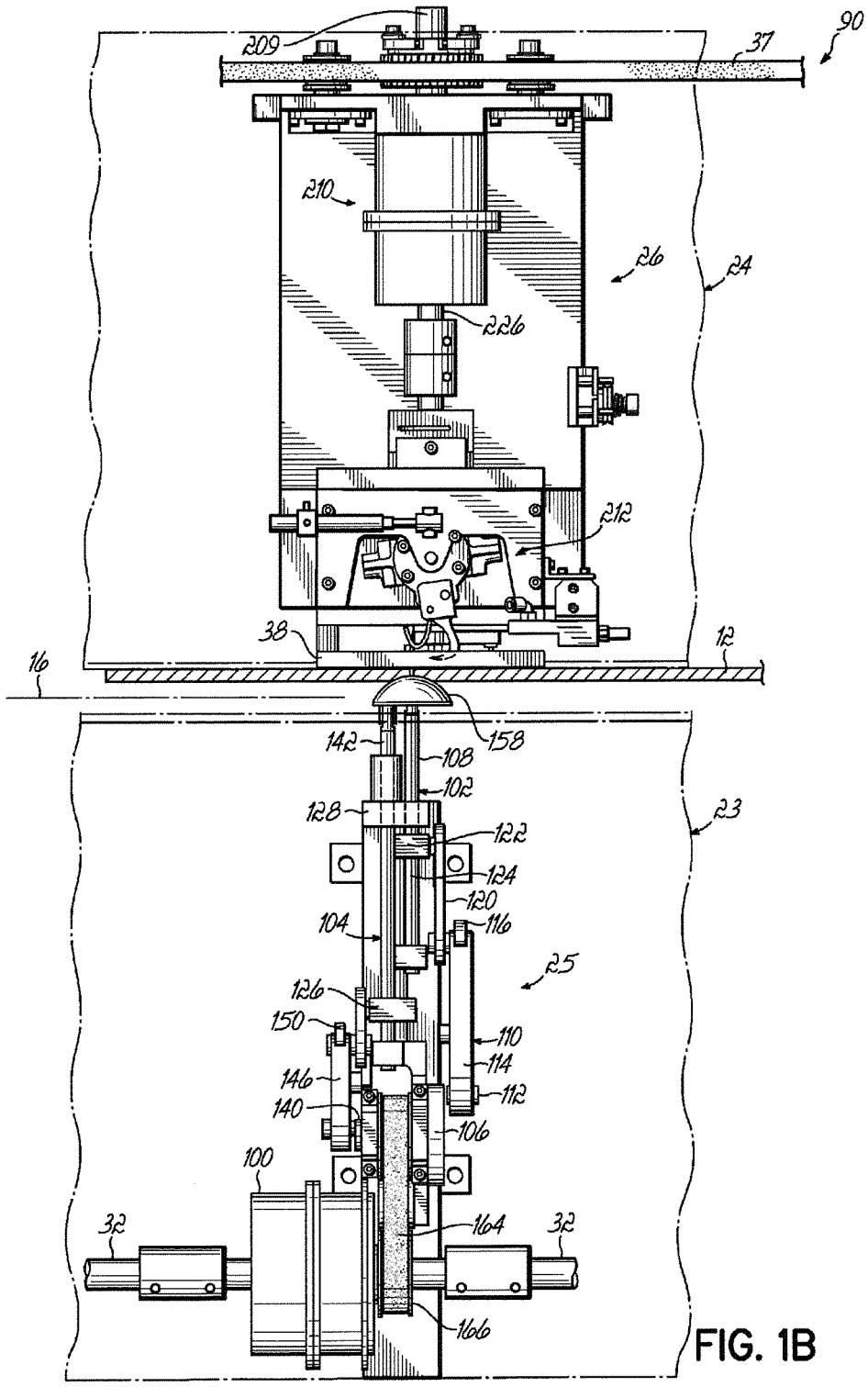
FIG. 1B is an enlarged top view illustrating a needle head and looper head assembly pair of bridges of FIG. 1A.

As illustrated in FIGS. 1-1B, a common needle drive shaft 32 is provided across the front member 23 of each bridge 21,22 to independently drive each of the needle head assemblies 25. Each shaft 32 is driven by a needle drive servo 67 on the needle side member 23 of each respective bridge 21, 22 that is responsive to the controller 19. A looper belt drive system 37 is provided on the back member 24 of each of the bridges 21, 22 to drive each of the looper head assemblies. Each looper drive belt system 37 is driven by a looper drive servo 69 on the looper side member 24 of each respective bridge 21, 22 that is also responsive to the controller 19. Each of the needle head assemblies 25 may be selectively coupled to or decoupled from the motion of the needle drive shaft 32. Similarly, each looper head assembly 26 may be selectively coupled to or decoupled from the motion of the looper belt drive system 37. Each of the needle drive shafts 32 and looper belt drive systems 37 are driven in synchronism through either mechanical linkage or motors controlled by the controller 19.

Figure 2:
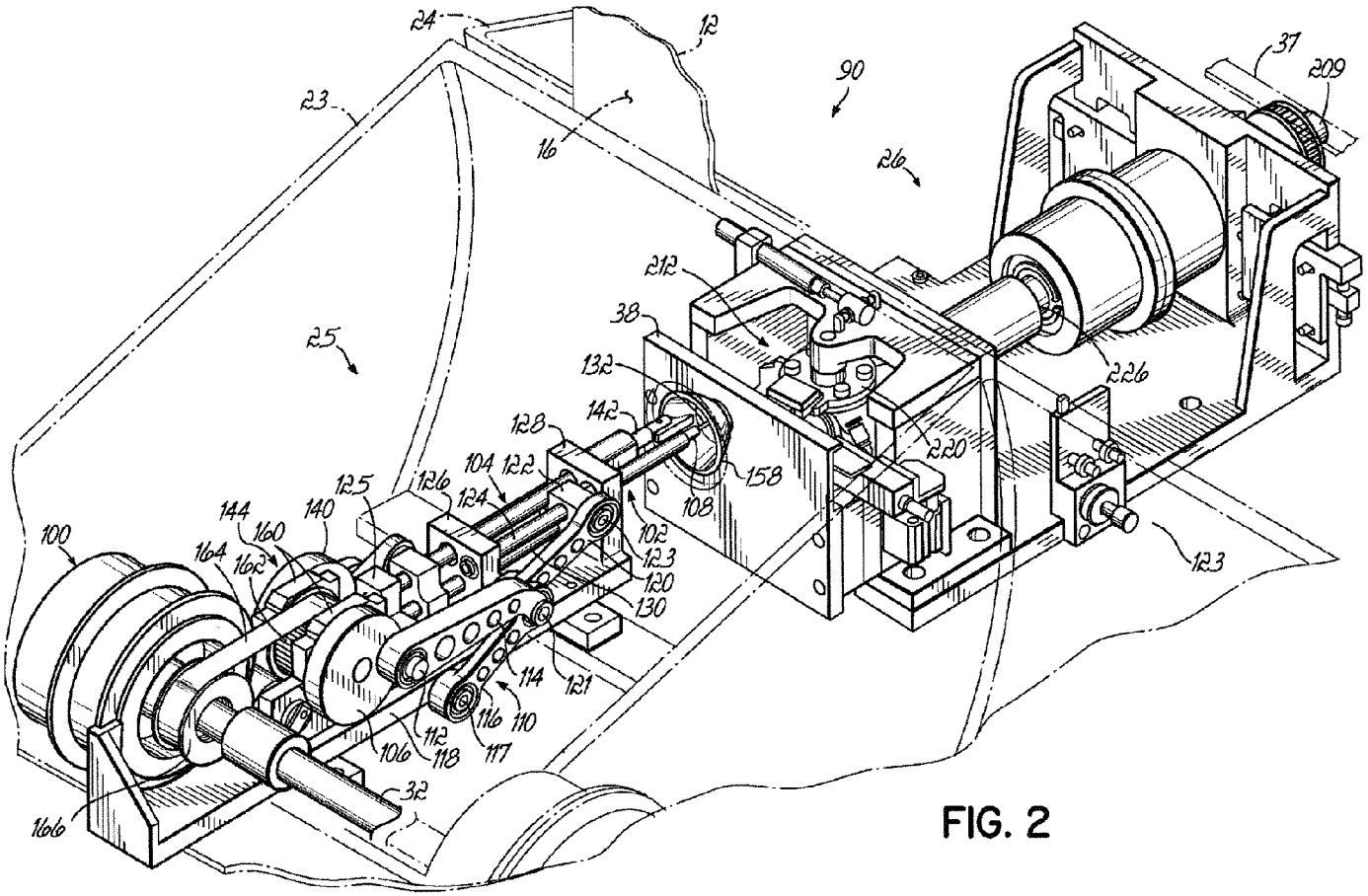
FIG. 2 is an isometric diagram illustrating one embodiment of a needle head and looper head assembly pair of the quilting machine of FIG. 1 viewed from the needle side.

Referring to FIG. 2, each needle head assembly 25 is comprised of a clutch 100 that selectively transmits power from the needle drive shaft 32 to a needle drive 102 and presser foot drive 104. The needle drive 102 has a crank 106 that is mechanically coupled to a needle holder 108 by an articulated needle drive 110, which includes three links 114, 116 and 120. The crank 106 has an arm or eccentric 112 rotatably connected to one end of the first link 114. One end of the second link 116 is rotatably connected to a pin 117 extending from a base 118 that, in turn, is supported on the front member of one of the bridges 21, 22. One end of the third link 120 is rotatably connected to a pin 123 extending from a block 122 that is secured to a reciprocating shaft 124, which is an extension of the needle holder 108. Opposite ends of the respective links 114, 116 and 120 are rotatably connected together by a pivot pin 121 that forms a joint in the articulated needle drive 110.

The shaft 124 is mounted for reciprocating linear motion in fore and aft bearing blocks 126, 128, respectively. The drive block 122 has a bearing (not shown) that is mounted on a stationary linear guide rod 130 that, in turn, is supported and rigidly attached to the bearing blocks 126, 128. Thus, rotation of the crank 106 is operative via the articulated needle drive 110 to reciprocate a needle 132 secured in a distal end of the needle holder 108.

Figure 2A:
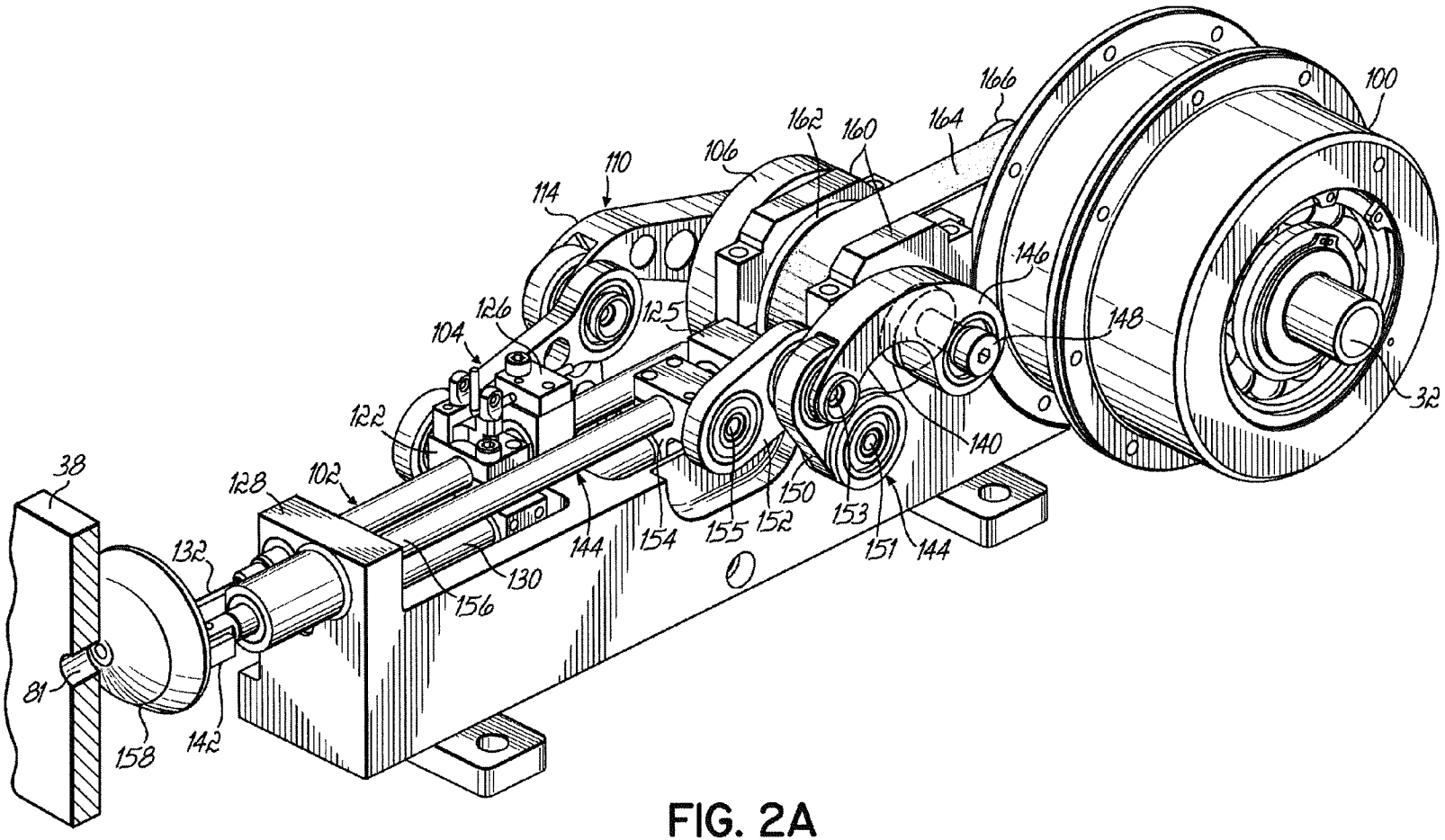
FIG. 2A is an isometric diagram illustrating the needle head assembly of the needle and looper head pair of FIG. 2 viewed from the looper side.

Referring to FIG. 2A, the presser foot drive 104 has an articulated presser foot drive 144 that is similar to the articulated needle drive 110. A crank 140 is mechanically connected to a presser foot holder 142 via mechanical linkage 144, which includes three links, 146, 150 and 152. One end of a fourth link 146 is rotatably coupled to an arm or an eccentric 148 on the crank 140. One end of a fifth link 150 is rotatably connected to a pin 151 extending from the base 118, and one end of a sixth link 152 is rotatably connected to a pin 155 extending from a presser foot drive block 154. Opposite ends of the respective links 146, 150 and 152 are rotatably connected together by a pivot pin 153 that forms a joint in the presser foot articulated drive 144. The presser foot drive block 154 is secured to a presser foot reciprocating shaft 156 that, in turn, is slidably mounted within the bearing blocks 125, 126. A presser foot 158 is rigidly connected to the distal end of the presser foot reciprocating shaft 156. The drive block 154 has a bearing (not shown) that is mounted for sliding motion on the linear guide rod 130. Thus, rotation of the crank 140 is operative via the articulated presser foot drive 144 to reciprocate the presser foot 158 with respect to the needle plate 38.

The needle drive crank 106 and presser foot crank 140 are mounted on opposite ends of an input shaft (not shown) supported by bearing blocks 160. A pulley 162 is also mounted on and rotates with the cranks 106, 140. A timing belt 164 drives the cranks 106, 140 in response to rotation of an output pulley 166. The clutch 100 is operable to selectively engage and disengage the needle drive shaft 32 with the output pulley 166, thereby respectively initiating and terminating the operation of the needle head assembly 25.

Figure 3:
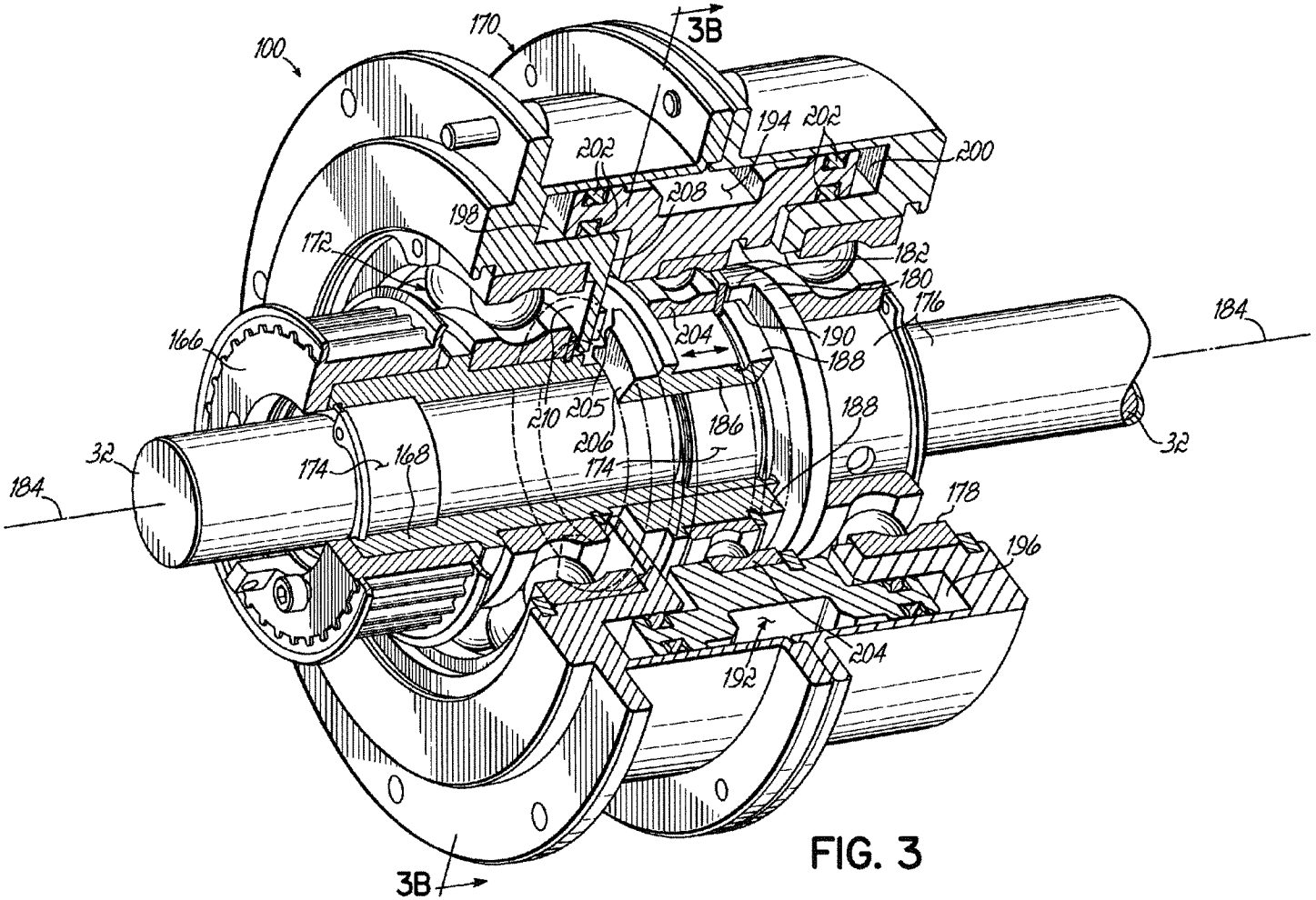
FIG. 3 is an isometric diagram, partially cut away, illustrating the needle head clutch of the needle head assembly of FIGS. 2 and 2A.

Referring to FIG. 3, the output pulley 166 is fixed to an output shaft 168 that is rotatably mounted within a housing 170 of the clutch 100 by means of bearings 172. The needle drive shaft 32 is rotatably mounted within the output shaft 168 by bearings 174. The drive member 176 is secured to the needle drive shaft 32 and is rotatably mounted within the housing 170 by bearings 178. The drive member 176 has a first, radially extending, semicircular flange or projection 180 extending in a direction substantially parallel to the centerline 184 that provides a pair of diametrically aligned drive surfaces, one of which is shown at 182. The drive surfaces 182 are substantially parallel to a longitudinal centerline 184 of the needle drive shaft 32.

The clutch 100 further includes a sliding member 186 that is keyed to the output shaft 168. Thus, the sliding member 186 is able to move with respect to the output shaft 168 in a direction substantially parallel to the centerline 184. However, the sliding member 186 is locked or keyed from relative rotation with respect to the output shaft 168 and therefore, rotates therewith. The keyed relationship between the sliding member 186 and the output shaft 168 can be accomplished by use of a keyway and key or a spline that couples the sliding member 186 to the shaft 168. Alternatively, an internal bore of the sliding member 186 and the external surface of the output shaft 168 can have matching noncircular cross-sectional profiles, for example, a triangular profile, a square profile, or a profile of another polygon.

The sliding member 186 has a first, semicircular flange or projection 188 extending in a direction substantially parallel to the centerline 184 toward the annular flange 182. The flange 188 has a pair of diametrically aligned drivable surfaces, one of which is shown at 190, that can be placed in and out of opposition to the drive surfaces 182 of the flange 180. The sliding member 186 is translated with respect to the output shaft 168 by an actuator 192. The actuator 192 has an annular piston 194 that is mounted for sliding motion within an annular cavity 196 in the housing 100, thereby forming fluid chambers 198, 200 adjacent opposite ends of the piston 194. Annular sealing rings 202 are used to provide a fluid seal between the piston 194 and the walls of the fluid chambers 198, 200. The sliding member 186 is rotationally mounted with respect to the piston 194 by bearings 204.

In operation, the needle drive shaft 32 is stopped at a desired angular orientation, and pressurized fluid, for example, pressurized air, is introduced into the fluid chamber 198. The piston 194 is moved from left to right as viewed in FIG. 3, thereby moving the drivable surfaces 190 of the sliding member 186 opposite the drive surfaces 182. With the clutch 100 so engaged, the needle drive shaft 32 is directly mechanically coupled to the sliding member 186 and the output shaft 168, the output pulley 166 follows exactly the rotation of the needle drive shaft 32. A subsequent rotation of the needle drive shaft 32 results in a simultaneous rotation of the output shaft 168.

Upon the needle drive shaft 32 again being stopped at the desired angular orientation, the pressurized fluid is released from the fluid chamber 198 and applied to the fluid chamber 200. The piston 194 is moved from right to left as viewed in FIG. 3, thereby moving the drivable surfaces 190 out of contact with the driving surface 182 and disengaging the clutch 100. Thus, the drive surfaces 182 rotate past the drivable lugs 188 and the needle drive shaft 32 rotates independent of the output shaft 168. However, in the disengaged state, it is desirable that the output shaft 168 maintain a fixed angular position while the clutch 100 is disengaged. Thus, the sliding member 186 has a second, semicircular annular lockable flange 206 extending to the left, as viewed in FIG. 3, in a direction substantially parallel to the centerline 184. The lockable flange has diametrically aligned lockable surfaces 205.

Figure 4:
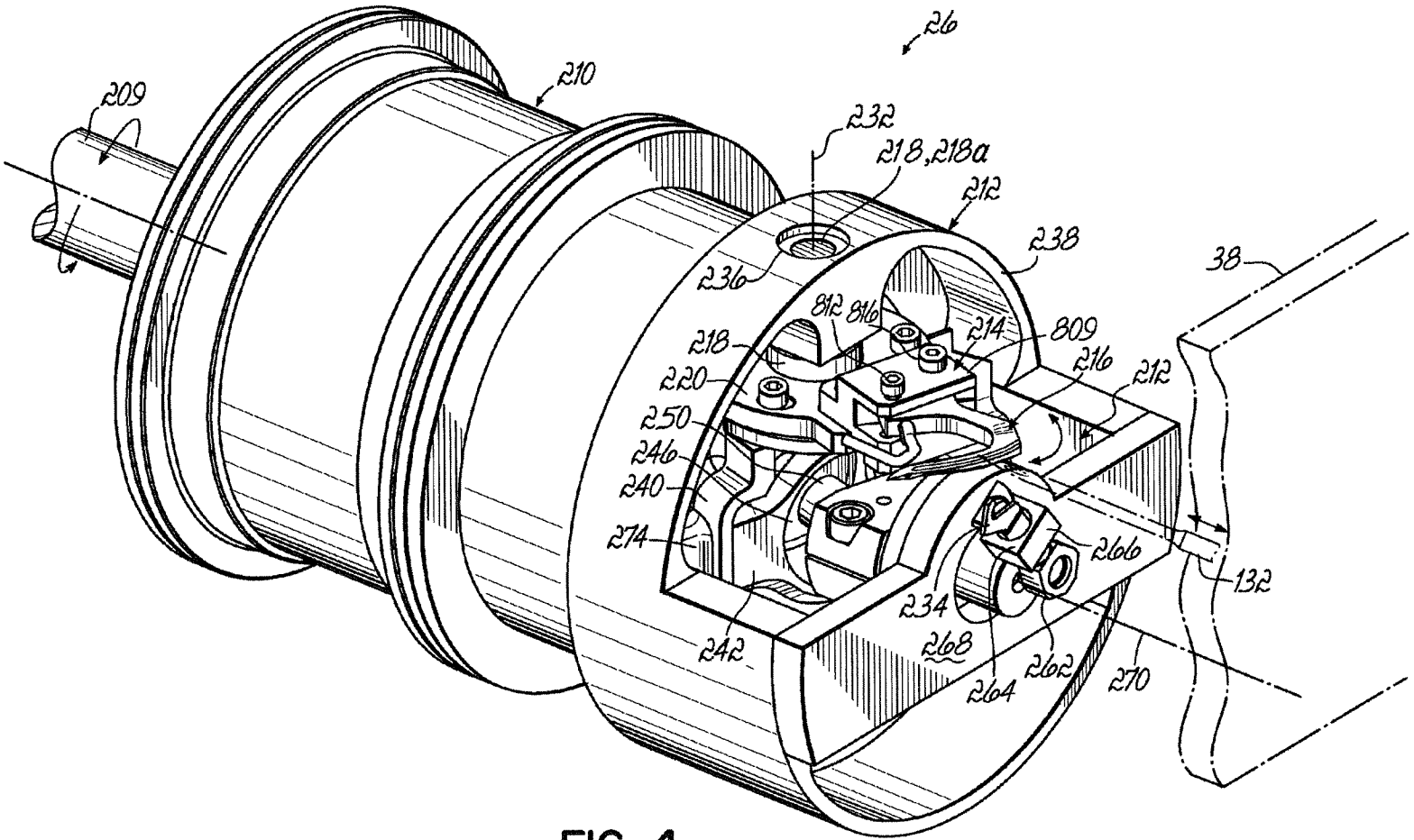
FIG. 4 is an isometric diagram illustrating one embodiment of a looper head assembly of FIG. 2.

As shown in FIG. 4, the looper and retainer drive 212 provides a looper 216 with a reciprocating angular motion about a pivot axis 232 in a plane immediately adjacent the reciprocating needle 132. The looper and retainer drive 212 also moves a retainer 234 in a closed loop path in a plane that is substantially perpendicular to the plane of reciprocating angular motion of the looper 216 and the path of the needle 132.

The looper 216 is secured in a looper holder 214 that is mounted on a flange 220 extending from a first looper shaft 218a. An outer end of the looper shaft 218a is mounted in a bearing 236 that is supported by a looper drive housing 238. An inner end of the looper shaft 218a is connected to an oscillator housing 240. Thus, the looper 216 extends generally radially outward from the axis of rotation 232 of the looper shaft 218.

FIG. 4 shows the looper drive assembly 26 of a type of multi-needle quilting machine 10 in which the needles are oriented horizontally. The looper drive assembly 26 may include a selective coupling element 210, for example, clutch 210 that connects the input 209 of the drive assembly 226 to a drive train that is synchronized to the drive for a cooperating needle drive assembly. The looper drive assembly 26 includes a frame member 219 on which the drive assembly 226 and 210 are mounted in mutual alignment. The frame member 219 is mounted to the rear portion 24 of the respective bridge 21, 22 such that the looper head assembly 26 aligns with the corresponding needle head assembly 25. The output of the clutch 210 drives a looper drive mechanism 212, that has an output shaft 218 having a flange 220 thereon, on which is mounted a looper holder 214. In other types of multi-needle quilting machines, such a looper holder 214 may oscillate with other loopers about a common shaft that is rocked by a common drive linkage that is permanently coupled to the drive train of a needle drive, as described in U.S. Pat. No. 5,154,130. The nature of the chain stitch forming machine and the number of needles is not material to the concepts of the present invention.

Figure 4C:
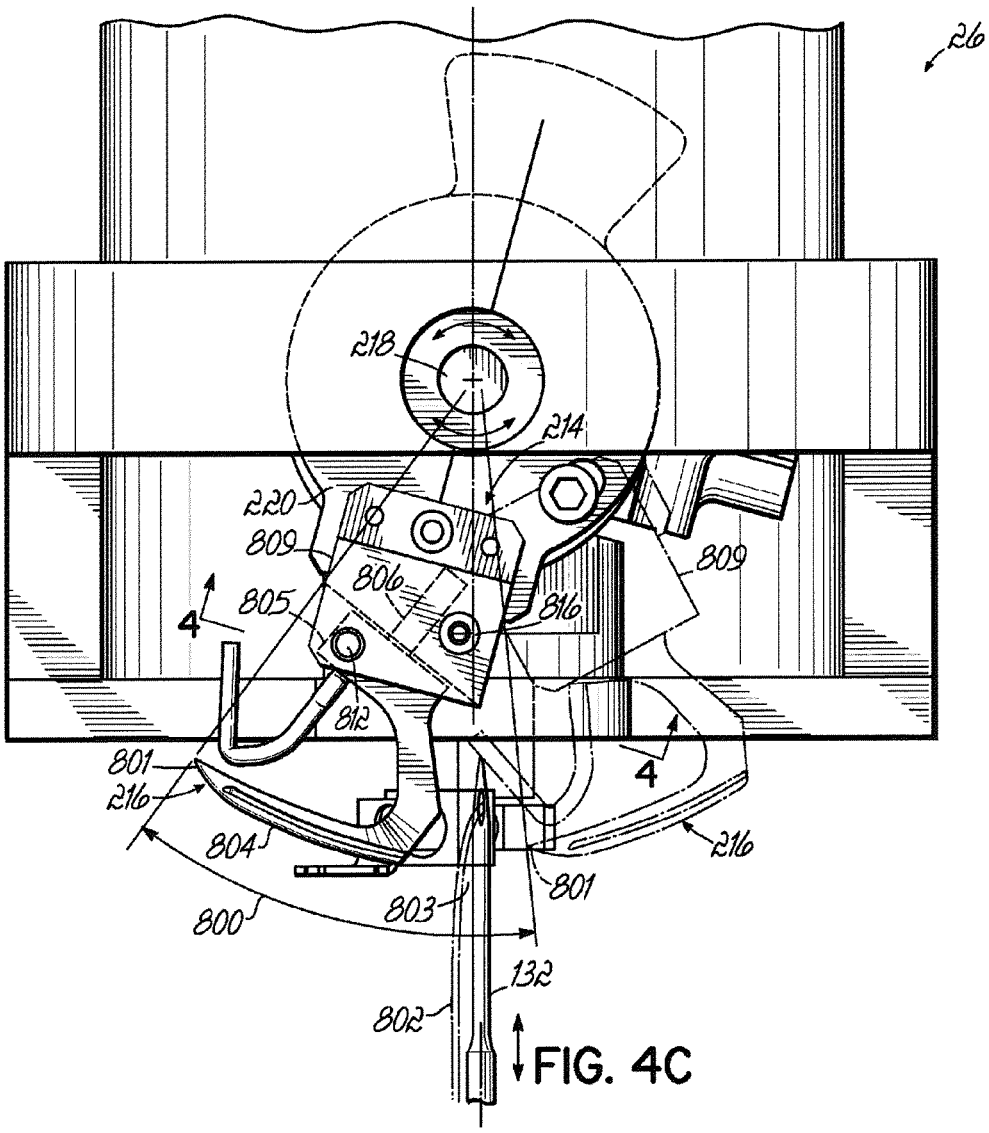
FIG. 4C is a top view, in the direction of the looper shaft, of a portion of the looper drive assembly of FIG. 4 with the looper in position for adjustment.

In general, a looper 216, when mounted in a looper holder 214, is made to oscillate on the shaft 218 along a path 800 that brings it into a cooperating stitch forming relationship with a needle 132, as illustrated in FIG. 4C. The stitch forming relationships and motions of the needle and looper are more completely described in U.S. Pat. No. 5,154,130. During stitch formation, the tip 801 of the looper enters a loop 803 in a top thread 222 that is presented by the needle 132. In order to pick up this loop 803, the transverse position of the tip 801 of the looper 216 is maintained in adjustment so that it passes immediately beside the needle 132. Adjustment of the looper 216 is made with the shaft 218 stopped in its cycle of oscillation with the looper tip 801 in transverse alignment with the needle 132, as illustrated in FIG. 4C. In such adjustment, the tip 801 of the looper 216 is moved transversely, that is, perpendicular to the needle 132 and perpendicular to the path 800 of the looper 216.

Figure 4F:
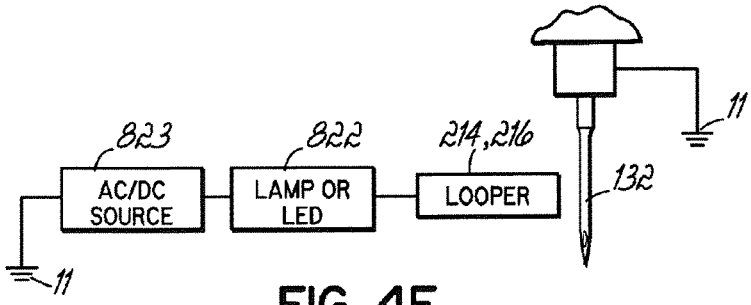
FIG. 4F is a diagram of one embodiment of a looper position indicator for the looper adjustment mechanism of FIGS. 4C-4E.
Figure 4D:
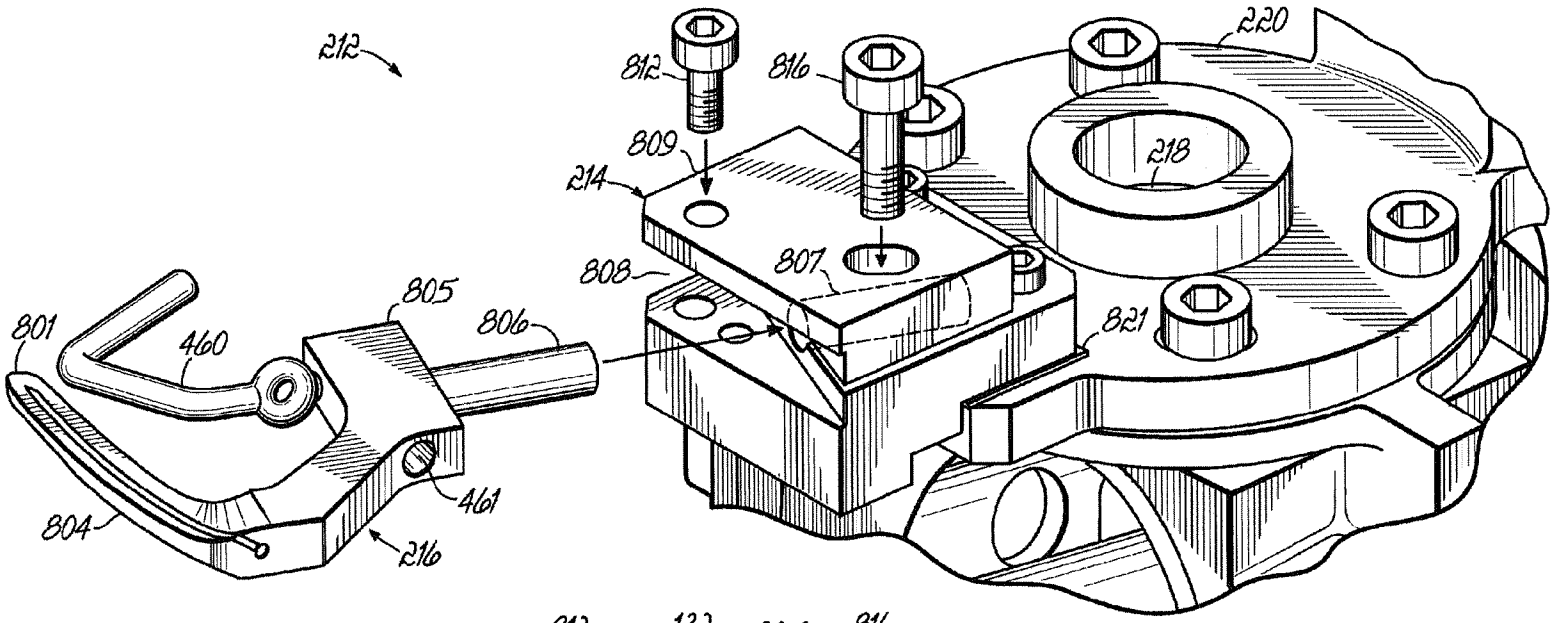
FIG. 4D is a disassembled perspective view of a looper holder and looper of the looper drive assembly of FIG. 4C.

As depicted in FIGS. 4C and 4D, a preferred embodiment of the looper 216 is formed of a solid piece of stainless steel having a hook portion 804 and a base portion 805. At the remote end of the hook portion 804 is the looper tip 801. The base portion 805 is a block from which the hooked portion 804 extends from the top thereof. The base portion 805 has a mounting peg 806 extending from the bottom thereof by which the looper 216 is pivotally mounted in a hole 807 in the holder 214.

Figure 4E:
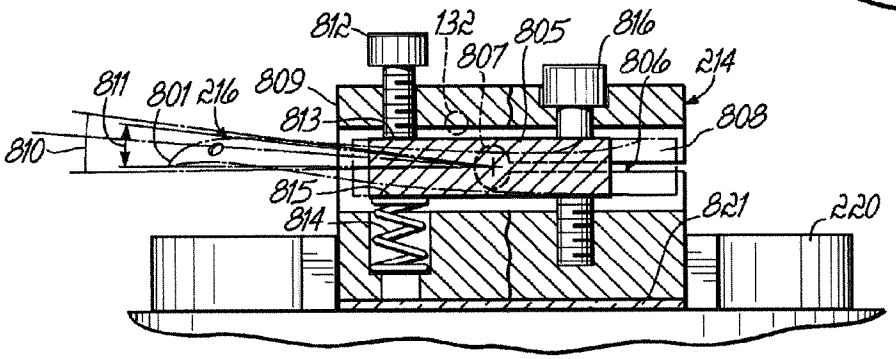
FIG. 4E is a cross-sectional view of the looper, in the direction indicated by the line 4E-4E in FIG. 4C.

The holder 214 is a forked block 809 formed of a solid piece of steel. The forked block 809 of the holder 214 has a slot 808 therein that is wider than the base portion 805 of the looper 218. The looper 216 mounts in the holder 214 by insertion of the base 805 into the slot 808 and the peg 806 into the hole 807. The looper 216 is loosely held in the holder 214 so that it pivots through a small angle 810 on the pin 806 with the body 805 moving in the slot 808 as illustrated in FIG. 4E. This allows the tip 801 of the looper 216 to move transversely a small distance, as is indicated by the arrow 811, which, though arcuate, is comparable to a straight transverse line, with the angle of the hook 804 of the looper 214 being relatively insignificant.

The adjustment is made by an allen-head screw 812 threaded in the holder 214 so as to abut against the base 805 of the looper 214 at a point 813 offset from the pin 806. A compression spring 814 bears against the looper body 805 at a point 815 opposite the screw 812 so that a tightening of the screw 812 causes a motion of the tip 801 of the looper 216 toward the needle 132 while a loosening of the screw 812 causes a movement of the tip 801 of the looper 216 away from the needle 132. A locking screw 816 is provided to lock the looper 216 in its position of adjustment in the holder 214 and to loosen the looper 216 for adjustment. The locking screw 816 effectively clamps the pin 806 in the hole 807 to hold it against rotation.

In practice, the looper 214 position is preferably adjusted so that the tip 801 is either barely in contact with the needle 132 or minimally spaced from the needle 132. In order to facilitate the attainment of such a position, an electrical indicator circuit 820 is provided, as diagrammatically illustrated in FIG. 4F. The circuit 820 includes the looper 216, which is mounted in the holder 214, which is, in turn, mounted through an electrical insulator 821 to the flange 220 on the shaft 218, as shown in FIG. 4D. The holder 214 is electrically connected to an LED or some other visual indicator 822, which is connected in series between the holder 214 and an electrical power supply or electrical signal source 823, which is connected to ground potential on the frame 11. The needle 132 is also connected to ground potential. As such, when the looper 216 is in contact with the needle 132, a circuit through the indicator 822 and power or signal source 833 is closed, activating the indicator 822.

An operator can adjust the looper 216 by adjusting the screw 812 back and forth such that the make-break contact point between the needle 132 and the looper 216 is found. Then the operator can leave the looper in that position or back off the setting one way or the other, as desired, and then lock the looper 216 in position by tightening the screw 816.

When looper adjustment is to be made, the machine 10 will be stopped with the needle in the 0 degree or top dead center position, whereupon the controller 19 advances the stitching elements to the loop-take-time position in the cycle (FIG. 4C), where the elements stop and the machine enters a safety lock mode in which an operator will make looper adjustments. After the needles and loopers are set, with input from the operator, the controller 19 of the machine 10 moves the looper and needle in a direction other than the direction to form a stitch. This is achieved by driving the needle and looper drive servos 67 and 69 in reverse to rotate the needle drive shafts 32 and looper drives 37 backward to move the looper and needle backwards in their cycles, thereby returning the needle to its 0 degree position. This prevents the forming of a stitch, which is desirable because looper adjustment is often best made between patterns. By preventing stitch formation, looper adjustment can be made anywhere along a stitch line, whether or not it is desired to continue sewing along a line or path. Further, the condition that holds the trimmed looper thread and wiped top thread, as explained in connection with FIGS. 5-5D below, in describing the trimmed thread condition, is preserved.

Figure 5Y:
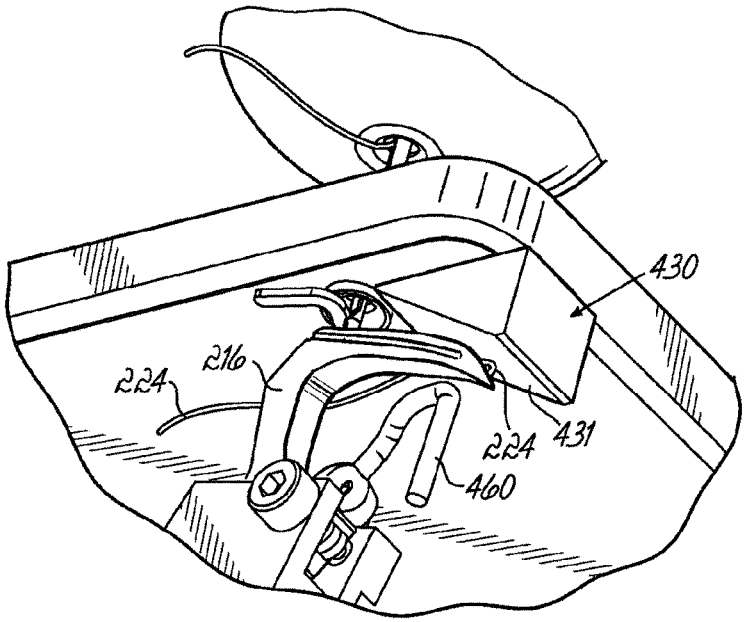
FIG. 5Y is a diagram illustrating a looper thread deflector according to an embodiment of the invention.
Figure 5:
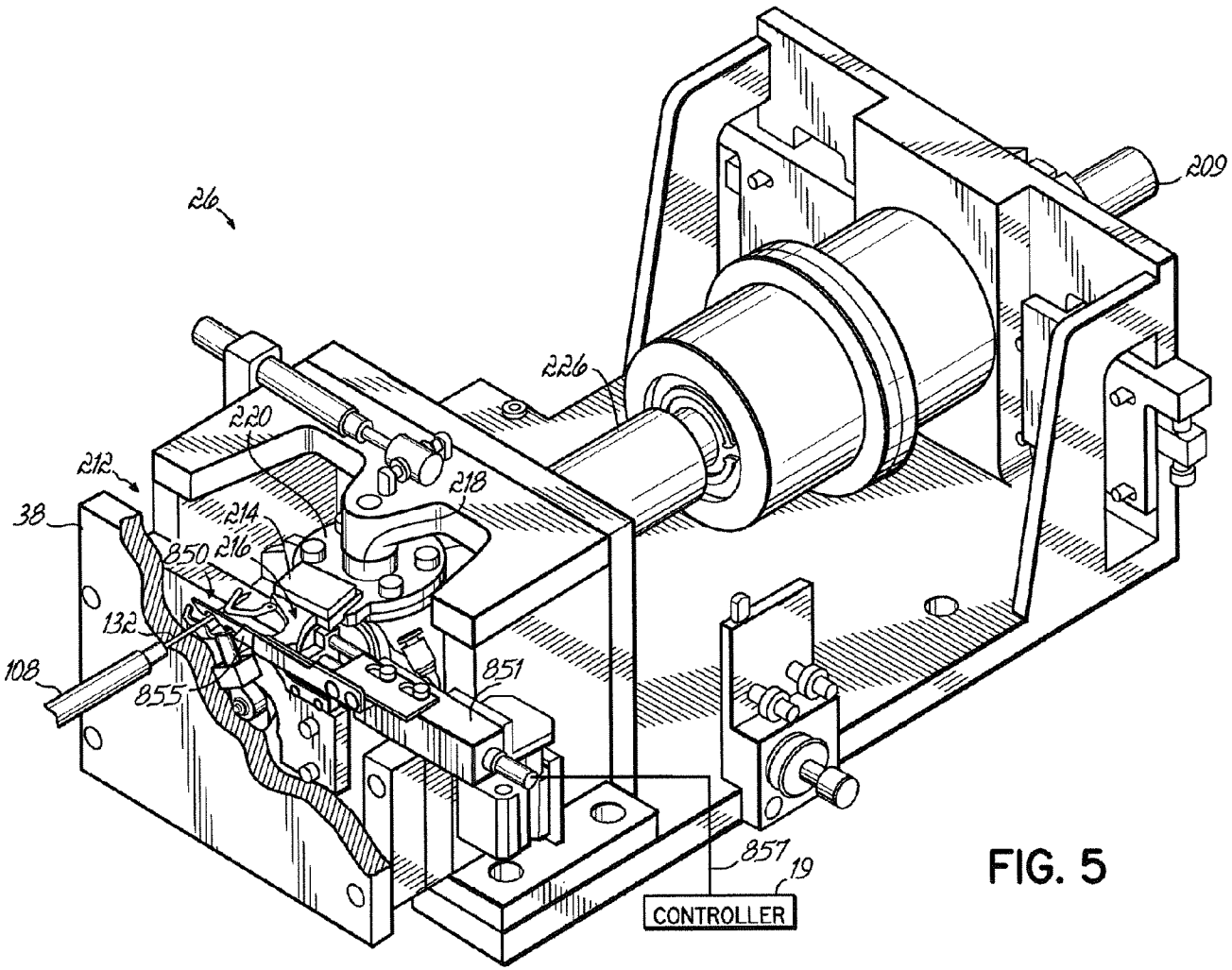
FIG. 5 is a perspective diagram illustrating the use of one of a plurality of thread cutting devices as it is configured on each of a corresponding plurality of looper heads of a multi-needle quilting machine according to principles of the present invention.

Single needle sewing machines have employed a variety of thread cutting devices. Such a device 850 is illustrated in FIG. 5. It includes a reciprocating linear actuator 851, which may be pneumatic. A double barbed cutting knife 852 is mounted to slide on the actuator 851, which withdraws linearly toward the actuator 851 when it is actuated. The actuator 851 is, in turn, mounted on a sliding block 858 (not shown in FIG. 5; shown in embodiment of FIG. 2C) which moves the actuator 851 and related assembly toward and away from the needle hole in the needle plate 38, to a position it occupies when the cutting device is actuated and back to a rest position out of the way of the looper 216. The knife 852 has a needle thread barb 854 and a looper thread barb 853, each of which hooks the respective top and bottom threads when the actuator 851 is actuated. The barbs 853 and 854 both have cutting edges thereon to thereupon cut the respective threads. A stationary sheath member 855 is fixed to the actuator 851, which has surfaces configured to cooperate with the sliding knife 852 to sever the threads. In doing so, the knife 852 is stopped in a retracted position which allows the tail of the needle thread to be released but keeps the bottom thread tail clamped between the knife 852 and a spring metal clamp 856 fixed to the bottom of the sheath member 855. This clamping prevents unthreading of the looper, which can be close to the cutoff position, whereby the looper thread tail may be very short. FIGS. 5-5D illustrate the assembly in a machine having the needles oriented vertically. In the machine 10, however, the needle 132 is oriented horizontally, perpendicular to the vertical material plane 16, while the looper 216 is oriented to oscillate in a transverse-horizontal direction, parallel to the plane 16, with the tip 801 of the looper 216 pointing toward the left side of the machine 10 (viewed from the front as in FIG. 1).

Figure 5A:
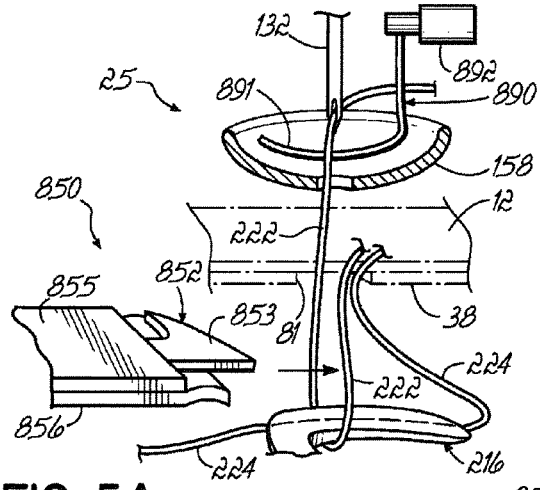
FIG. 5A is a diagram illustrating the respective position of the needle and looper and the needle and looper threads at the end of a series of stitches, in relation to a thread cutting device.

FIG. 5A shows the looper drive assembly 26 of a type of multi-needle quilting machine 10 in which the needles are oriented horizontally. At the end of the sewing of a chain of stitches that constitutes a discrete pattern or pattern component, the needle 132 and looper 216 typically stop in a position as illustrated in FIG. 5A in which the needle 132 is withdrawn from the material on the needle side of the fabric 12 being quilted. At this point in the stitching cycle, a needle thread 222 and a looper thread 224 are present on the looper side of the material 12 being quilted. The needle thread 222 extends from the material 12 down around the looper hook 804 of the looper 218 and returns to the fabric 12, while the looper thread 224 extends from a thread supply 856, through the looper hook 804 and out a hole in the tip 801 of the looper 216, and into the material 12.

On the looper side of the material 12, at each of a plurality of the looper heads 26, is positioned one of the cutting devices 850, each having an actuator 851 thereof equipped with a pneumatic control line 857 connected through appropriate interfaces (not shown) to an output of a quilting machine controller 19. The individual thread cutting device 850 per se is a thread cutting device used in the prior art in single needle sewing machines.

Figure 5B:
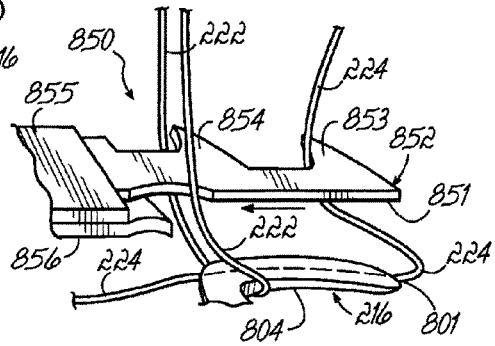
FIGS. 5B and 5C are diagrams illustrating steps in the thread cutting operation.
Figure 5C:
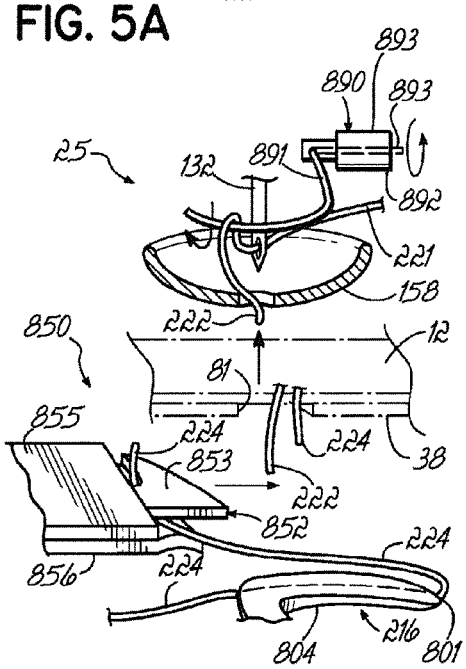
Figure 5D:
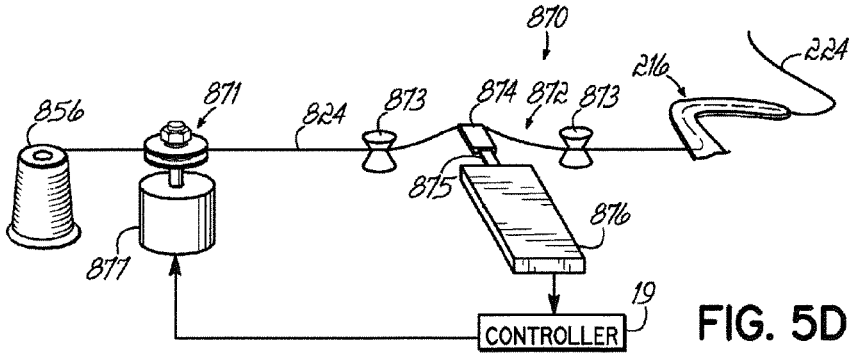
FIG. 5D is a diagram of a thread tension measuring circuit according to certain aspects of the present invention.

In accordance with the present invention, a plurality of the devices 850 are employed in a multi-needle quilting machine in the manner described herein. Referring to FIGS. 5 and 5A, on each looper assembly 26 of a multi-needle chain stitch quilting machine, a device 850 is positioned so that, when extended, the knife 852 of the device 850 extends between the looper 216 and the material 12, and is connected to operate under computer control of the controller 19 of the quilting machine. When at a point in the cycle at which the thread may be cut, as illustrated in FIG. 5A, the controller 19 actuates the actuator 851, which moves the knife 852 through the loop of the needle thread 222 such that it hooks the needle and looper threads, as illustrated in FIG. 5B. Then the knife 852 retracts to cut the needle thread 222 and the looper thread 224 extending from the material 12. Both cut ends of the needle thread 222 are released, as is the cut end of the looper thread 224 that extends to the material. However, the end of the looper thread 224 that extends to the looper 216 remains clamped, as illustrated in FIG. 5C. This clamping holds the looper thread end so that a loop is formed when sewing resumes, thereby preventing the loss of an unpredictable number of stitches before the chaining of the threads begins, which would cause defects in the stitched pattern.

As additional insurance in avoiding lost stitches at the beginning of sewing, the looper is oriented such that, should the end of the looper thread 224 fail to clamp, the end of the thread 224 will be oriented by gravity on the correct side of the needle so that the series of stitches will begin. In this way, the probability that the loops will take within the first few stitches that constitute the tack stitches sewn and the beginning of a pattern is high.

The above thread trimming feature is particularly useful for multi-needle quilting machines having selectively operable heads or heads that can be individually and separately installed, removed or rearranged on a sewing bridge. The individual cutting devices 850 are provided with each looper head assembly and are removable, installable and movable with each of the looper head assemblies. In addition, where the heads are selectively operable, the feature provides that each thread cutting device is separately controllable.

To supplement the thread trimming feature, a thread tail wiper 890 is provided on the needle head assembly 25. As further illustrated in FIG. 5C, the wiper 890 includes a wire hook wiping element 891 that is pivotally mounted on a pneumatic actuator 892 adjacent the needle 132 to rotate the wiping element 891, after the needle thread 221 is cut, about a horizontal axis that is perpendicular to the needle 132. When actuated, the actuator 892 sweeps the wiping element 891 around the tip of the needle 132 on the inside of the presser foot bowl 158 to pull the tail of the needle thread 221 from the material 12 to the needle side of the material 12 and to the inside of the presser foot bowl 158. From this position, upon startup of sewing, the top thread will not be clamped under the presser foot, so the thread tail will typically be readily tucked to the back of the material 12 when the needle first descends at the start of a pattern.

FIG. 5D illustrates a thread tension control system 870 that can similarly be applied to individual threads of sewing machines, and which is particularly suitable for each of the individual threads of a multi-needle quilting machine as described above. A thread, for example, a looper thread 224, typically extends from a thread supply 856 and through a thread tensioning device 871, which applies friction to the thread and thereby tensions the thread moving downstream, for example, to a looper 216. The device 871 is adjustable to control the tension on the thread 224. The system 870 includes a thread tension monitor 872 through which the thread 224 extends between the tensioner 871 and the looper 216. The monitor 872 includes a pair of fixed thread guides 873, between which the thread is urged and deflected transversely by a sensor 874 on an actuating arm 875 supported on a transverse force transducer 876, which measures the transverse force exerted on the sensor 874 by the tensioned thread 224 to produce a thread tension measurement. Each of the threads 222 and 224 is provided with such a thread tension control.

A thread tension signal is output by the transducer 876 and communicated to the controller 19. The controller 19 determines whether the tension in the thread 224 is appropriate, or whether it is too loose or too tight. The thread tensioner 871 is provided with a motor or other actuator 877, which performs the tension adjustment. The actuator 877 is responsive to a signal from the controller 19. When the controller 19 determines from the tension measurement signal from the transducer 876 that the tension in thread 224 should be adjusted, the controller 19 sends a control signal to the actuator 877, in response to which the actuator 877 causes the tensioner 871 to adjust the tension of the thread 224.

In lieu of the use of a thread tail wiper 890, as illustrated in FIG. 5C, or other mechanism for pulling the cut top thread free after being cut and before resuming sewing at a new location, a machine control sequence may be executed that will achieve the results of the thread tail wiping function. FIG. 5E illustrates the state of the top thread 222 immediately after a tack stitch sequence is performed at the end of the sewing of a pattern component, before threads have been cut. The top thread 222 is shown extending from a top-thread supply 401, through a top-thread tensioner 402 to the eye of the needle, which is operated by an actuator 403 controlled by an output of the controller 19, to the needle 132. Between the tensioner 402 and the needle 132, the top thread 222 passes through a pull-off mechanism 404 that includes a pusher 405 driven by an actuator 406 that is also controlled by an output of the controller 19. In FIG. 5E, the pusher 405 is shown in solid lines in its retracted position. When the actuator 406 is actuated, the pusher 405 moves to its extended position 407, illustrated by a broken line, to pull the top thread to the position also illustrated by a broken line. A top-thread pull-off is executed by the controller 19 sending a signal to the actuator 403 of the top-thread tensioner 402 to release tension on the top thread 222 for a short interval of time during which the thread pull-off mechanism 404 is pulsed. The pulsing of the thread pull-off mechanism 404 results from a signal from the controller 19 to the actuator 406 of the pull-off mechanism 404 which causes the pusher 405 to deflect the top thread 222 so as to pull off a length of slack top thread from the top-thread supply 401. Alternatively, the needle 132 can be caused to move a short distance of roughly a few inches relative to the material 12 to pull the length of slack in the top thread to pull through the needle 132 to add a length of thread tail between the needle 132 and the material 12. This relative movement can be brought about by advancing the web 12 or by moving bridges 21, 22 or both.

Figure 5F:
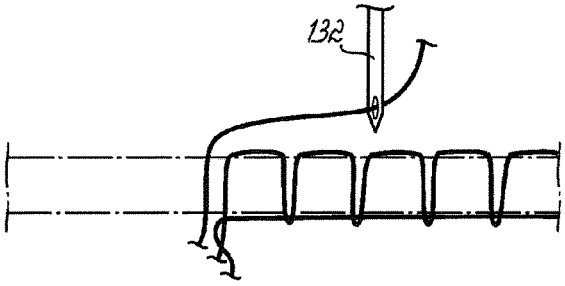
FIGS. 5E-5J are diagrams illustrating thread handling features including thread tail wipe and tuck cycles according to certain embodiments of the invention.
Figure 5G:
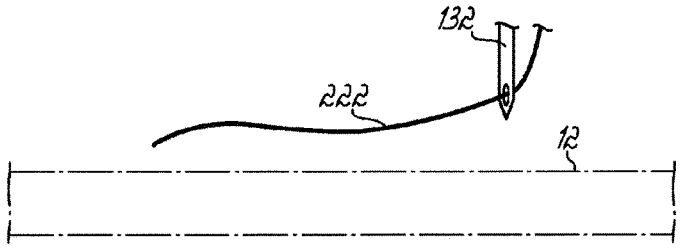

After the top thread 222 has been pulled off as described above, the threads 222 and 224 are cut and the looper thread is clamped as described above in connection with FIG. 5C. In this embodiment, the wiper mechanism 890, however, need not be present. Instead, a wiping motion may be employed. At this point in the procedure, the top-thread tail extends from the needle 132 down through the material 12 to below the material to the position at which it was cut, as illustrated in FIG. 5F, and thread tension has been reapplied to the top thread. Then, the needle 132 is advanced to a new starting position 410 relative to the material 12, that is, either the bridges or the material or both can be moved, bringing the thread to the top of the material for the resumption of sewing as illustrated in FIG. 5G.

Figure 5H:
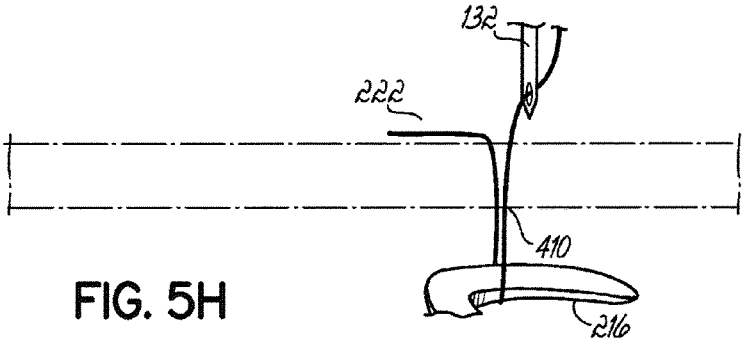
Figure 5I:
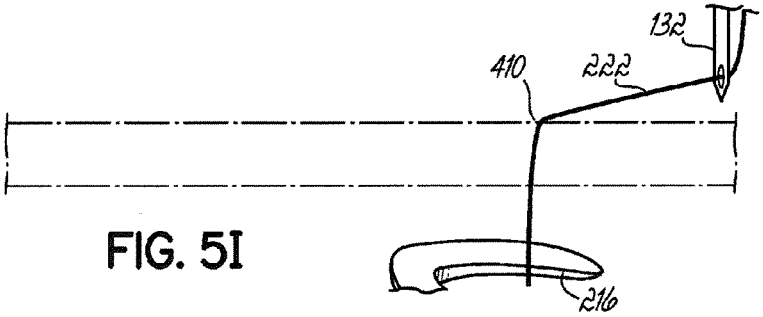

Then, whether or not wiper 890 has been employed prior to this point, a top-thread tuck cycle is executed in which the sewing heads are operated through one stitch cycle, which pokes the top-thread tail through the material 12 to below the material 12, where it is caught by the looper 216, as illustrated in FIG. 5H. Then, with the tension of the top thread 222 having been previously applied by actuation of the tensioner 402, the needle 132 is moved in a thread wipe motion relative to the material 12, away from and back to the starting position 410 where the thread penetrated the material 12 as illustrated in FIG. 5I. For this motion, the controller 19 selects the direction by interpreting the pattern to be sewn. This motion is enough to pull the remaining top-thread tail to the bottom or looper side of the material 12 without pulling the tail again out of the material. The length of this motion may be different for different applications.

The motion path may be, for example, a line, an arc, a triangle a combination of a line and an arc or some other motion or combination that takes the needle about two inches more or less from the position 410. A different path length may be used depending on the length of the thread tail that the machine is designed or programmed to cut. The path is preferably oriented so that any slack in the top thread produced at the needle 132 lies on a side of the pattern path that avoids the thread being caught in the sewing pattern or being struck by the needle 132. With the machine 10, this motion is preferably implemented by holding the material 12 stationary and moving the bridges 21, 22 in the path parallel to the plane of the material 12. At the end of the tuck cycle, the machine is in the position shown in FIG. 5J.

Figure 5J:
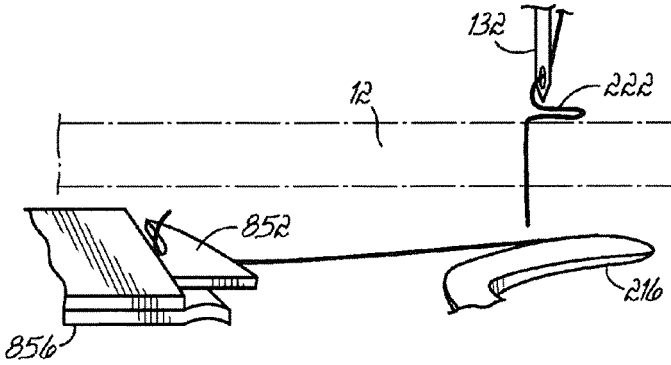
Figure 5K:
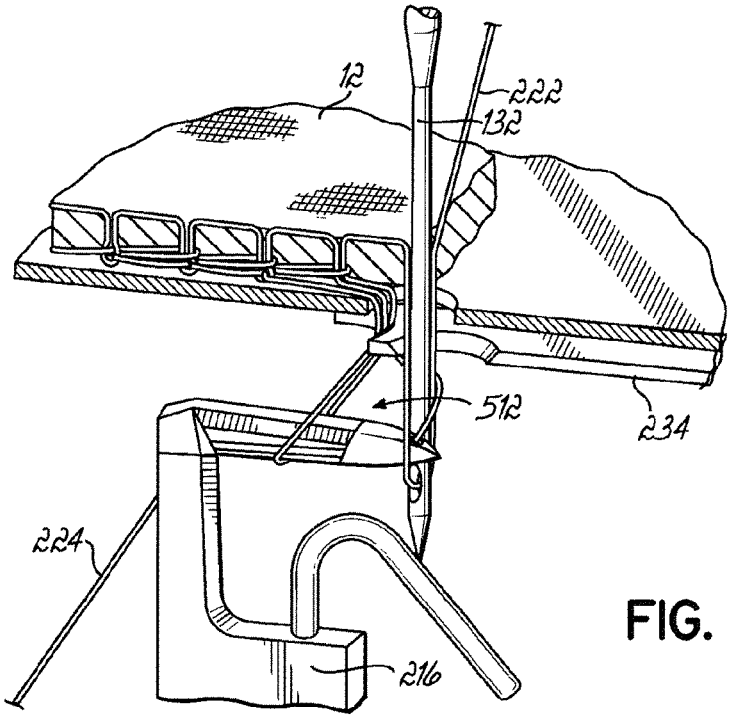
FIGS. 5K-5X are diagrams illustrating stitching element motions of stitching sequences according to certain embodiments of the invention.

The start of a pattern requires that the sewing elements, the needle 132 and the looper 216, cooperate such that the needle thread 222 and looper thread 224 alternately pick up loops formed by the other thread to star, the formation of stitches of the chain. When a stitch cycle is executed in the middle of a sewing sequence, that is, once the chain has begun, the needle 132 descends through the material 12 to pick up a loop 412, sometimes referred to as the triangle, formed between the looper 216, the top thread 222 and the looper thread 224, the formation of which loop is facilitated by the action of the retainer or spreader 234, us illustrated in FIG. 5K. (See FIG. 5F of U.S. Pat. No. 5,154,130 for a more complete explanation. FIGS. 5A-5G of that patent are sequential illustrations of a normal chain-stitch forming cycle.) However, with the threads not yet set in the material 12, the looper thread 224 terminates below the needle plate 38 and below the retainer 234. Specifically, the looper thread 224 is clamped between the cutting knife 852 and the spring clamp 856 (FIG. 5J). Therefore, the triangle 412 does not yet exist in its normal form and the catching of this loop by the needle 132 is not necessarily completely predictable. As a result, there is an increased likelihood that the first stitch will be missed. More importantly, there is an unacceptable probability that each subsequent stitch will be missed until some indeterminate number of stitch cycles later when the first stitch is formed. This can result in a flawed product or wasted product and can require repair or a scrapping of the product.

It has been found that stitch-forming reliability when starting to sew a pattern is greatly improved by manipulating the threads so that the looper picks up the loop of the top thread before the needle picks up the loop of the bottom thread. This can be achieved by redirecting the tail of the looper thread. More reliably, this can also be achieved by altering the timing of the stitching elements relative to each other, that is, the timing of the needles relative to the timing of the loopers, so that the first loop taken is the loop of the top thread, which is taken by the advancing looper. This, in turn, can be carried out by so manipulating the threads or timing the stitching elements so that the needle misses the bottom thread loop on the first descent of the needle. One way that this can be caused to happen is by insuring that the needle passes on the "wrong" side of the bottom thread on the first descent of the needle. The bottom thread is on the "wrong" side of the needle when the looper thread tail extends from the tip of the looper back along the looper side of the needle.

Figure 5L:
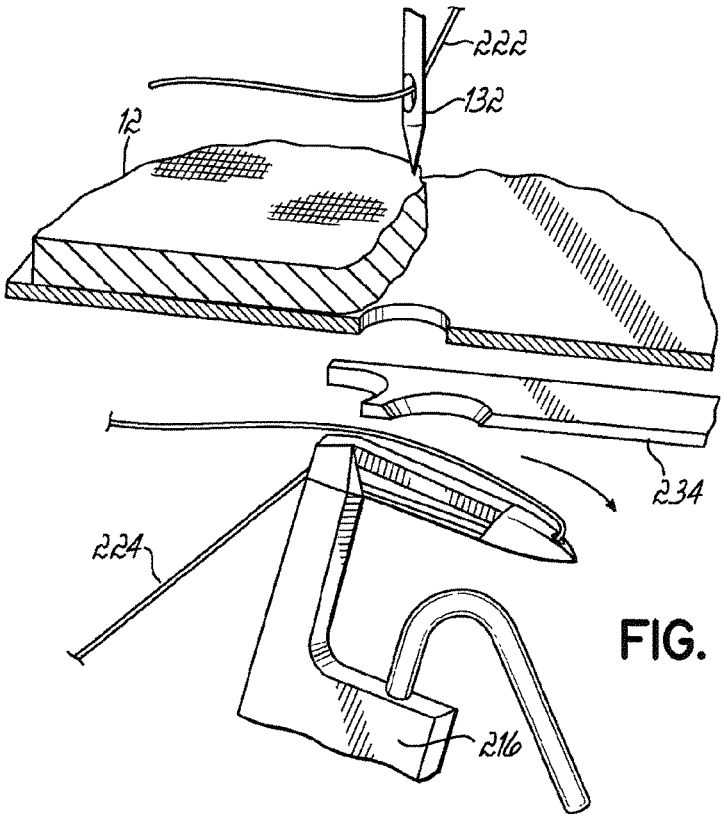
Figure 5M:
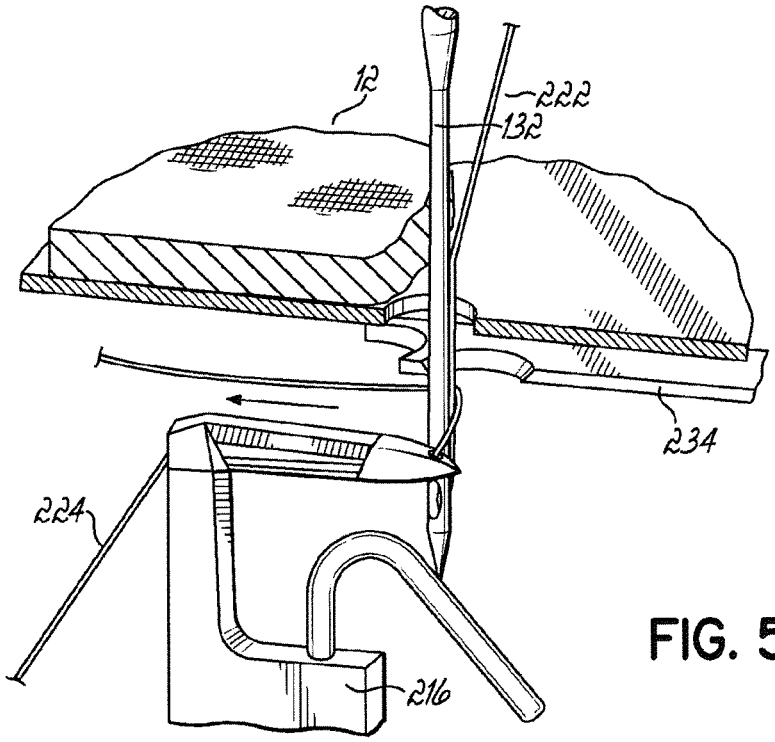
Figure 5N:
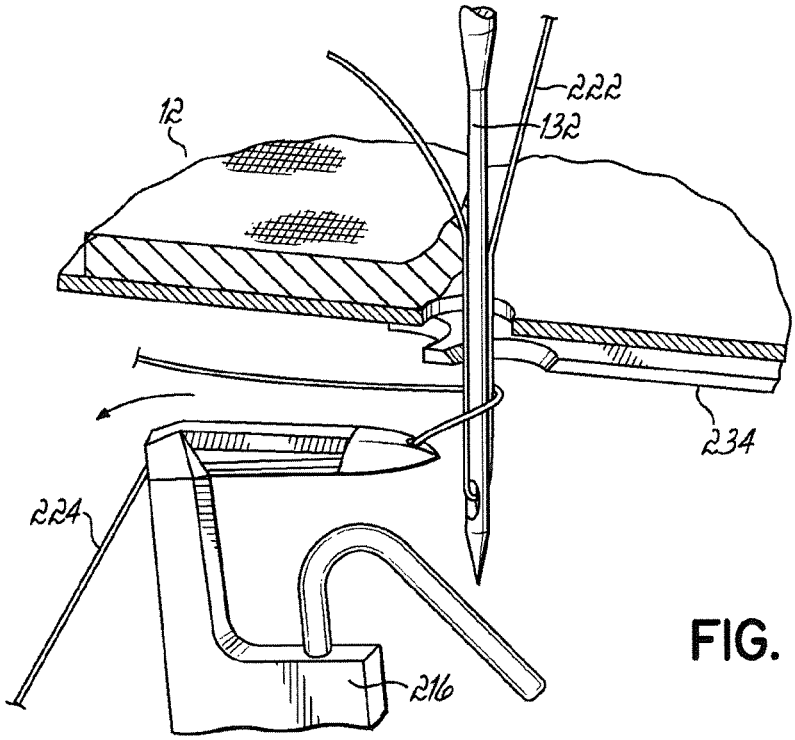
Figure 5O:
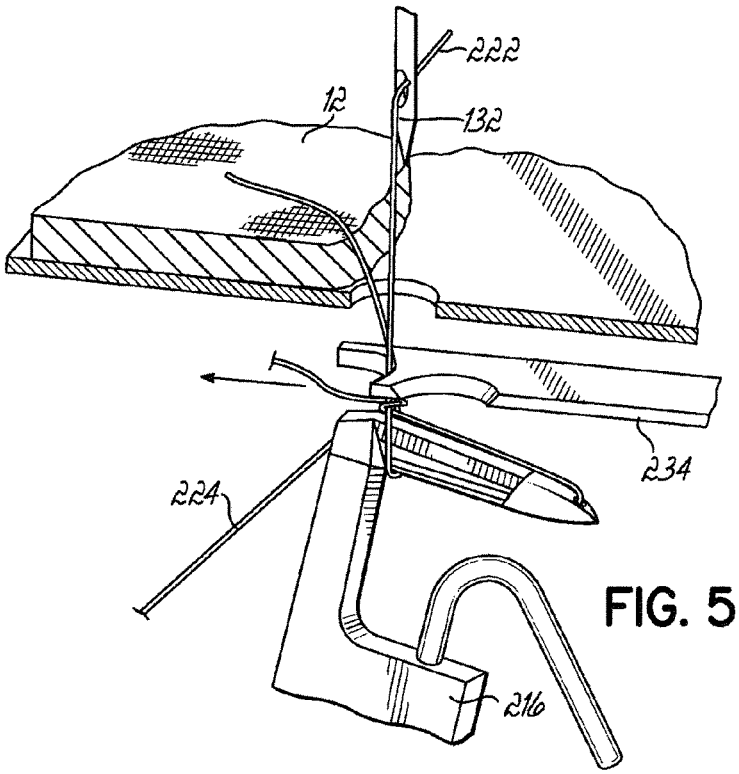

Before the start of sewing, after the needle 132 is moved to a new position relative to the material 12, the needle 132 is above the material 12 with the top thread 222 extending through the eye of the needle 132 from the thread spool to the thread tail. In a normal stitch cycle, the needle 132 would start above the material, as shown in FIG. 5L, with the looper 216 advanced as shown. The tail of the looper thread 224 is below the needle plate 38 and below the retainer 234. In conventional start up, the looper 216 would retract as the needle 132 descended, probably, but not necessarily, passing between the bottom thread 224 and the looper 216, as illustrated in FIG. 5M, taking the bottom thread loop, as illustrated in FIG. 5N. This results in the looper thread 224 wrapping the needle thread 222 close to the looper 216 below the retainer 234, as illustrated in FIG. 5O, resulting in a distorted triangle that increases the likelihood that the needle 132 will miss the loop on its next descent.

Each sewing head, including each needle head and each looper head, may be linked to a common rotary drive through an independently controllable clutch that can be operated by a machine controller to turn the heads on or off, thereby providing pattern flexibility. The heads may be configured in sewing-element pairs, each needle head being modular with a corresponding similarly modular looper head. While the heads of each pair can be individually turned on or off, they are typically turned on and off together, either simultaneously or at different phases in their cycles, as may be most desirable. Alternatively, only the needle heads may be provided with selective drive linkages, while the looper heads may be linked to the output of a needle drive motor so as to run continuously, since they do not penetrate the material and do not form stitches when the needles are not operating. The looper linkage may be direct and permanent, or may be adjustable, switchable or capable of being phased in relation to the needle drive. For example, the looper drive may be coupled to the needle drive by providing a differential drive mechanism in the looper drive train. When direct drive is employed, the looper head drive may be linked to an input drive shaft through a gear box, rather than a clutch. Each of the looper heads may be further provided with an alignment disk on the looper drive shaft to allow precise phase setting of each looper head relative to the other looper heads or the needle drive when the looper head is installed in the machine. Further, each looper head housing may be provided with adjustments in two dimensions in a plane perpendicular to the needle to facilitate alignment of the looper head with a corresponding needle head upon looper head installation.

In order to reduce the likelihood of missed stitches, particularly at startup of a pattern following the cutting of the looper thread, a split-start control method is provided for avoiding missed stitches at startup. A split start method is one use of the feature that allows the needle and looper drives to be decoupled and moved separately. With the split start feature, the initial motion of the needle and looper proceed separately upon startup so as to render the pickup of the stitches predictable. This is achieved by insuring that the looper picks up the top-thread loop before the needle picks up the bottom thread loop triangle.

With the split start method, with the mechanism stopped so that the needle near its top dead center position in its cycle and the needles and loopers locked and in phase, the elements are then unlocked so the looper can be moved independently of the needle, for example, to be advanced in its cycle, for example, by 180 degrees. Then the needle can be advanced 180 degrees relative to the looper position to bring the needle in phase with the looper, insuring that the needle will miss the looper thread triangle or loop in the looper thread at the beginning of the initial cycle. Then the elements can be relocked in phase. Upon further advancing of the elements, the looper will thereupon pick up the needle thread loop before a looper thread loop is picked up by the needle, producing a predictable start to the stitch sequence.

Figure 5P:
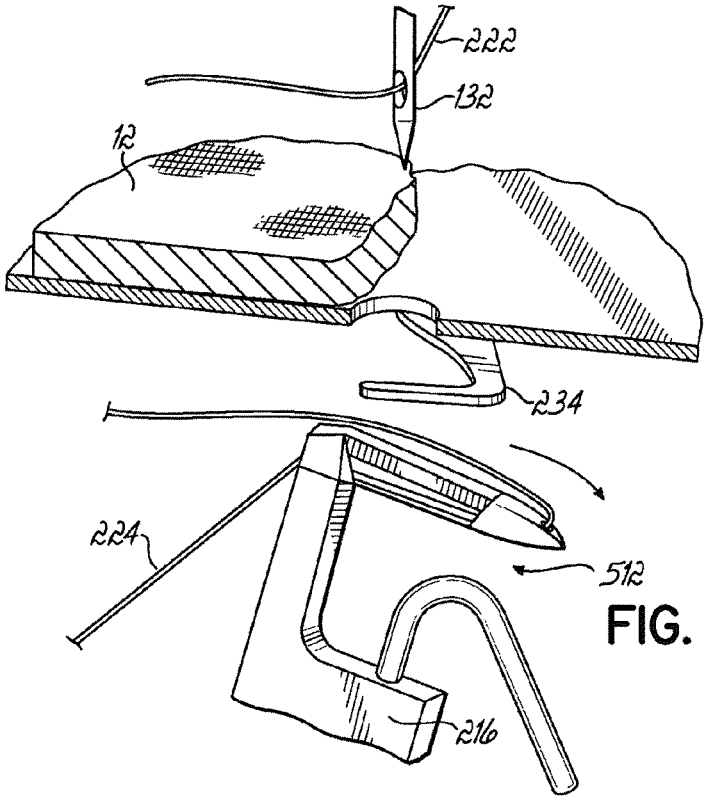
Figure 5Q:
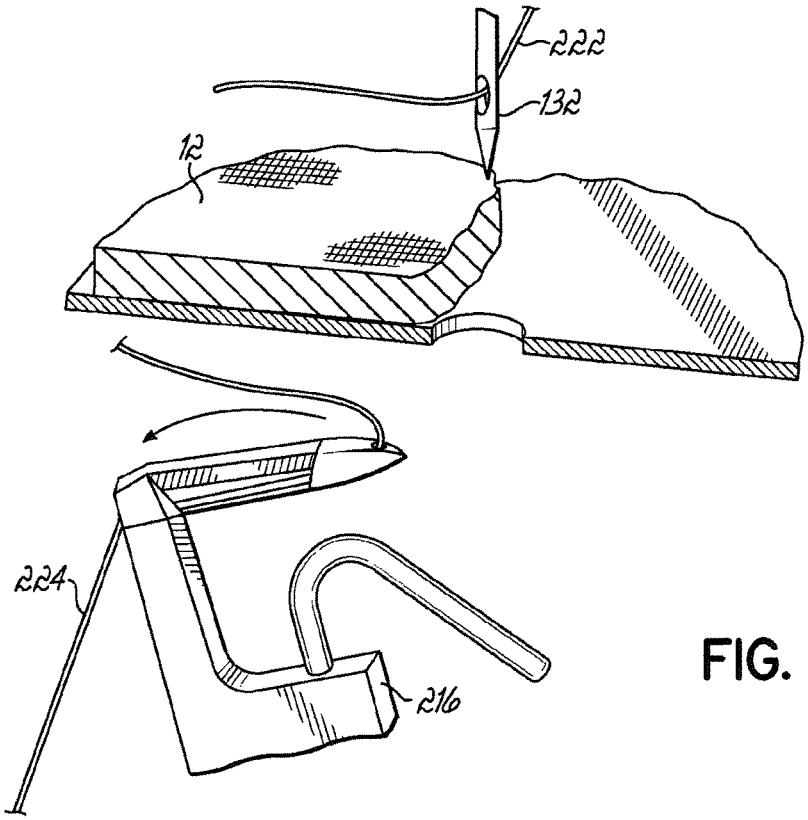
Figure 5R:
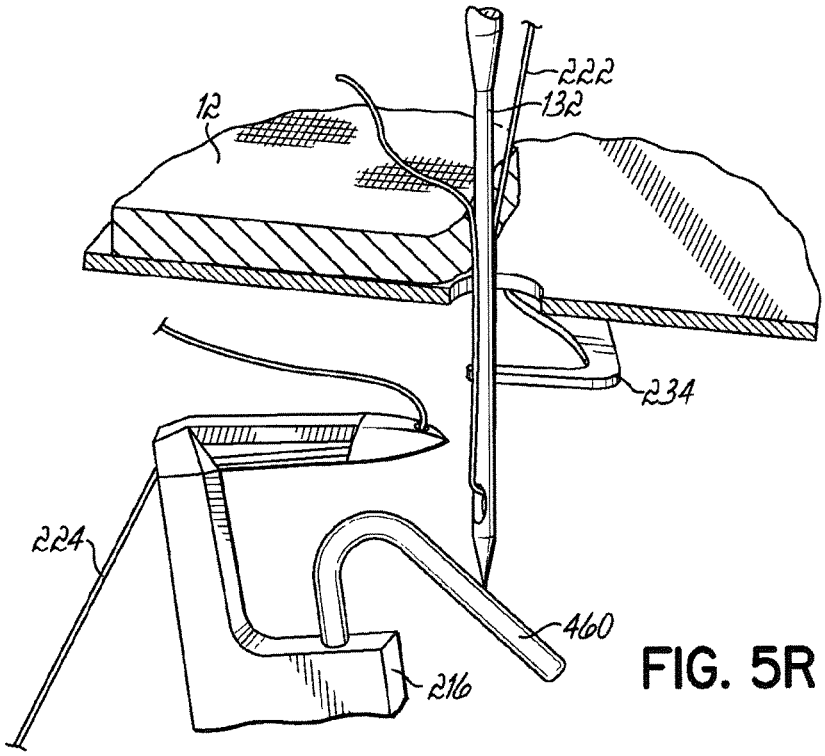
Figure 5S:
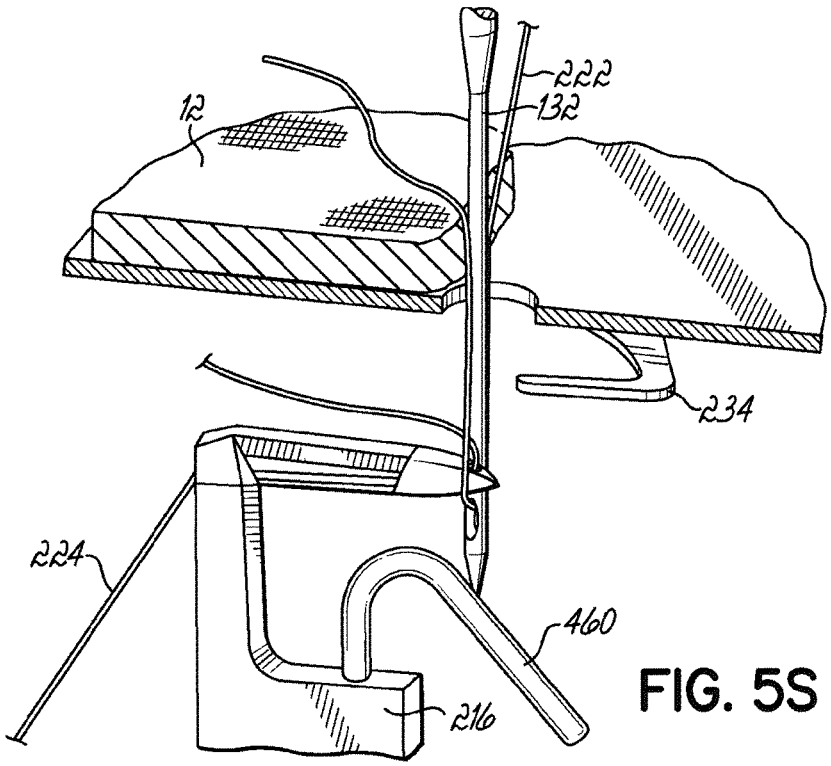
Figure 5T:
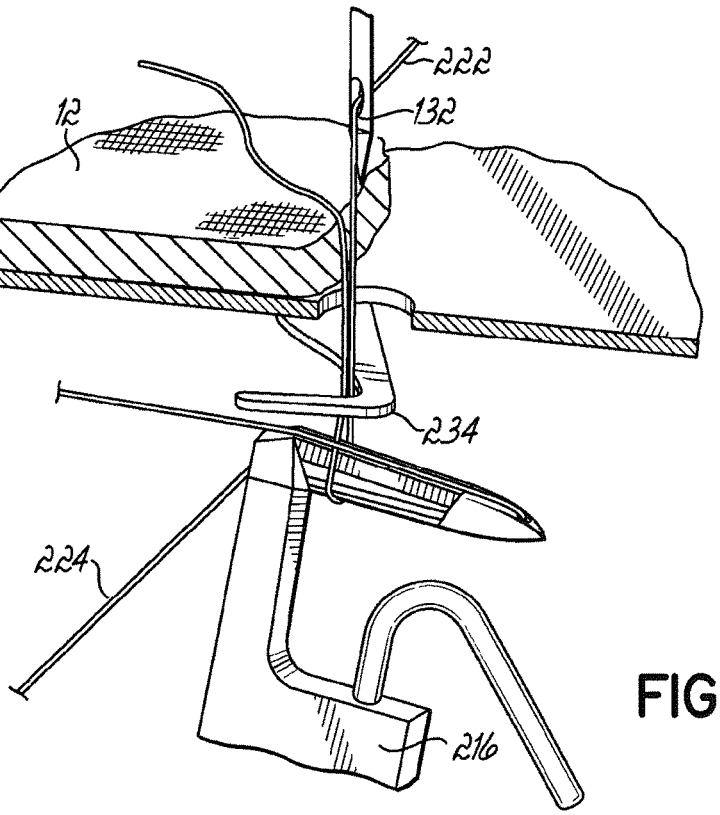
Figure 5U:
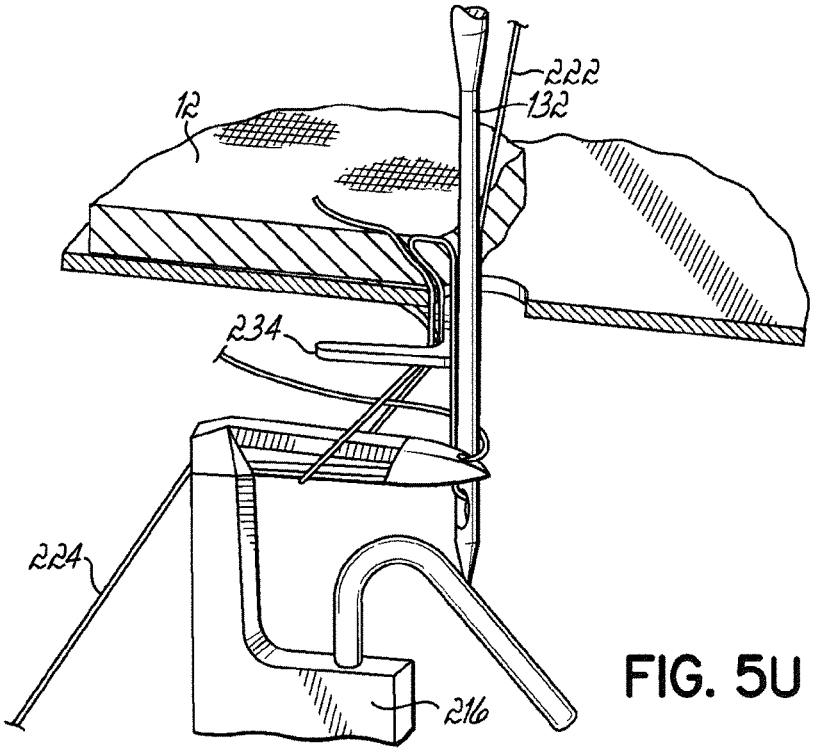
Figure 5V:
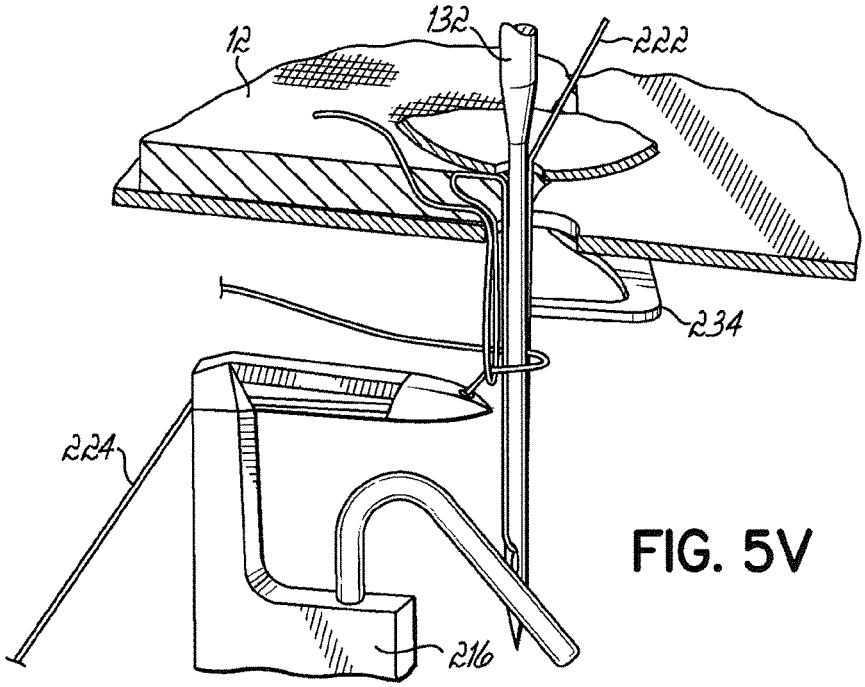
Figure 5W:
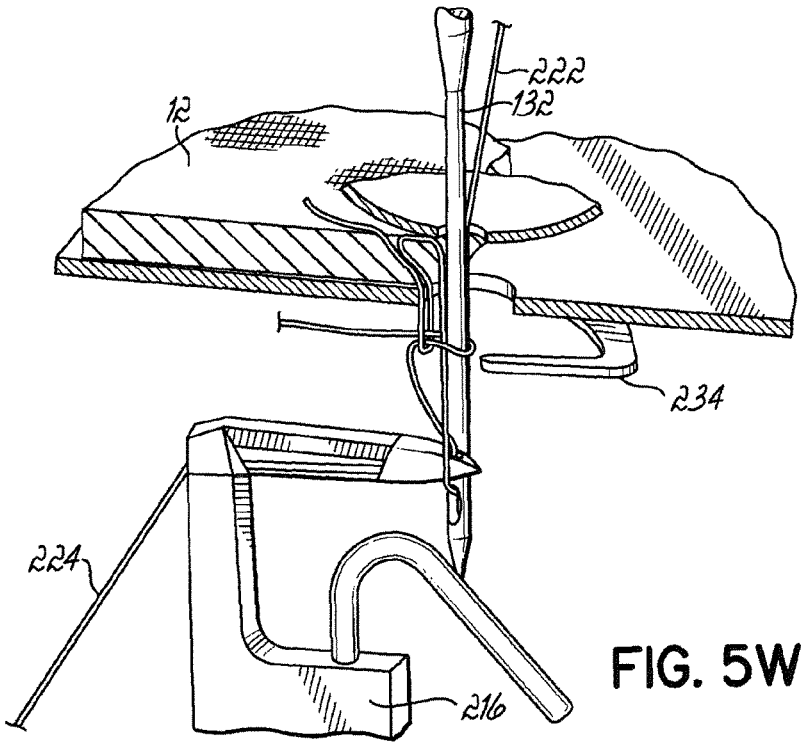
Figure 5X:
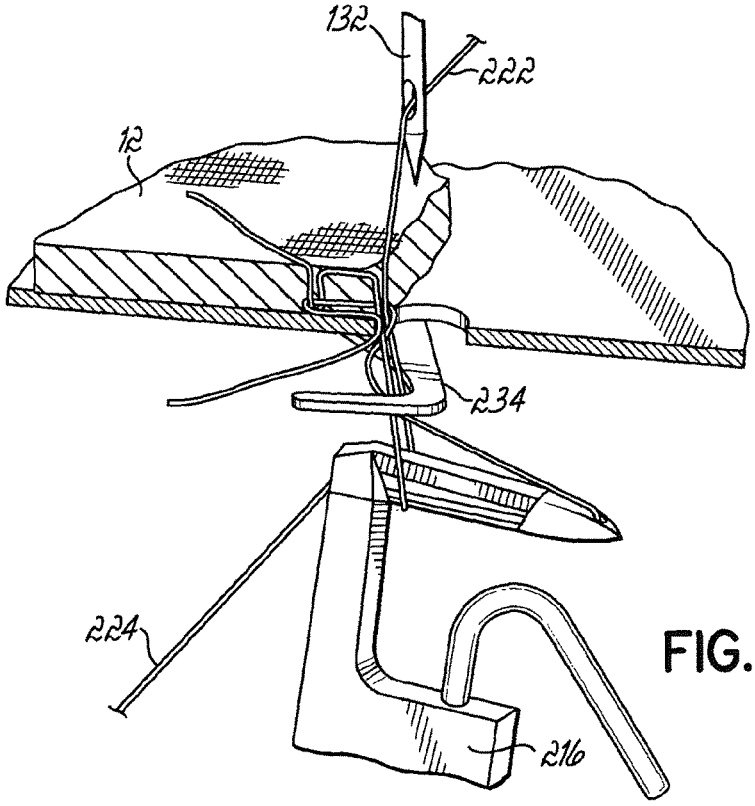

According to one embodiment of the invention, the needle and looper drives are decoupled when at the starting position of FIG. 5P, which is similar to that of FIG. 5L, and the needle is held in its top dead center position. The looper drive is then advanced one-half cycle, to move the looper 216 to the position illustrated in FIG. 5Q, thereby retracting the looper 216 out of the path of the needle 132. Then the looper drive is held in its half cycle position while the needle drive is activated to lower the needle 132 to its half cycle position, which leaves the needle 132 clear of the bottom thread 224, as illustrated in FIG. 5R. Then the needle and looper drives are again coupled together and advanced together in synchronization, whereupon the looper 216 begins to take up the needle loop in approximately the three-quarter position of the stitch cycle, as illustrated in FIG. 5S, and proceeds from there to the full cycle position as illustrated in FIG. 5T. Then the elements continue to move through the next cycle, where the formation of stitches can be seen, as illustrated in FIGS. 5U through 5X. Approximately by the position in FIG. 5X, the looper thread tail will have pulled itself from the clamping action of the thread trimmer.

The splitting of the needle and looper drive upon startup, as described, avoids the missing of stitches upon startup. The splitting of the needle and looper drive cycles has other uses, such as in facilitating thread trimming.

As an alternative to the use of the split start method described above, the likelihood of missed stitches at startup can be reduced by redirecting or guiding the thread tail of the looper thread so as to prevent the bottom thread loop from being picked up by the needle before the top-thread loop is picked up by the looper. Such redirection may be achieved by a shifting or other positioning of the thread trimmer and clamp 850 (FIG. 5J) to move the tail of the looper thread 224 away from the needle side of the looper 216. The use of a thread-pusher mechanism or other looper thread redirecting technique can be used to cause the looper to pick up the top-thread loop before the needle picks up the bottom thread loop.

Another phenomenon that increases the probability for missed stitches on startup is the fact that the spreader or retainer 234 is not able to form the triangle with the looper thread 224 until the looper thread 224 is drawn toward the needle plate 34 and the material 12. The looper thread 234 being clamped by the thread trimmer 850 is held out of reach of the retainer 234. Before sewing starts, it is possible that considerable looper thread slack develops in the looper thread tail between the looper 216 and the clamp position at the thread trimmer 850. Such slack can form a large loop that swings to the opposite side of the looper from the needle, reducing the likelihood of a stitch being picked up in any given cycle, even after the first descent of the needle, thereby delaying unpredictably the start of a stitch chain. Such delay can result in an unacceptably long gap in the sewn pattern, requiring repair or scrapping of a panel. The likelihood of such problems resulting from this looper thread slack can be reduced by confining the looper thread. This confinement can be achieved by providing a looper thread deflector 430 below the needle plate 38, as illustrated in FIG. 5Y. Structure such as a thread deflector 430 can be placed to control the direction of the tail of looper thread 224 leaving the looper 216 upon start-up and to affect the spacing the looper thread tail and the looper in such a way that the needle 132 does not miss the looper thread loop after the looper has taken the needle thread loop. Such structure as the looper thread deflector 430 improve the reliability of stitch formation whether or not split start techniques are employed. In some cases, the improved reliability is enough to allow the split start feature to be omitted.

The looper thread deflector 430 illustrated in FIG. 5Y is in the shape of a wedge and is secured to the bottom of the needle plate 38. The wedge of the deflector 430 has a tapered surface 431 that is positioned close to the path of the tip of the looper 216 when the looper advances to its forward position near the zero degree or needle up position as illustrated in FIG. 5P. In this position, upon starting a pattern, the looper thread tail is clamped at the thread cut off 850 at the opposite side of the needle path. The surface 431 of the deflector 430 is positioned relative to the path of the looper to guide the looper thread tail away from the needle plate enough so that, once the looper has picked up the needle thread loop, the looper thread 224 is highly likely to be on the needle side of the looper 216 so that the descending needle 132 picks up a looper thread loop on its next descent. The looper thread deflector 430 contributes to reducing the missed stitches on startup when the split start method described above is not used or not available.

FIG. 5Y also illustrates a conventional needle guard 460, mounted to the base portion 805 of the looper 216, as better illustrated in FIG. 4D. This needle guard can be adjusted by pivoting it on the looper 216, where it can be locked in position by a set screw (not shown) in hole 461 in FIG. 4D. This needle guard 460 keeps the descending needle 132 from deflecting to the right of the advancing looper 216, keeping it to the left of the looper, as illustrated in FIGS. 5R and 5S, so that the looper 216 picks up the loop and does not skip the stitch.

Figure 4G:
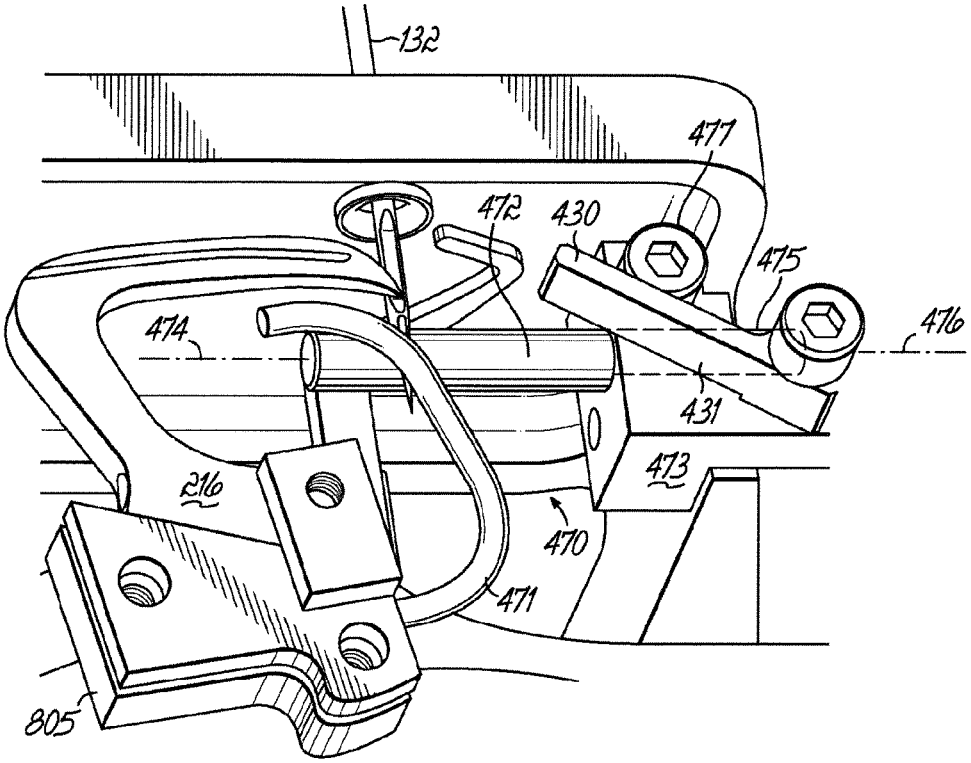
FIG. 4G is a diagram of one embodiment of a needle guard assembly.

An improved alternative embodiment is illustrated in FIG. 4G, in which a double needle guard assembly 470 is provided. The assembly 470 includes a first needle guard 471 and a second needle guard 472. The first needle guard 471 performs a function similar to that of needle guard 460, and is also pivotally adjustably mounted to the base 805 of the looper 216. The second needle guard 472 is a rod of circular cross-section, and is rotatably adjustably mounted in a hole in a mounting block 473 rigidly fixed to the looper side of the needle plate 38. In the embodiment of FIG. 4G, the thread deflector 430 is also mounted to the mounting block 473. The needle guard 472 keeps the descending needle 132 from deflecting further to the left of the advancing looper 216 so that the looper 216 does not pass to the right of the needle thread 222 and thereby miss the top thread loop and thus skip the stitch, but rather passes between the needle thread 222 and the needle 132 (FIG. 5S). The circular cross-section of the second needle guard 472 is centered on an axis 474 that is parallel to the plane of the looper motion and of the needle plate, that is, in horizontal, transverse orientation in the described machines. The needle guard 472 has an eccentric base 475 having an axis 476 that is spaced from, but parallel to, the axis 474 and that mounts in a hole in the block 473. As such, the needle guard 472 is rotatably adjustable in its mounting hole in block 473 so as to move it and its axis 474 toward or away from the needle 132, where it can be locked in position by tightening of an alien head screw 477 on the block 473.

The technique used in sewing tack-stitch sequences is also improved to reduce the likelihood of missed stitches, particularly during the start-up tack-stitch sequence. Preferably, a start-up tack stitch sequence is started by sewing a short distance of approximately one inch in the direction of the intended pattern, then sewing back over the initial stitches to the starting position before proceeding forward over the same line of stitches. At the beginning, a few long stitches are sewn, followed by normal length stitches. A typical normal stitch rate might be seven stitches per inch. To start the tack sequence, the thread would first be set at the origin of the pattern curve, which can be by using the wipe and tuck cycle described above. Then two triple-length stitches may be sewn, followed by a single normal length stitch in a direction away from the origin along the pattern curve line. Then seven normal-length stitches may be sewn back to the origin. Then the sewing direction can reverse again and sew over the initial stitches along the pattern curve.

In the normal sewing of a pattern, the feed of the bridges or the material or the combination thereof preferably results in a continuous feed motion of the stitching elements relative to the material. In the tack sequence, however, and particularly in those portions of the tack sequences where longer than normal stitches are used, the resultant feed is intermittent. The intermittent feed is preferably not abrupt, however, and is rather made by smooth transitions between rapid relative motion between the stitching elements and the material when the needle is clear of the material and relatively little or no such motion when the needle is engaged with the material. During the sewing of normal length stitches, whether before or after the sewing of the long stitches, the feed is preferably continuous and smooth.

Generally, high speed sewing in the quilting of patterns is performed with continuous stitching, with a needle motion that is sinusoidal as a function of time or at least of the distance stitched. During the so-called intermittent feed referred to above, the needle motion may be considered non-sinusoidal as a function of distance, with the reciprocation of the needle being faster than sinusoidal when the needle penetrates the material and slower when the needle is withdrawn from the material. The needle speed transition may be smooth. This type of needle speed variation is useful whenever a reversal is employed in the sewing of a pattern. Cases involving the starting of sewing with needles moving from a stopped condition relative to the material are cases where such needle drive motion is beneficial. Tack sewing is a common example of both situations, and where such needle speed variation is desirable.

For example, needle speed may be started from a stop and run at a continuous cycle speed with motion that is sinusoidal as a function of time, but with feed of the material and needle relative to each other being faster when the needle is withdrawn from the material and slower when the needle is penetrating the material, presenting needle motion as a non-sinusoidal motion relative to the distance moved relative to the material. With such motion, a few larger than average stitches may be sewn, then the material feed between needle penetrations of the material can be gradually reduced to normal stitch spacing at which continuous stitching can continue. Then, in performing a tack, the needle direction relative to the material is reversed, and a similar sequence of a few longer than normal stitches, with the non-sinusoidal needle motion, are carried out followed by a transition to normal size stitches. A similar scheme can be employed whenever direction reversal occurs, not just at the beginning and ending of a pattern. This reduces malformed stitches, missed stitches and thread breakage. The movement of the needle relative to the material can be carried out (1) by moving the bridges relative to the frame of the machine while holding the material stationary, (2) by holding the bridges stationary relative to the machine while moving the material, or (3) by a combination of relative movements of both the bridges and material relative to the frame of the machine.

The movement referred to above can be carried out in such a way that takes into account the inertia of machine components and the material as well as material deformation and other effects of acceleration, deceleration, needle deflection and other factors to optimize or minimize these effects. For example, in normal sewing within the body of a pattern, the needles might reciprocate sinusoidally through the series of stitch cycles with the relative movement between the material and the needles, that is movement parallel to the plane of the material, being continuous, or at a constant speed. In this example, the needles might reciprocate at 1400 cycles per minute with the needle movement relative to the material being 200 inches per minute. Then, when a tack sequence is to be sewn, this parallel movement as well as the speed of the reciprocating needle motion can be proportionately slowed to, say, 100 inches per minute and 700 cycles per minute, respectively. Then, for a tack stitch, the reciprocating needle motion speed can be varied and moved non-sinusoidally by, for example, moving at a 2100 cycle per second rate for the portion of a cycle when the needle is penetrating the material and then slowing to a few hundred cycles per second or less between penetrations of the material to sew a normal length stitch or a longer-than-normal length stitch, as the controller may command, with minimal needle deflection and minimal material distortion. As such, the reciprocating needle motion is accelerated to a greater cycle speed when penetrating the material and decelerated to a slower cycle speed between stitch penetrations. Transition stitches can be sewn before or after the tack stitch to transition to or from a normal stitch. Such a sequence can be used for tack stitch sewing or whenever a direction reversal is sewn in a pattern.

Figure 6:
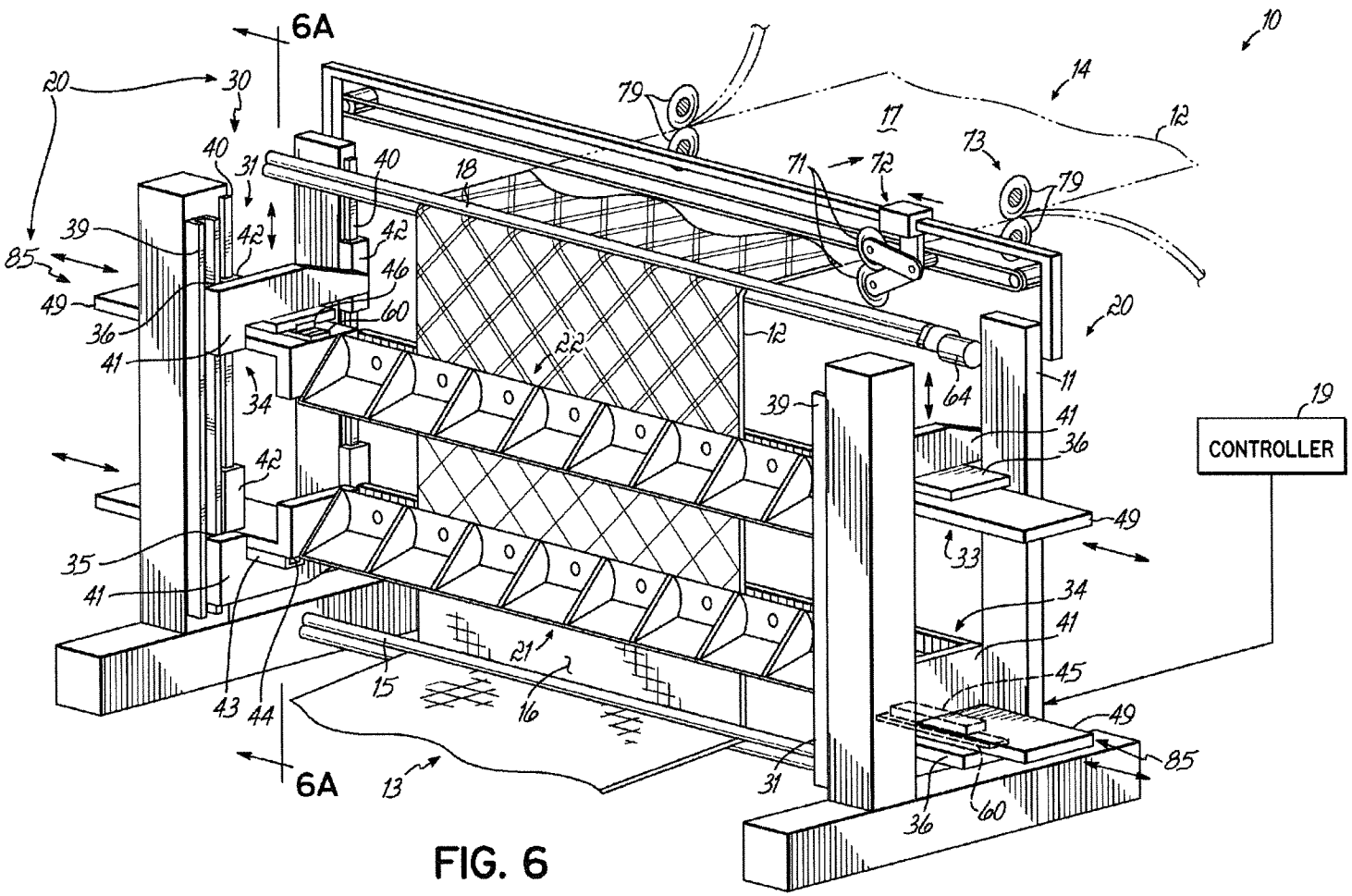
FIG. 6 is a diagrammatic isometric view illustrating one embodiment of a motion system of the machine of F1G. 1.

The machine 10 has a motion system 20 that is diagrammatically illustrated in FIG. 6. Each of the bridges 21, 22 are separately and independently movable vertically on the frame 11 through a bridge vertical motion mechanism 30 of the motion system 20. The bridge vertical motion mechanism 30 includes two elevator or lift assemblies 31, mounted on the frame 11, one on the right side and one on the left side of the frame 11 (see FIG. 1A). Each of the lift assemblies 31 includes two pairs of stationary vertical rails 40, one pair on each side of the frame 11, on each of which ride two vertically movable platforms 41, one for each of two of vertical bridge elevators, including a lower bridge elevator 33 and an upper bridge elevator 34. Each of the elevators 33, 34 includes two of the vertically movable platforms 41, one on each side of the frame 11, which is equipped with bearing blocks 42 that ride on the rails 40. The platforms 41 of each of the elevators 33, 34 are mounted on the rails 40 so as to support the opposite sides of the respective bridge to generally remain longitudinally level, that is, level front-to-back.

The upper bridge 22 is supported at its opposite left and right ends on respective right and left ones of the platforms 41 of the upper elevators 34, while the lower bridge 21 is supported at its opposite left and right ends on respective right and left platforms 41 of the lower elevators 33. While all of the elevator platforms 41 are mechanically capable of moving independently, the opposite platforms of each of the elevators 33,34 are controlled by the controller 19 to move up or down in unison. Further, the elevators 33,34 are each controlled by the controller 19 move the platforms 41 on the opposite sides each bridge 21,22 in synchronism to keep the bridges 21,22 transversely level, that is, from side-to-side.

Mounted on each side of the frame 11 and extending vertically, parallel to the vertical rails 40, is a linear servo motor stator 39. On each platform 41 of the lower and upper elevators 33, 34 is fixed the armature of a linear servo motor 35,36, respectively. The controller 19 controls the lower servos 35 to move the lower bridge 21 up and down on the stators 39 while maintaining the opposite ends of the bridge 21 level, and controls the upper servos 36 to move the upper bridge 22 up and down on the same stators 39, while maintaining the opposite ends of the bridge 22 level. The vertical motion mechanism 30 includes digital encoders or resolvers 50, one carried by each elevator, to precisely measure its position of the platform 41 on the rails 40 to feed back information to the controller 19 to assist in accurately positioning and leveling the bridges 21, 22. While linear motors such as the linear servos are preferable, alternative drives such as ball-screws and rotary servos, or other drive devices, may be employed. The encoders 50 are preferably absolute encoders that output actual position signals.

Figure 6A:
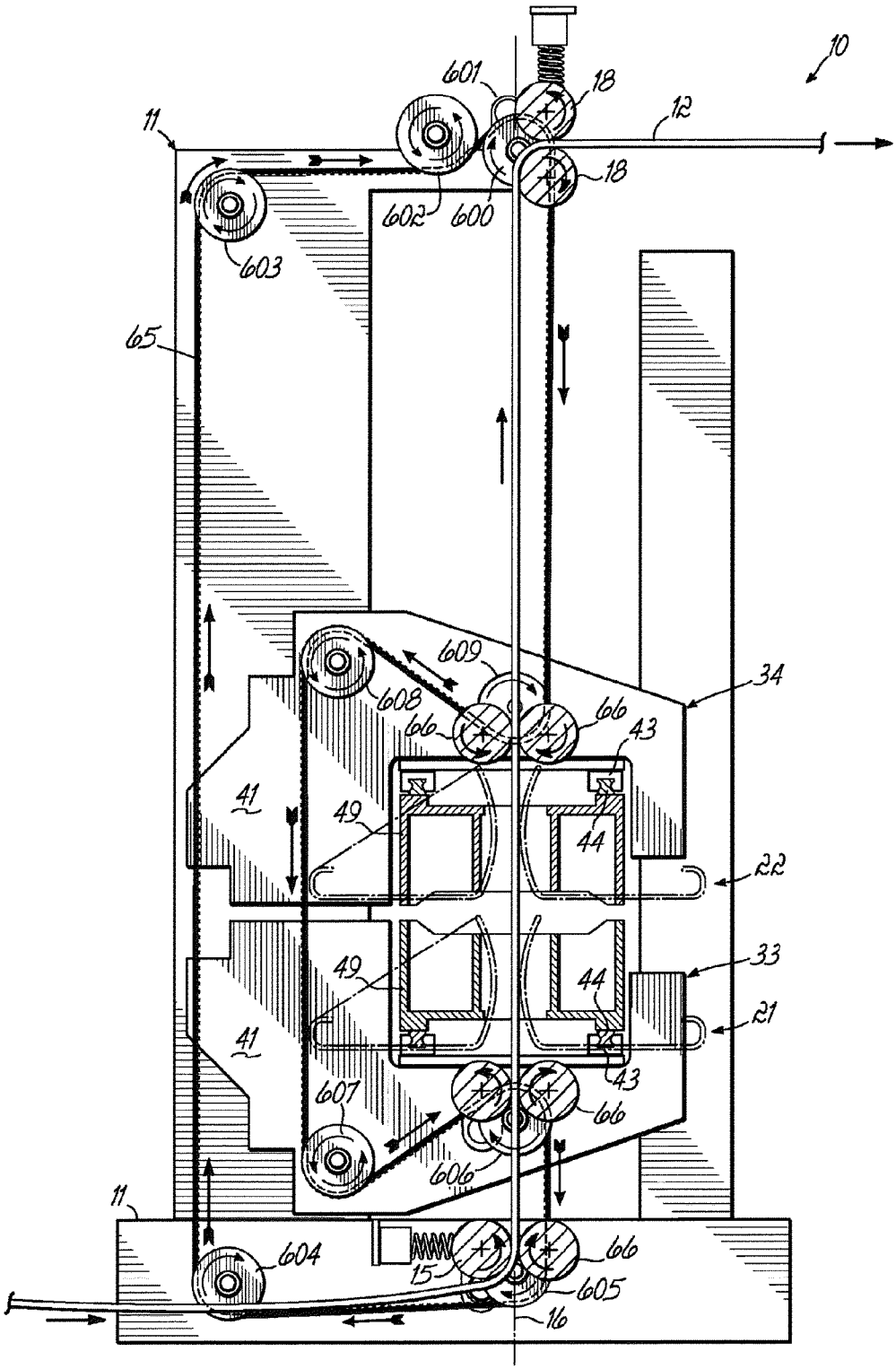
FIG. 6A is a diagrammatic cross-sectional representation a line 6A-6A of FIG. 6 depicting the motion system with a moving material web and the bridges stationary.

The motion system 20 includes a transverse-horizontal motion mechanism 85 for each of the bridges 21, 22. Each of the bridges 21, 22 has a pair of tongues 49 rigidly extending from its opposite ends on the right and left sides thereof, which support the bridges 21, 22 on the platforms 41 of the elevators 33, 34. The tongues 49 are moved transversely on the elevator platforms 41 in the operation of the transverse-horizontal bridge motion mechanism 85. The tongues 49 on each of the bridges 21,22 carry transversely extending guide structure 44 in the form of rails that ride in bearings 43 on the platforms 41 of the respective elevators 33,34 (FIG. 6A). Fixed to the tongue 49 on one side of each of the bridges 21, 22, extending parallel to the rails or guide structure 44, is a linear servo stator bar 60. Fixed to one of the platforms 41 of each respective bridge 21, 22 is an armature of a linear servo 45,46 positioned to cooperate with and transversely move the stator bar 60 in response to signals from the controller 19. The transverse-horizontal motion mechanism includes decoders 63 for each of the bridges 21, 22 that are provided adjacent the armatures of servos 45,46 on the respective elevators 41 to feed back transverse bridge position information to the controller 19 to aid in precise control of the transverse bridge position. The bridges 21, 22 are independently controllable to move vertically, up and down, and transversely, left and right, and operated in a coordinated manner to stitch a quilted pattern on the material 12. In the embodiment illustrated, each bridge can move transversely 18 inches (+/−9 inches from its center position), and each bridge can move up or down 36 inches (+/−18 inches from its center position. The range of vertical motion of the lower and upper bridges 21, 22 can overlap.

The drive rollers 18 at the top of the frame 11, which are also part of the overall motion system 20, are driven by a feed servo motor 64 at the top of the frame 11, as illustrated in FIG. 6, on the right side (facing downstream) of the frame 11. When activated, the servo 64 drives the rollers 18 to feed the web of material 12 downstream, pulling it upward along the plane 16 through the quilting station and between the members 23 and 24 of both of the bridges 21 and 22. The rollers 18 further drive a timing belt 65 located in the frame 11 at the left side of the machine 10, as illustrated in FIG. 6A. The bridges 21, 22 may also each be provided with a pair of pinch rollers 66, in place of idler roller 15, that are journalled to the respective elevator platforms 41 on which the respective bridges 21,22 are supported. These rollers 66 grip the material 12 at the levels of the bridges 21, 22 to minimize the transverse shifting of the material at the level of the sewing heads 25, 26. The pinch rollers 66 are synchronized by the belt 65 so that the tangential motion of their surfaces at the nips of the pairs of roller 66 move with the material 12.

Omitting the roller 66 in favor of only the idler roller 15 has also been found to be an acceptable alternative. This alternative may be desirable to avoid material bunching during certain material and bridge motion sequences.

Figure 6B:
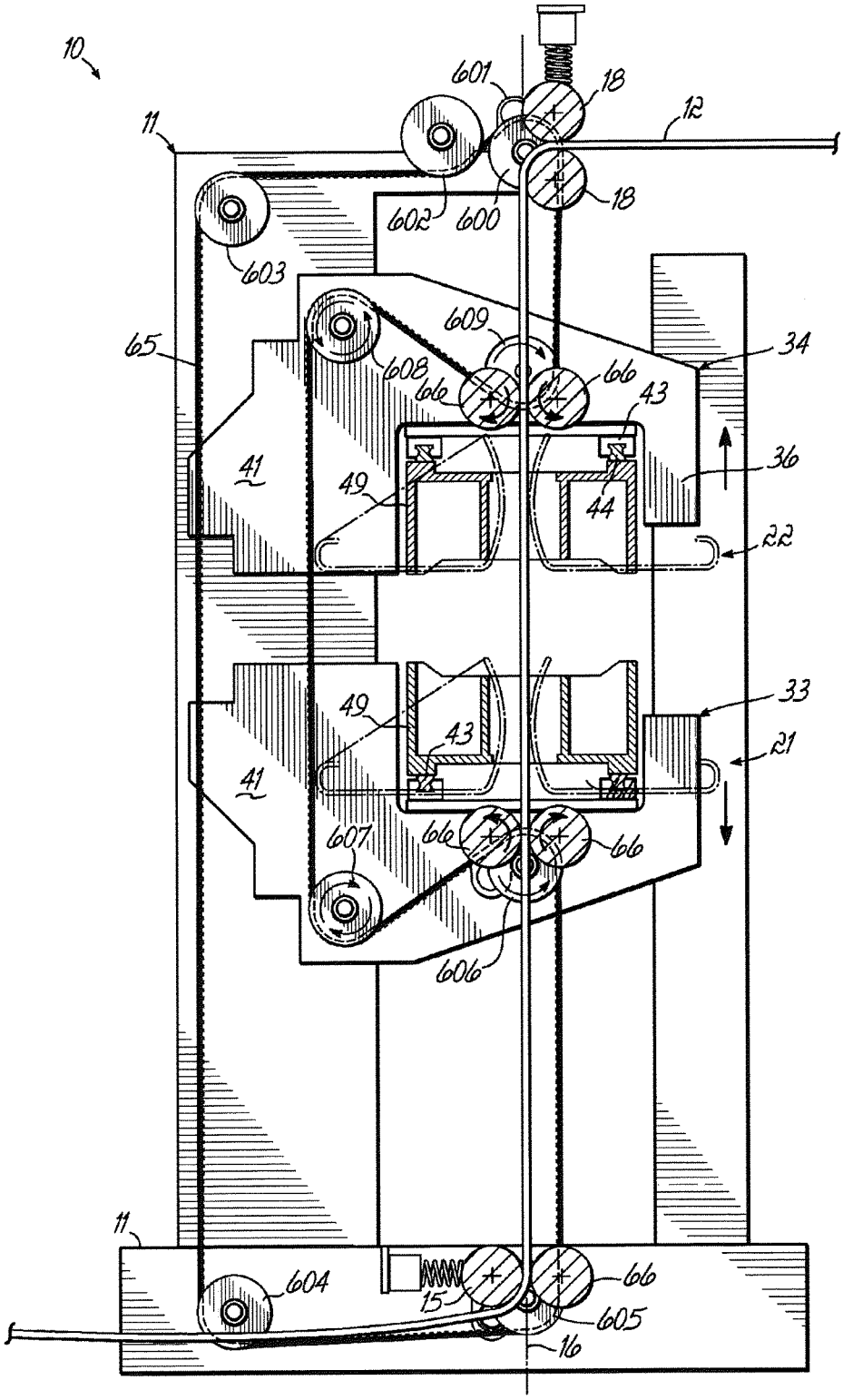
FIG. 6B is a diagrammatic cross-sectional representation similar to FIG. 6A depicting the motion system with a moving bridges and the material web stationary.

As illustrated in FIG. 6A, with the elevator platforms 41 supporting the bridges 21,22 stationary, activation of the motor 64 drives the rollers 18 to advance the web 12 downstream and upward between the pinch rollers 66 of the bridges 21,22. The rollers 18, in turn, turn a belt drive cog wheel 600 on the left side of the frame 11 which drives the belt 65. The rollers 66 on both of the bridges 21,22 are driven by the motion of the belt 65 so that they have the same tangential velocity, when the bridges 21,22 are vertically fixed, to roll with the material 12 as the material 12 is moved up by the motion of the rollers 18. On the other hand, when the feed rolls 18 and material 12 are stationary, the belt 65 remains stationary, as illustrated in FIG. 6B. With the belt 65 stationary, movement up or down of either bridge 21, 22 forces the rollers 66 to move relative to the web 12 and also relative to the belt 65. The movement of the rollers 66 relative to the belt 65 causes the rollers 66 to rotate at a rate that keeps the roller surfaces at the nip between them stationary at the web 12 so that the rollers 66 roll along the surface of the stationary web of material 12. Furthermore, combinations of motion of the web 12 and of a bridge 21,22 are accompanied with combined motion being imparted to the rollers 66 that effectively subtracts the upward motion of a bridge 21,22 from the upward motion of the web 12, so that the surfaces of the rollers 66 at the nips of the sets of rollers 66 always move with the material 12. This synchronized motion between the web 12 and the pinch rollers 66 of each of the bridges 21, 22 maintains longitudinal tension on the material 12 and clamps the material 12 at each of the bridges 21, 22, resisting transverse material distortion of the web 12.

Figure 6C:
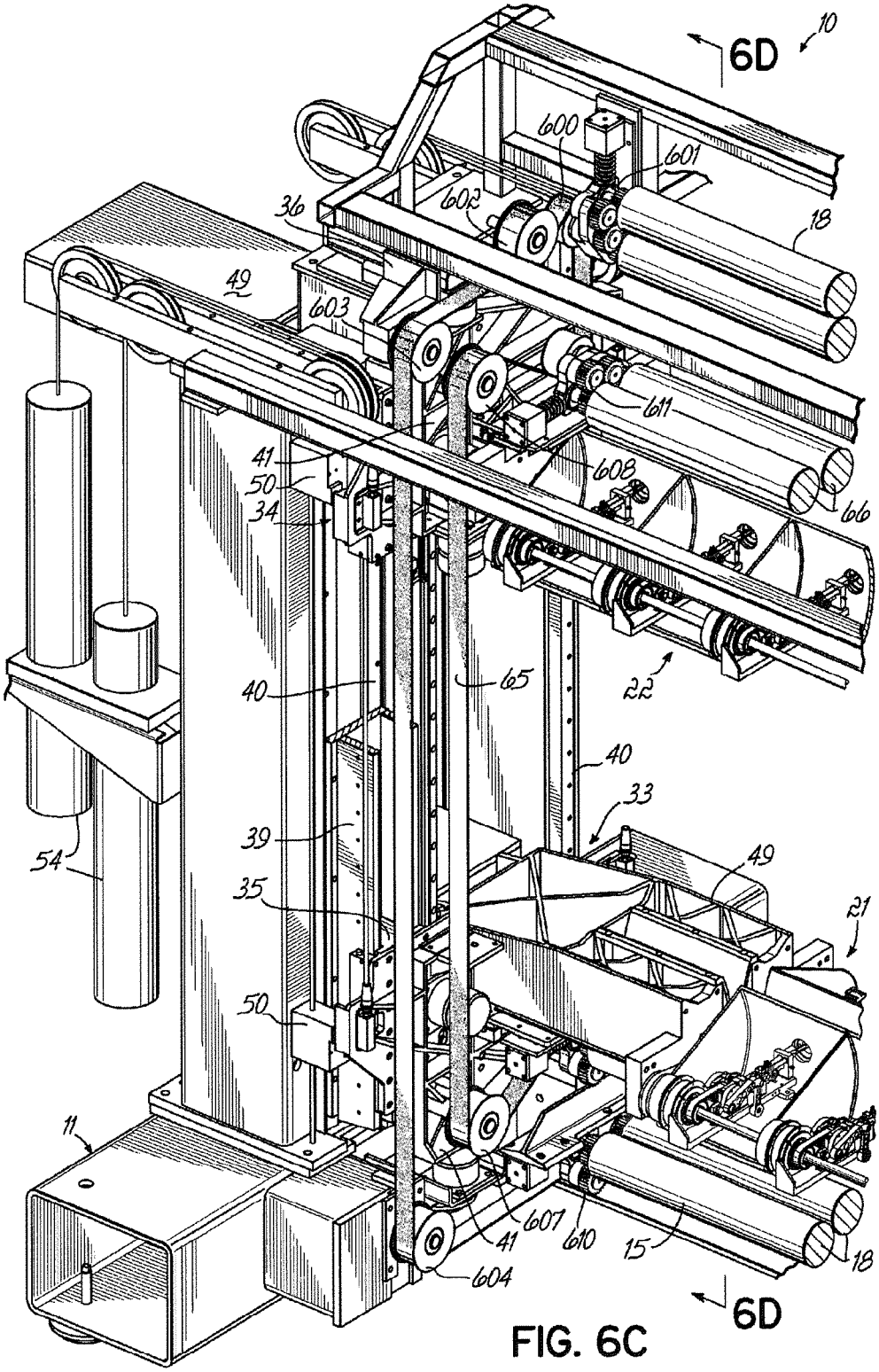
FIG. 6C is an enlarged perspective view illustrating the left portion of the machine of FIG. 1 in detail.
Figure 6D:
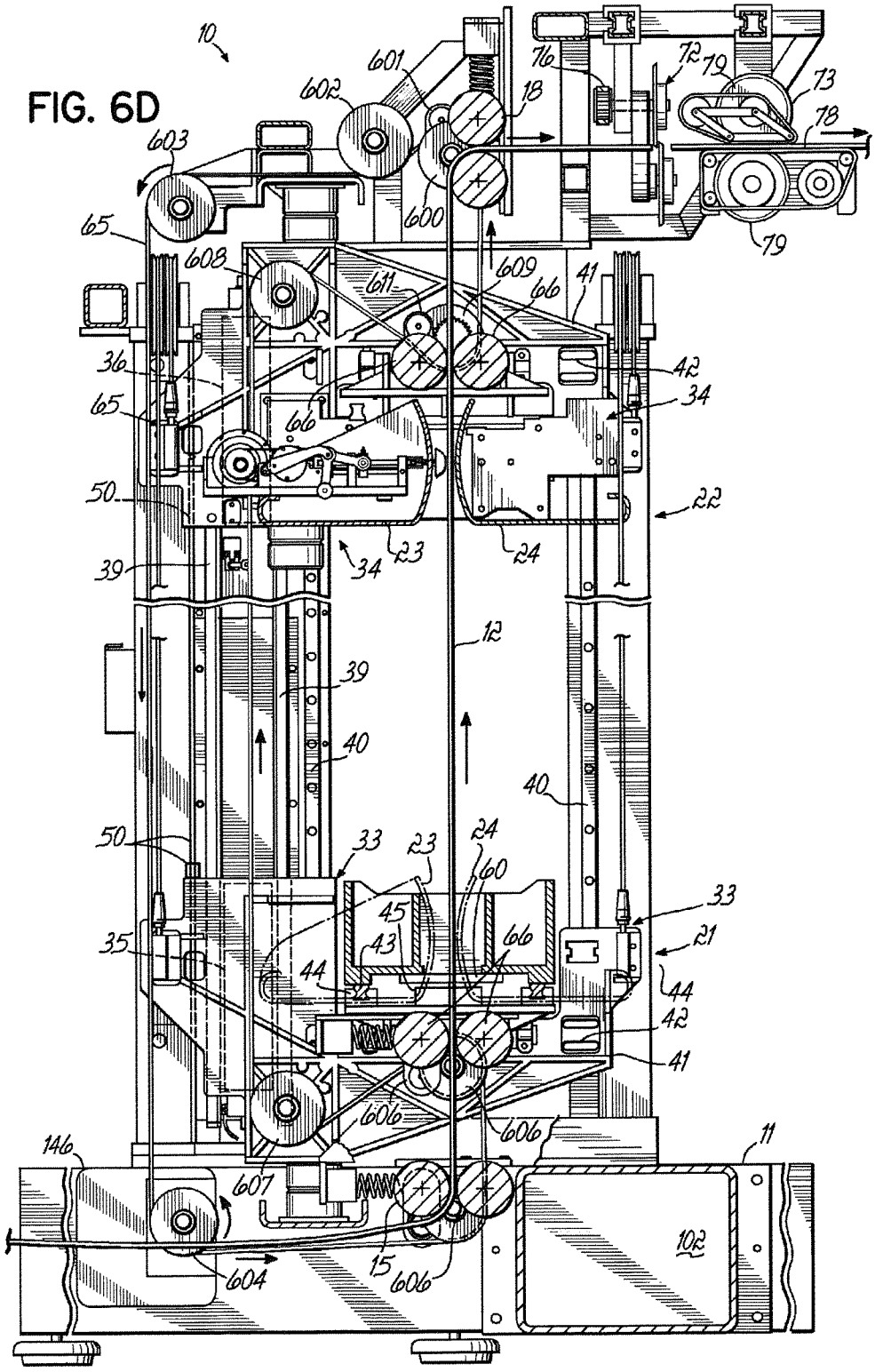
FIG. 6D is a cross-sectional view along line 6D-6D of FIG. 6C.

The structure that enables the belt 65 to synchronize the motion of the pinch rollers 66 with the motions of the bridges 21,22 and the web 12 is illustrated also in FIGS. 6C and 6D as well as FIGS. 6A and 6B as explained above. The belt 65 extends around the cog drive roller 600, which is driven through a gear assembly 601 by the feed rollers 18 (FIG. 6D).

The belt 65 further extends around four idler pulleys 602-605 rotatably mounted to the stationary frame 11. The belt 65 also extends around a driven pulley 606 and an idler pulley 607, both rotatably mounted to the elevator platform 41 for the lower bridge 21, and around idler pulley 608 and driven pulley 609, both rotatably mounted to the elevator platform 41 for the upper bridge 22, all on the left side of the frame 11. The driven pulley 606 is driven by the motion of the belt 65 and, in turn, through a gear mechanism 610 (FIG. 6D), drives the pinch rollers 66 of the lower bridge 21, while driven pulley 609, is also driven by the motion of belt 65 and, through gear mechanism 611, drives the pinch rollers 66 of the upper bridge 22. The gear mechanisms 610 and 611 have drive ratios related to that of drive gear mechanism 601 such that the tangential velocity of the rollers 66 and rollers 18 is zero relative to that of the web 12. It should be noted that the path of the belt 65 remains the same regardless of the positions of the bridges 21 and 22.

Figure 6E:
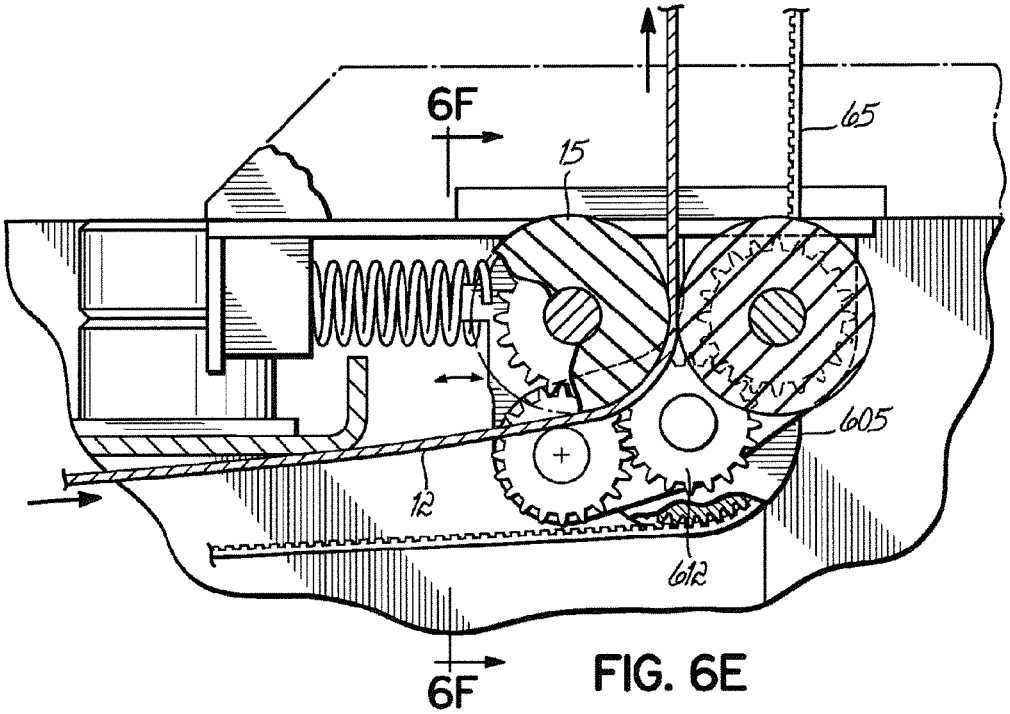
FIG. 6E is an enlarged sectional view of a portion of FIG. 6C.
Figure 6F:
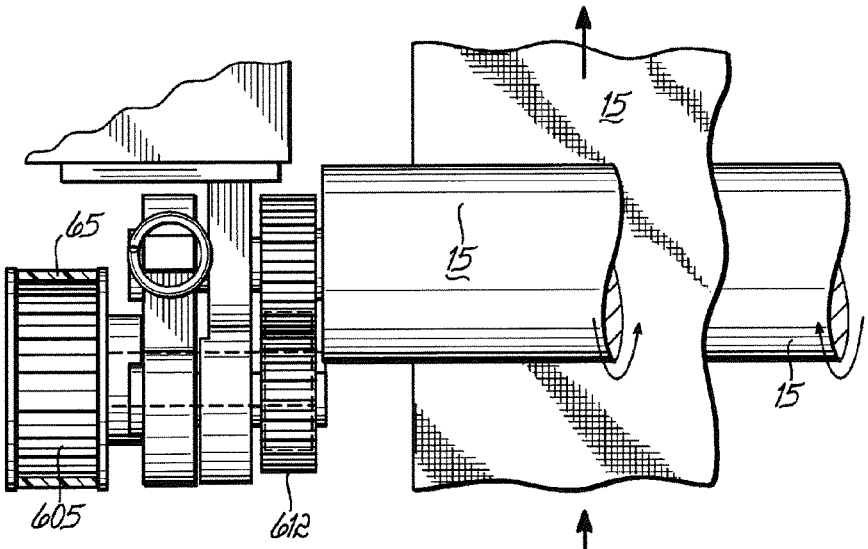
FIG. 6F is a cross-sectional view along the line 6F-6F of FIG. 6E.

Additionally, inlet rollers 15 are shown at the bottom of FIG. 6D and in FIGS. 6E and 6F as a pair of rollers similar to rollers 18. If such rollers 15 are so provided and are to be driven, which might be desirable or undesirable, depending on the feed system for the web 12 upstream of the machine 10, such rollers 15 should be also driven by the belt 65, as through a gear mechanism 612 driven by the roller 605 that is driven by the belt 65. In such a case, the rollers 15 should be maintained at the same tangential velocity as the feed rollers 18 through properly matched gear ratios between mechanisms 601 and 612. It might, however, be preferred to allow the rollers 15 to rotate freely as idler rollers, and to provide only a single roller 15 above and on the upstream side of the material 12, around which the material 12 would extend. Each of the gear mechanisms 601, 610 and 611 may be substantially as illustrated and described for gear mechanism 612.

The vertical motion of the bridges 21, 22 is coordinated with the downstream motion of the web of material 12 by the controller 19. The motion is coordinated in such a way that the bridges 21, 22 can efficiently remain within their 36 inch vertical range of travel. Further, the two bridges 21, 22 can be moving so as to stitch different patterns or different portions of a pattern. As such, their separate motions are also coordinated so that both bridges 21, 22 remain in their respective ranges of travel, which may require that they operate at different stitch speeds. This may be achieved by the controller 19 controlling one bridge independently while the motion of the other bridge is dependent on or slaved to that of the other bridge, though other combinations of motion may be better suited to various patterns and circumstances.

The stitching of patterns by the sewing heads 25,26 on the bridges 21, 22 is carried out by a combination of vertical and transverse motions of the bridges 21, 22 and thus, the sewing heads 25, 26 that are on the bridges, relative to the material 12. The controller 19 coordinates these motions in most cases so as to maintain a constant stitch size, for example, seven stitches to the inch, which is typical. Such coordination often requires a varying of the speed of motion of the bridges or the web or both or a varying of the speed of sewing heads 25, 26.

The speed of the needle heads 25 is controlled by the controller 19 controlling the operation of two needle drive servos 67 that respectively drive the common needle drive shafts 32 on each of the bridges 21, 22. Similarly, the speed of the looper heads 26 is controlled by the controller 19 controlling the operation of two looper drive servos 69, one on each bridge 21, 22, that drive the common looper bell drive systems 37 on each of the bridges 21,22. The sewing heads 25, 26 on different bridges 21, 22 can be driven at different rates by different operation of the two servos 67 and the two servos 69. The needle heads 25 and looper heads 26 on the same bridges 21, 22, however, are run at the same speed and in synchronism to cooperate in the formation of stitches, although these may be phased slightly with respect to each other for proper loop take-up, needle deflection compensation, or other purposes.

Further, the horizontal motion of the bridges is controlled in some circumstances such that they move in opposite directions, thereby tending to cancel the transverse distortion of the material 12 by the sewing operations being performed by either of the bridges 21, 22. For example, when the two bridges 21, 22 are sewing the same patterns, they can be controlled to circle in opposite directions. Different patterns can also be controlled such that transverse forces exerted on the web 12 cancel as much as practical.

Embodiments above are provided with separate drive servos for the needle head assemblies 25 and the looper head assemblies 26 for each bridge 21, 22. In particular, each bridge 21, 22 includes a needle drive servo 67, separately controllable by a signal from the controller 19, which drives a shaft 32, which, in turn, drives all of the needle head assemblies 25 on the respective bridge, with each needle head assembly 25 being selectively engageable through a clutch 100, also operated by signals from the controller 19. Also, each bridge 21, 22 further includes a looper drive servo 69, also separately controllable by a signal from the controller 19, which drives a belt 37, which, in turn, drives all of the looper head assemblies 26 on the respective bridge, with each looper head assembly 26 being selectively engageable through a similar clutch 210, also operated by signals from the controller 19. The separate drives 67 and 69 facilitate the split-start feature, described above, as well as needle deflection compensation, plus is useful for other control refinements.

Figure 6H:
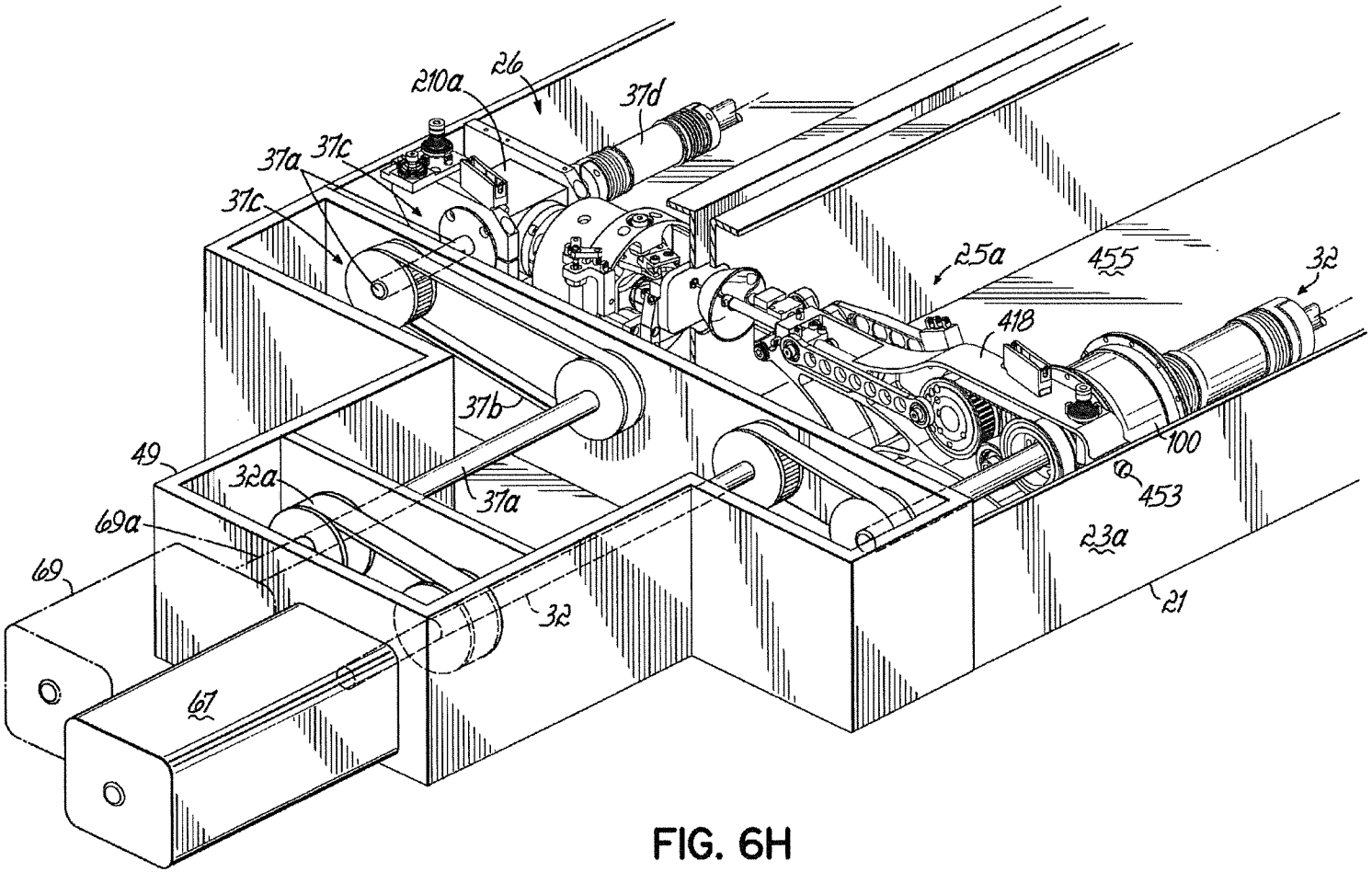
FIG. 6H is an isometric view of a portion of a bridge illustrating an alternative embodiment of a stitching element drive of the machine of FIG. 1 with the needle head and looper head assembly pair of FIG. 2C.
Figure 61:
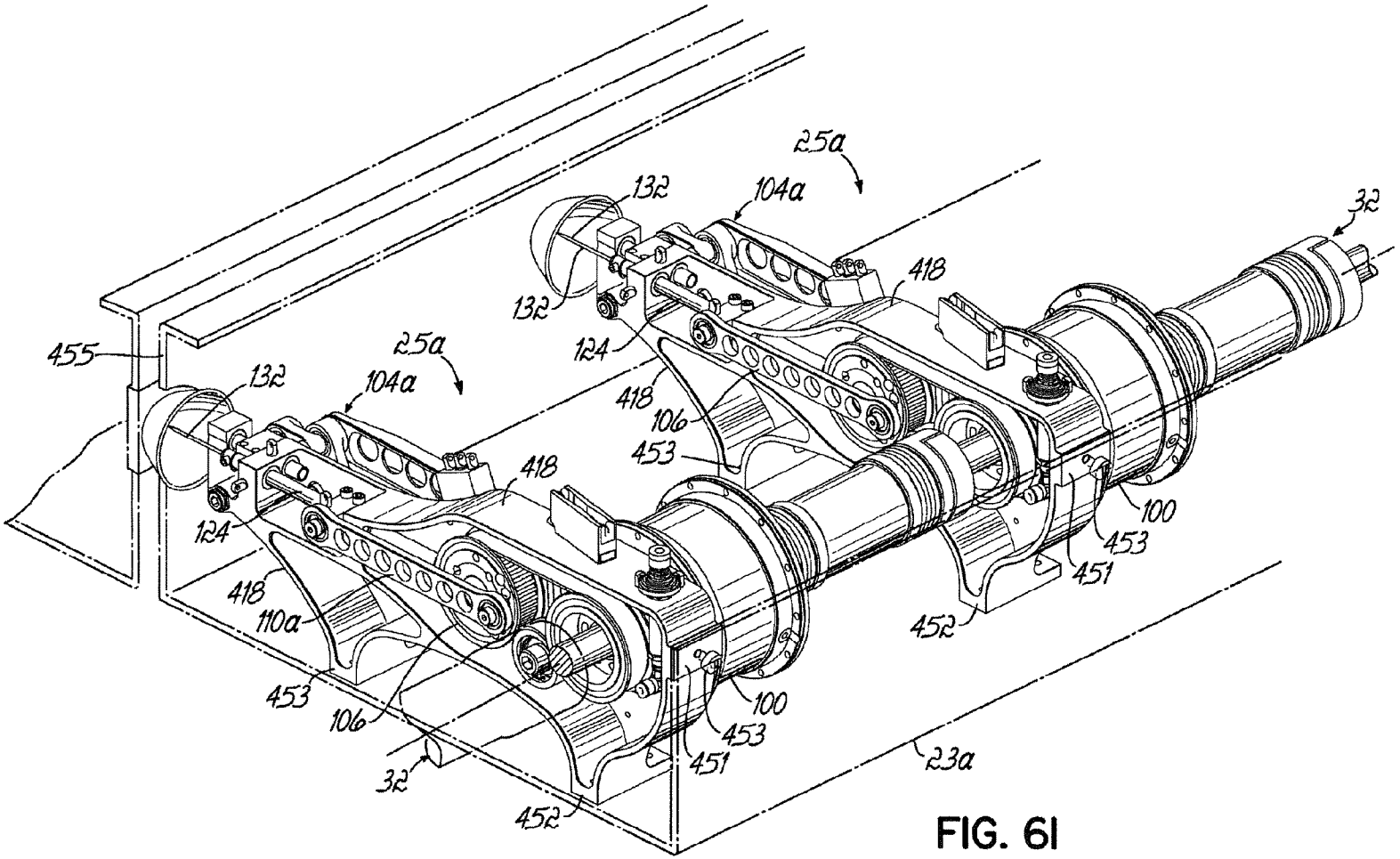

A number of alternatives to the bridge design, the needle head assemblies, and the needle and looper drives and the control thereof are also illustrated in and described. In FIG. 6H, an end portion or tongue 49 of a bridge 21 or 22 is illustrated in which the needle drive motor 67 is linked to drive both the needle head assemblies 25 and looper head assemblies 26 of the same bridge. The servo 67 directly drives the output shaft 32, which is the needle drive input shaft for that bridge. The shaft 32, in turn, drives a cog belt 32a that drives a looper drive input shaft 37a, which takes the place of the looper drive belt 37 in previously described embodiments. With this embodiment, needles 132 and loopers 216 are driven together, and are not separately controlled or phased. Because the stitching elements are mechanically linked, power failures and other malfunctions are less likely to result in mechanical damage to the machine. Nonetheless, the ability to separately control needle and looper heads can be reinstated by retaining the looper drive servo 69 while linking its output to the shaft 37a through a differential drive 69a, which can be added between the belt drive 32a and the looper drive shaft 37a.

The looper drive shaft 37a is linked through a belt 37b to a segmented shaft 37c that is formed of an alternating series of torque tubes 37d and gear boxes 210a. The gear boxes 210a take the place of the looper drive clutches 210, but drive the looper and retainer drives 212 of the looper head assemblies 26 continuously rather than allowing each to be driven selectively as with the embodiments described above. Activation and deactivation of the needle alone determines whether the set of stitching elements participates in the sewing of the pattern. Since the loopers 216 do not penetrate the material being sewn, they can be run continuously whether the corresponding needle drive assemblies 25 are being driven or not, although clutches 210 could be provided instead of gear boxes 210a.

Figure 2C:
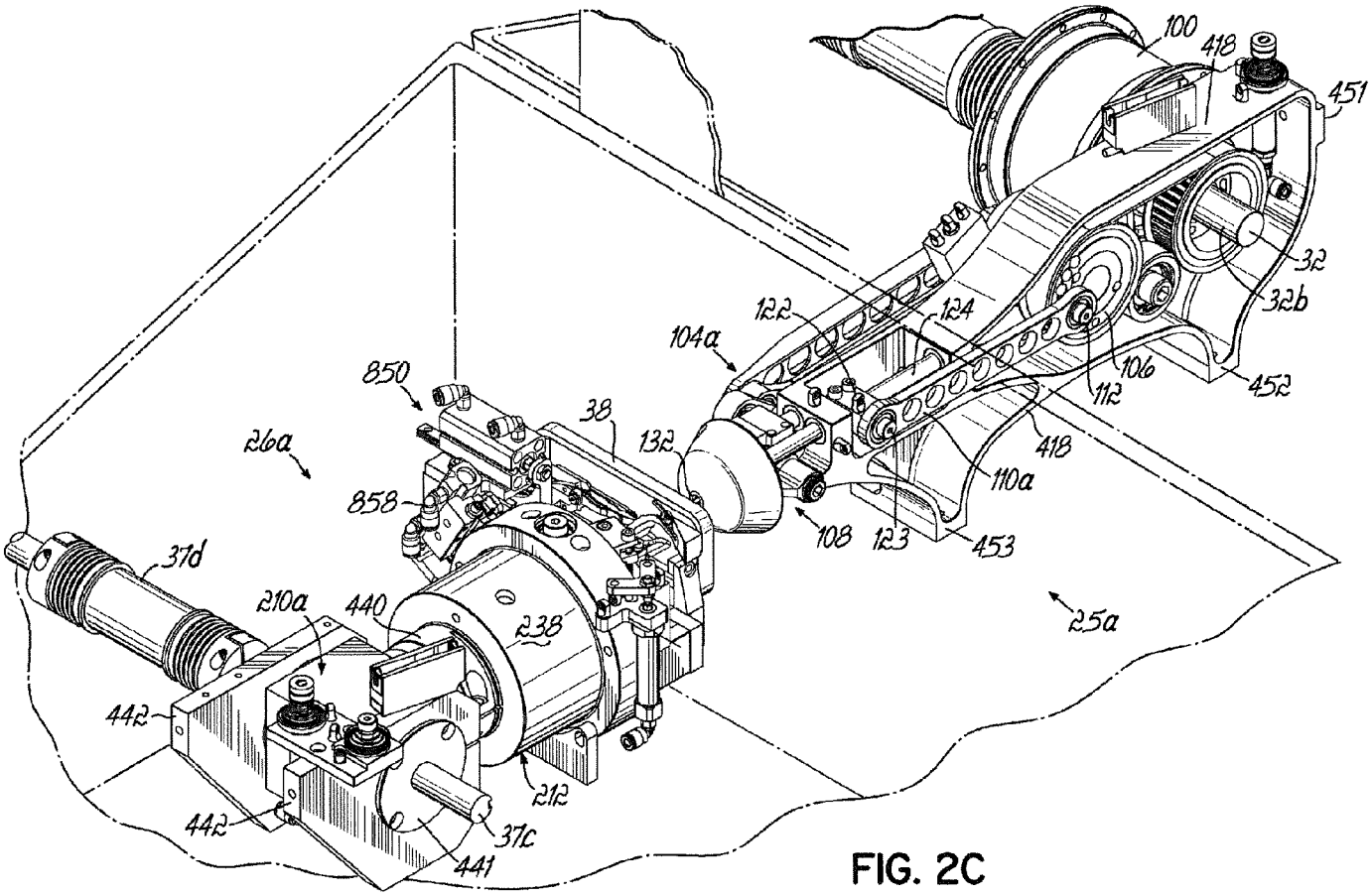
FIG. 2C is an isometric diagram, similar to FIG. 2, illustrating an alternative needle and looper head pair.

The looper head assemblies 26 of this embodiment, illustrated as assemblies 26a in FIG. 2C, include a looper and retainer drive 212 essentially as described above. They also each include the needle plate 38, illustrated as a rectangular plate 38a, which is fixed relative to the looper drive housing 238, which contains the needle hole 81. Each gear box 210a has an output shaft that is locked to the input shaft of the looper and retainer drive 212 by a collar 440 such that these shafts are adjustable only axially with respect to each other. Each gear box 210a is supported by two bearings 441, one on each side of the gear box 210a, that surround the shaft 37c, which is the input drive shaft of the gear boxes 210a. The bearings 441 are each locked in a clamp member 442 that is bolted to the bridge. As such, the gear boxes 210a are adjustable only axially relative to the shaft 37c.

When a looper head assembly 26a is installed on the rear portion 24 of a bridge 21,22, four adjustments can be made. Two horizontal adjustments are available to adjust the assembly 26a on the bridge. Before tightening the clamp members 442, the gear box 210a can be positioned transversely on the shaft 37c to align the needle hole 81 transversely with needle 132. Then the collar 440 can be loosened and the assembly 26a moved toward or away from the needle drive assembly 25 to adjust the needle plate 38a relative to the fabric plane 16. Angular adjustment of the looper and retainer drive 212 is made by aligning a disc (not shown) on the input shaft of the drive 212 inside the housing 238 with an alignment hole 444 in the housing 238. This is done by inserting a cylindrical pin (not shown) through the hole 444 and rotating the shaft of the drive 212 until the pin fits into the hole in the alignment disc. When the adjustments are made, the collar 440 is tightened. Vertical adjustment of the looper 216 is made by the looper adjustment described above in connection with FIG. 4E.

A needle head assembly 25 that produces a simple sinusoidal needle motion is illustrated, as the needle head assembly embodiment 25a also in FIG. 2C. Each needle head assembly 25a includes a clutch 100 that selectively transmits power from the needle drive shaft 32 to a needle drive 102a and presser foot drive 104a. The needle drive 102a, the presser foot drive 104a and the clutch 100 as well as the shaft 32, are supported on a needle drive housing 418. The needle drive 102a includes the crank 106 that is driven through a drive belt 164 by the output pulley 166 of the clutch 100. The crank 106 is mechanically coupled to the needle holder 108 by a direct needle drive link 110a. The arm or eccentric 112 of crank 106 is rotatably connected to one end of the link 110a. The other end of the link 110a is rotatably connected to pin 123 extending from block 122 of the reciprocating shaft 124, which is an extension of the needle holder 108. The shaft 124 is mounted for reciprocating linear motion as in the assembly 25 described in connection with FIG. 2 above. The presser foot drive 104a is generally similar to the presser foot drive 104 described in connection with FIG. 2A above. The components of the needle head assemblies 25a are made of materials that allow the heads to be operated without requiring lubrication.

The housing 418 is a structural member having three mounting flanges 451, 452 and 453 that support the assembly 25a and its related components on the front portion 23 of the bridge 21,22. The front portions 23 of the bridges 21, 22 of the embodiment 23a illustrated in FIG. 6I, use the housings 418 of the head assemblies 25a to stiffen the bridge portion, which is formed of an open trough 455. The flanges 451 are bolted to the vertical face of the trough 455, while the flanges 452 and 453 are bolted to transversely extending channels along the base of the trough 455, thereby adding stiffening structure that reinforces the trough 455 so as to resist the main stresses and dynamic loads encountered during sewing. The drive shaft 32, which is formed of sections of torque tubes 32a and solid shaft sections 32b (FIG. 2C), is also in part supported by the housings 218 through the clutches 100 that are mounted to the housings 218, thereby confining some of the drive forces to these housings 218. This arrangement makes it practical to eliminate additional structural features such as the ribs 89 (FIG. 1).

In a typical configuration, the quilter 10 quilts a web 12 that may be fed downstream to a panel cutter and trimmer, or that may be rolled and transferred to an off-line cutting and trimming device. Motion of the web 12 and the bridges 21, 22 can also be coordinated with panel cutting operations performed by a panel cutting assembly 71 located at the top of the frame 11. The panel cutter 71 has a cut-off head 72 that traverses the web 12 just downstream of the drive rollers 18, and a pair of trimming or slitting heads 73 on opposite sides of the frame 11, immediately downstream of the cut-off head 72, to trim selvage from the sides of the web 12.

The cut-off head 72 is mounted on a rail 74 to travel transversely across the frame 11 from a rest position at the left side of the frame 11. The head is driven across the rail 74 by an AC motor 75 that is fixed to the frame 11 with an output linked to the head 72 by a cog belt 76. The cut-off head 72 includes a pair of cutter wheels 77 that roll along opposite sides of the material 12 with the material 12 between them so as to transversely cut quilted panels from the leading edge of the web 12. The wheels 77 are geared to the head 72 such that the speed of the cutting edges of the wheels 77 are proportional to the speed of the head 72 across the rail 74.

The controller 19 synchronizes the operation of the cut-off head 72, activating the motor 75 when the edge of a panel is correctly positioned at a cut-off position defined by the path of the travel of the cutting wheels 77. The controller 19 stops the motion of the material 12 at this position as the cut-off action is carried out. During the cut-off operation, the controller 19 may stop the sewing performed by the sewing heads 25,26, or may continue the sewing by moving the bridges 21,22 to impart any longitudinal motion of the sewing heads 25,26 relative to the material 12 when the material 12 is stopped for cutting.

The trimming or slitting by the slitting heads 73 takes place as the web of material 12 or panels cut therefrom are moved downstream from the cutting head 72. The slitting heads 73 each have a set of opposed feed belts 78 thereon that are driven in coordination with a pair of slitting wheels 79. The structure and operation of these slitting heads 73 are explained in detail in U.S. Pat. No. 6,736,078, filed Mar. 1, 2002, by Kaetterhenry et al. and entitled "Soft Goods Slitter and Feed System for Quilting", hereby expressly incorporated by reference herein.

The feed belts 78 and wheels 79 are geared to operate together and driven by the drive system of feed rollers 18 as the web 12 is advanced through the slitters 73. The belts 78 are operated separate from the feed rolls 18 after a panel has been cut from the web by the cutting head 72 to clear the panels from the belts 78. The slitting heads 73 are transversely adjustable on a transversely extending track 80 across the width of the frame 11 so as to accommodate webs 12 of differing widths, as explained in U.S. Pat. No. 6,736,078. The adjustment is made under the control of the controller 19 after a panel has been severed and cleared from the trimming belts 78. The slitting heads 73 and the adjustment of their transverse position on the frame 11 to coincide with the edges of the material 12 are carried out under the control of controller 19 in a manner set forth in U.S. Pat. No. 6,736,078 and as explained herein.

With the structure described above, the controller 19 moves the web in the forward direction, moves the upper bridge up, down, right and left, moves the lower bridge up, down, right and left, switches individual needle and looper drives selectively on and off, and controls the speed of the needle and looper drive pairs, all in various combinations and sequences of combinations, to provide an extended variety of patterns and highly efficient operation. For example, simple lines are sewn faster and in a variety of combinations. Continuous 180 degree patterns (those that can be sewn with side to side and forward motion only) and 360 degree patterns (those that require sewing in reverse) are sewn in greater varieties and with greater speed than with previous quilters. Discrete patterns that require completion of one pattern component, sewing of tack stitches, cutting the threads and jumping to the beginning of a new pattern component can be sewn in greater varieties and with greater efficiency. Different patterns can be linked. Different patterns can be sewn simultaneously. Patterns can be sewn with the material moving or stationary. Sewing can proceed in synchronization with panel cutting. Panels can be sewn at variable needle speeds and with different parts of the pattern sewn simultaneously at different speeds. Needle settings, spacings and positions can be changed automatically.

For example, simple straight lines can be sewn parallel to the length of the web 12 by fixing the bridges in selected positions and then only advancing the web 12 through the machine by operation of the drive rollers 18. The sewing heads 25, 26 are driven so as to form stitches at a rate synchronized to the speed of the web to maintain a desired stitch density.

Continuous straight lines can be sewn transverse the web 12 by fixing the web 12 and moving a bridge horizontally while similarly operating the sewing heads. Multiple sewing heads can be operated simultaneously on the moving bridge to sew the same transverse line in segments so that the motion of the bridge need only equal the horizontal spacing between the needles. As a result, the transverse lines are sewn faster.

Continuous patterns are those that are formed by repeating the same pattern shape repeatedly as the machine sews. Continuous patterns that can be produced by only unidirectional motion of the web relative to the sewing heads, coupled with transverse motion, can be referred to as standard continuous patterns. These are sometimes referred to as 180 degree patterns. They are sewn on the machine 10 by fixing the vertical positions of the bridges and advancing the feed rolls 18 to move the web 12, moving the bridges 21, 22 horizontally only. On the machine 10, the web 12 does not move transversely relative to the frame 1.

Figure 7A:
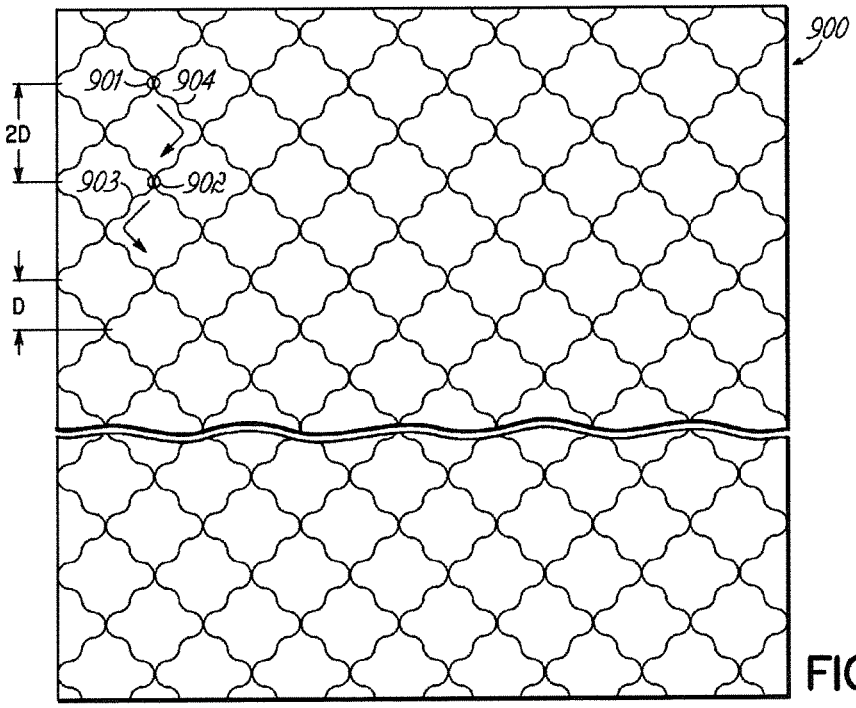
FIG. 7A is a diagram illustrating the quilting of a standard continuous pattern.

FIG. 7A is an example of a standard continuous pattern. With a traditional multi-needle sewing machine in which all of the needles sew the same patterns simultaneously, the illustrated pattern 900 can be sewn provided that there are two rows of needles spaced by the distance D. The distance D is a fixed parameter of the machine and cannot be varied from pattern to pattern. This is because the needle row spacing is fixed and all of the needles must move together. With the machine 10, described above, the distance D can be any value, because alternate stitches can be sewn with needles on one bridge while the other stitches are sewn with needles on the other bridge. The two bridges can be moved in any relationship to each other. Furthermore, if the two bridges are spaced at a vertical distance of 2D, with a needle of each bridge starting at points 901 and 902, for example, they can move in the opposite transverse directions as the web feeds upward, thereby sewing the alternate rows 903 and 904 as mirror images of the same pattern. In this way, the transverse forces exerted on the material by bridge motion will cancel, thereby minimizing material distortion.

Continuous patterns that require bidirectional web motion relative to the sewing heads are referred to herein as 360 degree patterns. These 360 degree patterns can be sewn in various ways. The web 12 can be held stationary with a pattern repeat length sewn entirely with bridge motion, then the web 12 can be advanced one repeat length, stopped, and the next repeat length can then also be sewn with only bridge motion. A more efficient and higher throughput method of sewing such 360 degree continuous patterns involves advancing the web 12 to impart the required vertical component of web versus head motion of the pattern, with the bridges sewing only by horizontal motion relative to the web 12 and the frame 11. When a point in the pattern is reached where reverse vertical sewing direction is required, the web 12 is stopped by stopping feed rolls 18 and the bridge or bridges doing the sewing are moved upward. When the vertical direction must be reversed again, the bridge moves downward with the web remaining stationary until the bridge reaches the initial position from which its vertical motion started and the web's motion stopped. Then web motion takes over to impart the vertical component of the pattern until the pattern needs to be reversed again. This combination of bridge and web vertical motion prevents the bridge from walking out of range.

Figure 7C:
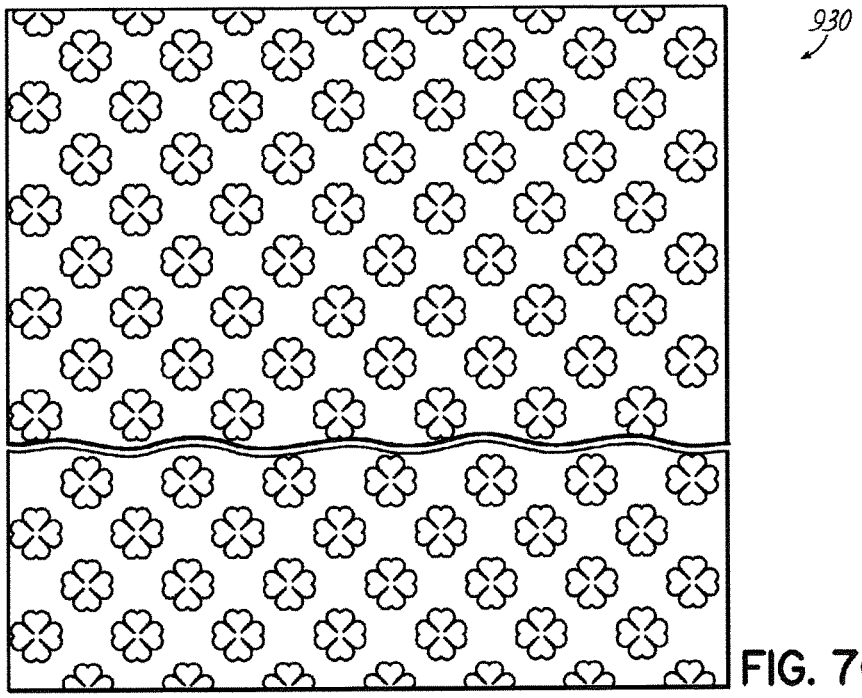
FIG. 7C is a diagram illustrating the quilting of a discontinuous pattern.
Figure 7B:
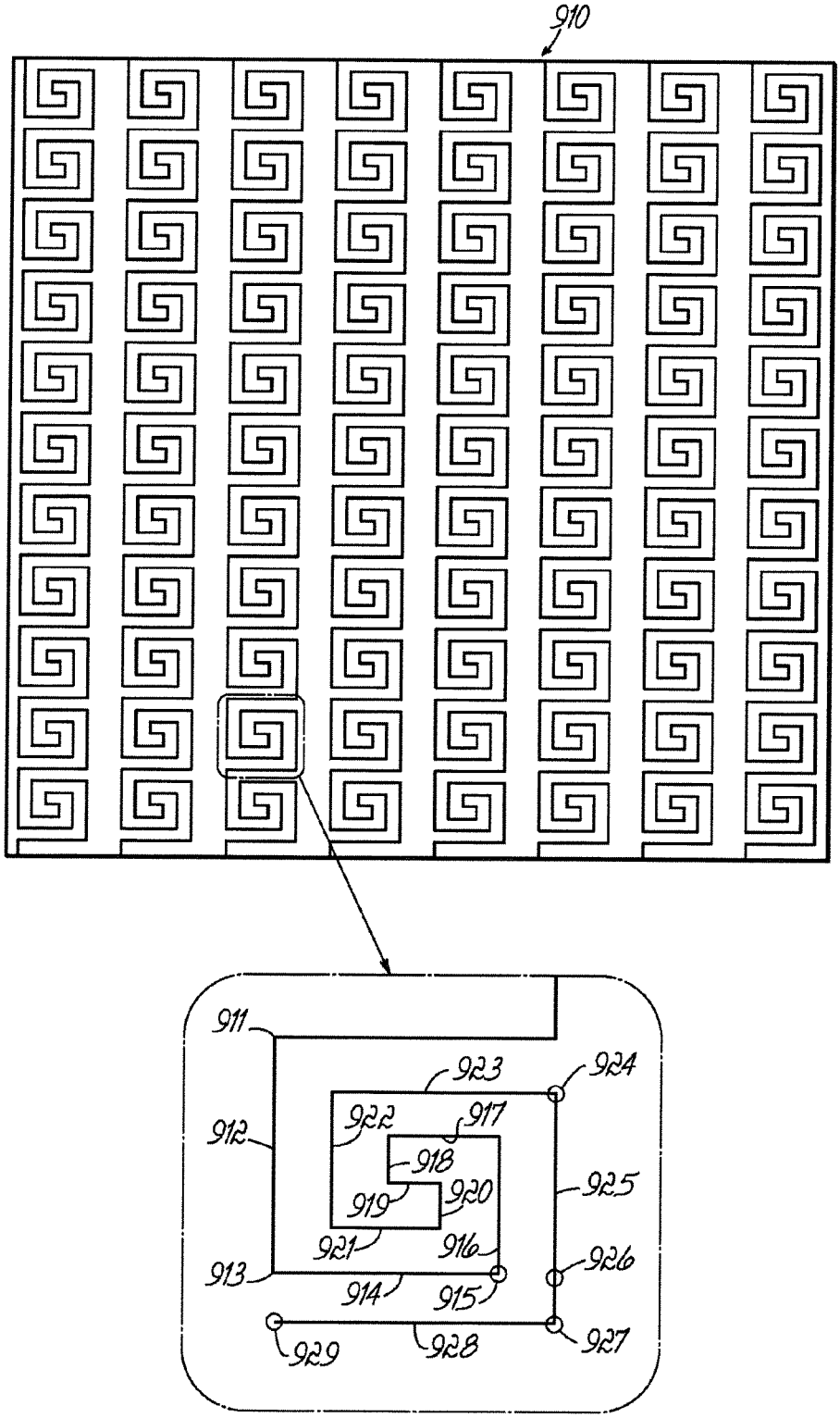
FIG. 7B is a diagram illustrating the quilting of a 360 degree continuous pattern.

An example of a 360 degree continuous pattern 910 is illustrated in FIG. 7B. The sewing of this pattern starts, for example, at point 911 and vertical line 912 is sewn only with upward vertical web motion. Then, at point 913, the web stops and the horizontal line 914 is sewn with transverse bridge motion only to point 915, then with upward bridge motion only to sew line 916, then transverse bridge motion only to sew line 917, then with downward vertical bridge motion only to sew line 918, then transverse bridge motion only to sew line 919, then downward vertical bridge motion only to sew line 920. Then line 921 is sewn with transverse bridge motion only, then line 922 is sewn with upward bridge motion only, then line 923 is sewn with transverse bridge motion only to point 924. At this point and along the line 923, the bridge is at the farthest distance below its initial position than at any point in the pattern. Then, the bridge moves downward to sew line 925 as far as point 926, which is adjacent point 915 where the vertical bridge motion started, at which point 926, the bridge is back to its initial vertical position, whereupon its vertical motion stops and the web moves upward to sew the line further to point 927. Then transverse bridge motion only sews line 928 to point 929, which is back to the beginning point of the pattern.

Discontinuous patterns that are formed of discrete pattern components, which are referred to by the trademark as TACK & JUMP patterns by applicant's assignee, are sewn in the same manner as the continuous patterns, with tack stitches made at the beginning and end of each pattern component, thread trimming after the completion of each pattern component and the advancing of the material relative to the needles to the beginning of the next pattern. 180 degree and 360 degree patterns are processed as are continuous patterns. An example of such a 360 degree pattern 930 is illustrated in FIG. 7C. One simple way to sew these patterns is to sew the patterns with bridge motion, tack the patterns and cut the threads, then jump to the next repeat with web motion only. However, adding web motion as in FIG. 7B to the pattern sewing portion can increase throughput.

Figure 7D:
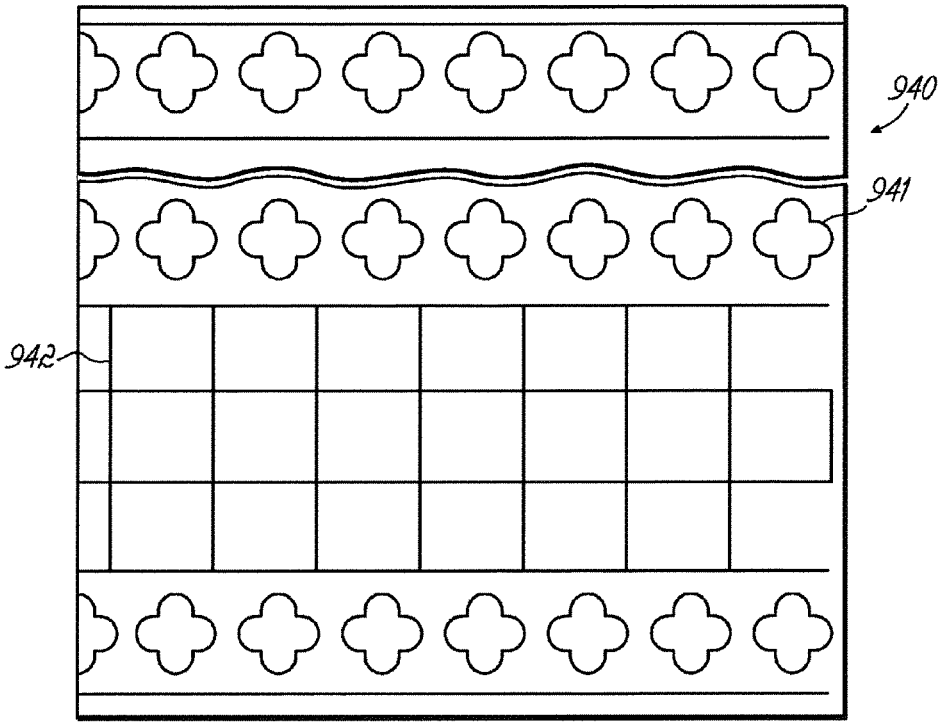
FIG. 7D is a diagram illustrating the quilting of different linked patterns.

Different patterns can be linked together according to the concept described in U.S. Pat. No. 6,026,756. FIG. 7D is an example of linked patterns that can be sewn on the machine 10 without vertical motion of a bridge, with the two bridges sharing the sewing of the clover-leaf patterns 941 by sewing the opposite sides as mirror images. Alternatively, one bridge can sew the patterns 941 as 360 degree discontinuous patterns while the other bridge sews the straight line patterns.

Figure 7E:
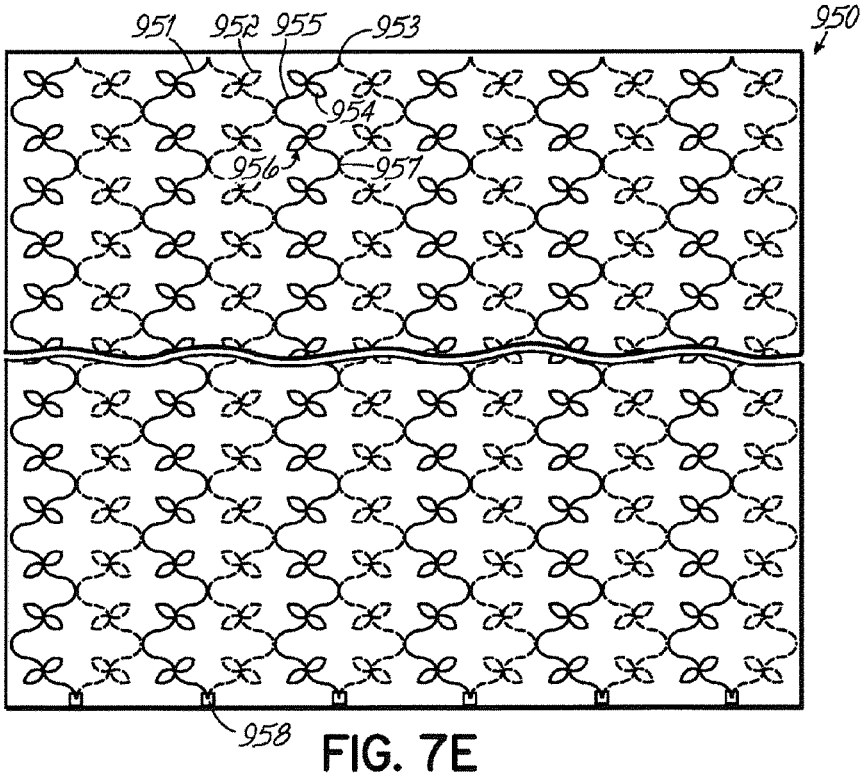
FIG. 7E is a diagram illustrating the quilting of variable length, continuous 360 degree patterns.

FIG. 7E illustrates a continuous 360 degree pattern 950 sewn with one bridge sewing alternative patterns 951 with the other bridge sewing a mirror image 952 of the same pattern. This pattern 950 is sewn using similar web and bridge vertical motion logic as pattern 910 of FIG. 7B. In determining the apportionment of vertical motion between the bridges and the web, the controller 19 analyzes the pattern before sewing begins. In such a determination, at the start of each pattern repeat, the transverse position at the end of the repeat must be the same as it was when the pattern started and the vertical web position must be the same or further downstream (up). The pattern 950 may be sewn with the lower bridge first sewing tack stitches at points 953 and sewing patterns 951. The sewing will use bridge horizontal motion and only web vertical motion until points 954 are reached. Then, the web stops and the bridge sews vertically, down then up, to point 955, at which the bridge is at the same longitudinal position on the web and the same vertical position as it was at point 954. Then the web feed takes over for the sole vertical motion and the sequence is repeated for the second half of the pattern 956.

When point 957 is reached, the second bridge begins patterns 952 with a tack stitch at point 953, which it sews in the same manner as the first bridge sewed pattern 951, except with the horizontal or transverse direction being reversed. The sewing continues with the bridges and web moving vertically the same and simultaneously for both patterns 951 and 952, with transverse motion of one bridge being equal and opposite to the transverse motion of the other bridge. The sewing continues until the lower bridge reaches point 958, where tack stitches are sewn and the threads are cut. After one more pattern repeat, the second bridge comes to the same point, and it sews tack stitches and its threads are cut.

Figure 7F:
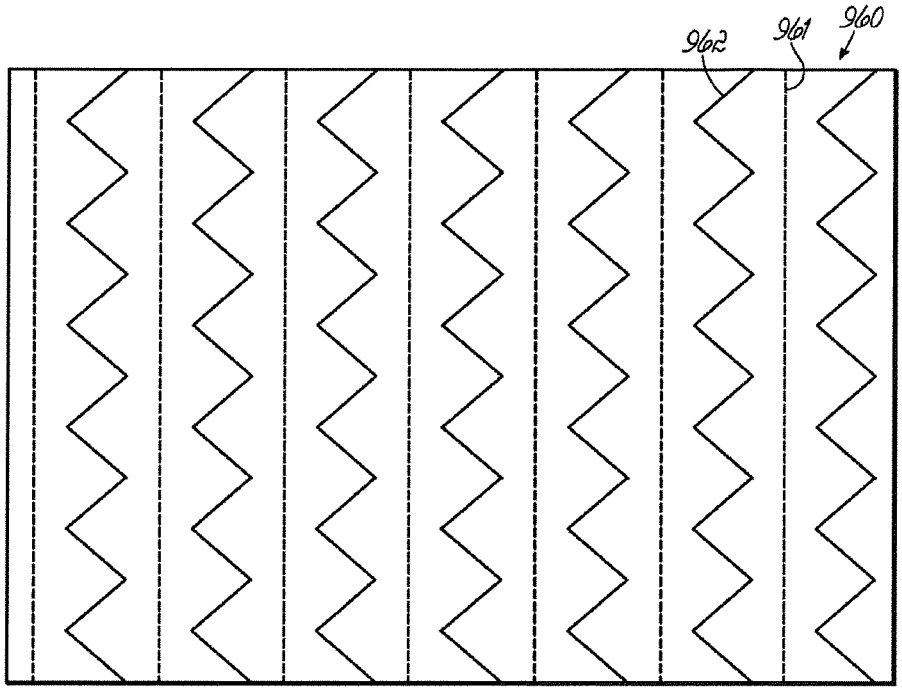
FIG. 7F is a diagram illustrating the simultaneous quilting of continuous mirror image patterns.

Two different patterns can be sewn simultaneously by moving one bridge to form one pattern and the other bridge to form another pattern. The operation of both bridges and the sewing heads thereon are controlled in relation to a common virtual axis. This virtual axis can be increased in speed until one bridge reaches its maximum speed, with the other bridge being operated at a lower speed at a ratio determined by the pattern requirements. Pattern 960 of FIG. 7F illustrates this. With one bridge sewing the vertical lines of pattern 961 and the other bridge simultaneously sewing the zig-zag lines of pattern 962, the stitching rates of the two bridges must be different. Since the stitched series for pattern 962 is longer than that for pattern 961, pattern 962 is driven at a one-to-one ratio to a virtual axis or reference which is set at the maximum stitching speed. If the lines of pattern 962 are at a 45 degree angle, for example, the stitch rate for pattern 961 will be set at 0.707 times the rate of that of pattern 962.

Figure 7G:
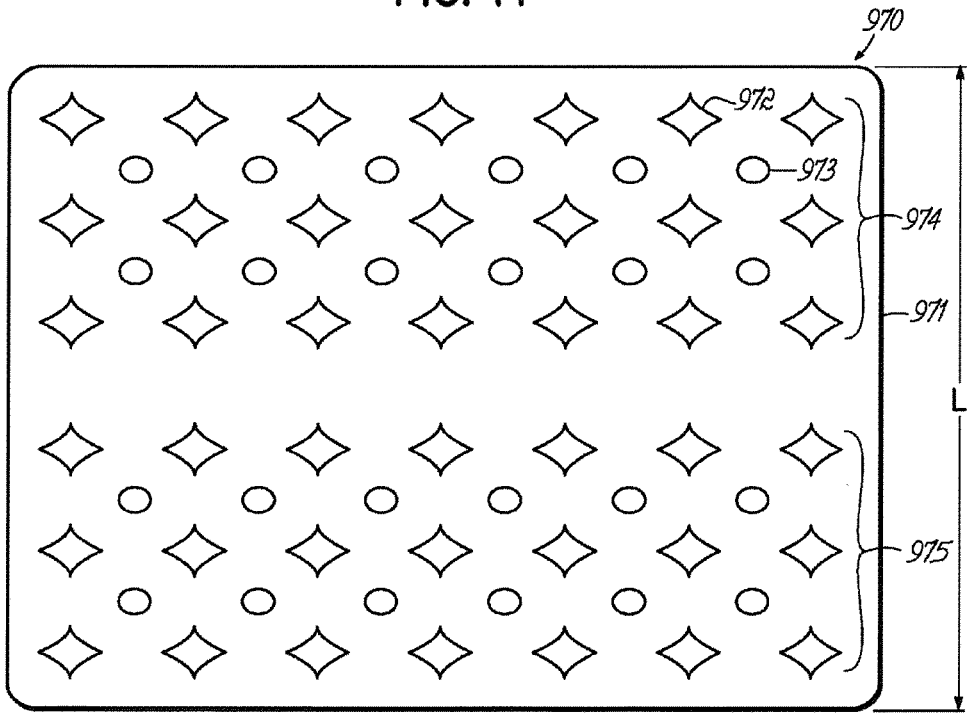
FIG. 7G is a diagram illustrating the simultaneous quilting of different patterns.

Patterns can be sewn by combinations of vertical and horizontal motion of the bridges while the material is being advanced, thereby making possible the optimizing of the process. FIG. 7G, for example, shows a pattern 970 made up of a straight line border pattern 971 in combination with diamond patterns 972 and circle patterns 973. If the overall panel is larger than the 36 inch vertical bridge travel, for example if dimension L is 70 inches, stitching can proceed as follows: the diamonds and circles of the upper half 974 of the panel are sewn first, with one bridge sewing the diamonds and the other sewing the circles, or some other combination, using 360 degree logic, with the web stationary. Then the border pattern 971 is sewn with the web moving 35 inches upward during the process, sewing vertical and horizontal lines as described above. Then the diamonds and circles of the bottom half 975 of the panel being sewn. Alternatively, the upper half of the panel can be sewn with the upper circle and diamond patterns being sewn by the top bridge and the lower circle and diamond (two rows) being sewn with the bottom bridge. Then after the border lines are sewn, the circle and diamond patterns of the lower panel half can be similarly apportioned between the bridges.

Where different patterns are to be sewn with different needle combinations from panel to panel, or where different portions of a panel are to be sewn with different needle combinations, the controller can switch the needles on or off. These features can be used to sew pattern combinations as described in U.S. Pat. No. 6,026,756, hereby expressly incorporated by reference herein. With the machine 10 described herein, a wider variety of patterns can be combined and efficiently sewn.

Figure 7H:
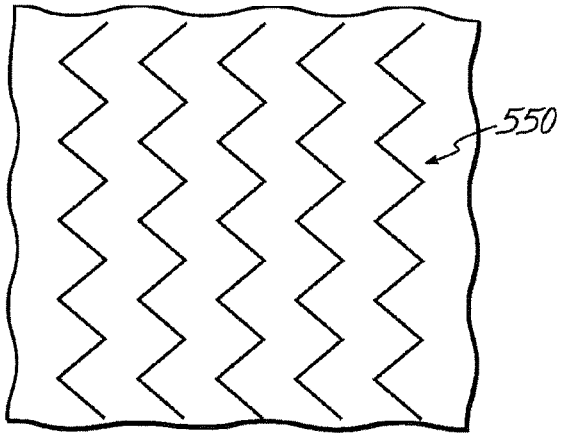
FIG. 7H is a diagram illustrating a portion of a continuous quilted pattern.
Figure 7I:
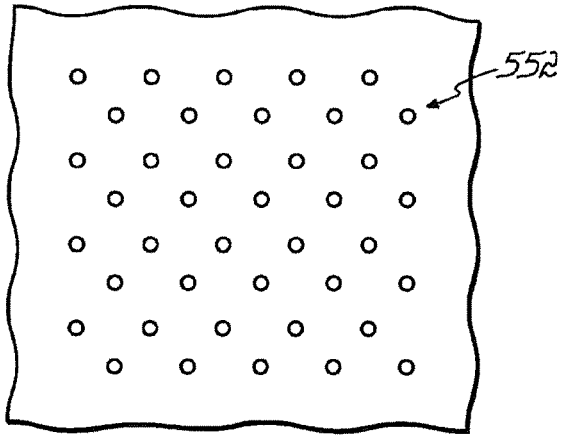
FIG. 7I is a diagram illustrating a portion of a discontinuous, TACK-AND-JUMP quilted pattern.
Figure 7J:
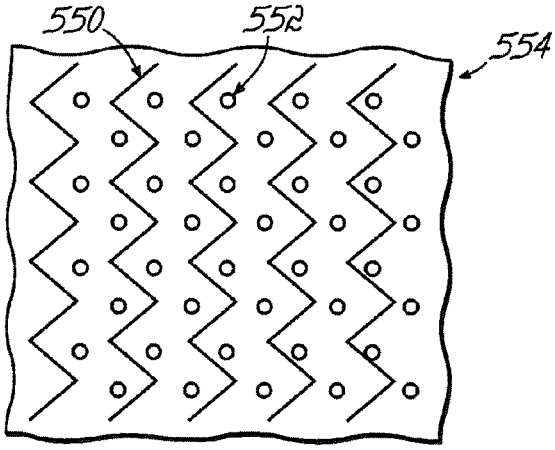
FIG. 7J is a diagram illustrating a portion of a combination of the continuous and discontinuous quilted patterns of FIGS. 7H and 7I.

Embodiments of the present invention include new complex patterns. One class of complex patterns provided combines continuous patterns, as for example the zig-zag pattern 550 shown in FIG. 7H with a discontinuous pattern, such as, for example, the circle array pattern 552 shown in FIG. 7I. The pattern 552 can be a pattern known as a TACK AND JUMP pattern in which pattern components are sewn, then a tack stitch sequence is sewn and the top thread (at least) is cut, then a jump is implemented in which the stitching elements move to new starting points on the material where the quilting of new pattern components is begun. Such patterns 550 and 552 can be sewn to produce a combination pattern 554 as shown in FIG. 7J. In so sewing the pattern 554 on the machine 10, the patterns 550 and 552 can be sewn simultaneously. The continuous pattern 550 can be sewn on a continuously advancing web with the heads of the lower bridge 21, preferably in an alternating left and right transverse, while separate TACK AND JUMP circles of the pattern 552 are sewn with heads of the upper bridge 22 in coordination with the zig-zag pattern 550. The bridge 21 can be kept in a fixed longitudinal position as the pattern 550 is sewn, with only the web moving, although the bridge 21 can be moved up and down on the machine frame as the continuous pattern 550 is sewn. The 360 degree circles of pattern 552 are sewn most conveniently sewn with both transverse and longitudinal movement of the bridge 22 to sew the circles on a moving web.

The continuous pattern 550 can be sewn with four heads of the lower bridge 21 running continuously as the web feeds downstream at a constant speed, while 360 degree circles of pattern 552 are being sewn with three heads of the upper bridge 22 sewing intermittently, tacking and cutting threads at the end of each circle pattern. Alternatively, the circles can be sewn using six heads of the upper bridge 22, three simultaneously sewing one row of three circles alternating with three other heads sewing simultaneously an alternating row of circle patterns. Using six heads requires less transverse bridge motion and allows the circles to be more widely spaced.

Figure 7K:
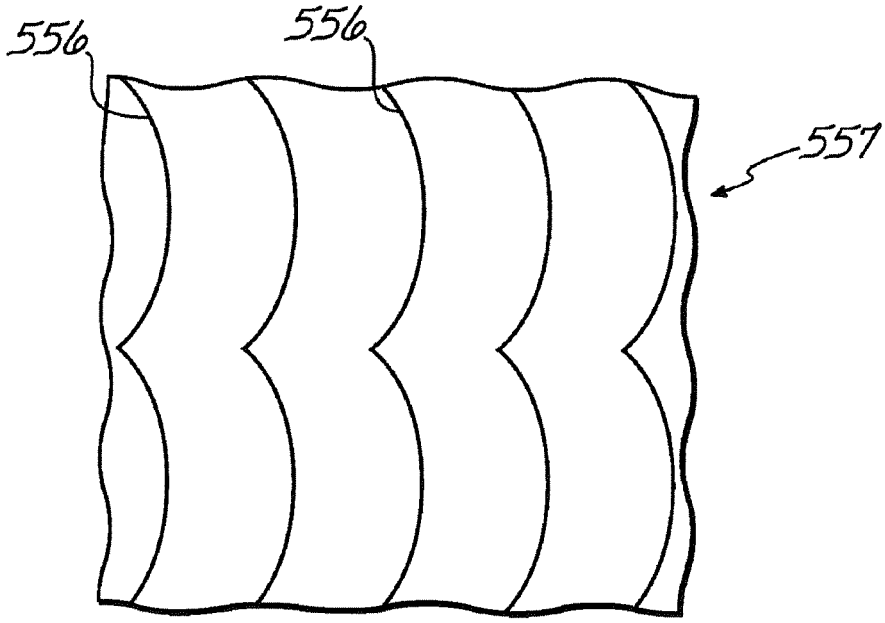
FIG. 7K is a diagram similar to FIG. 7H illustrating a portion of another continuous quilted pattern.
Figure 7L:
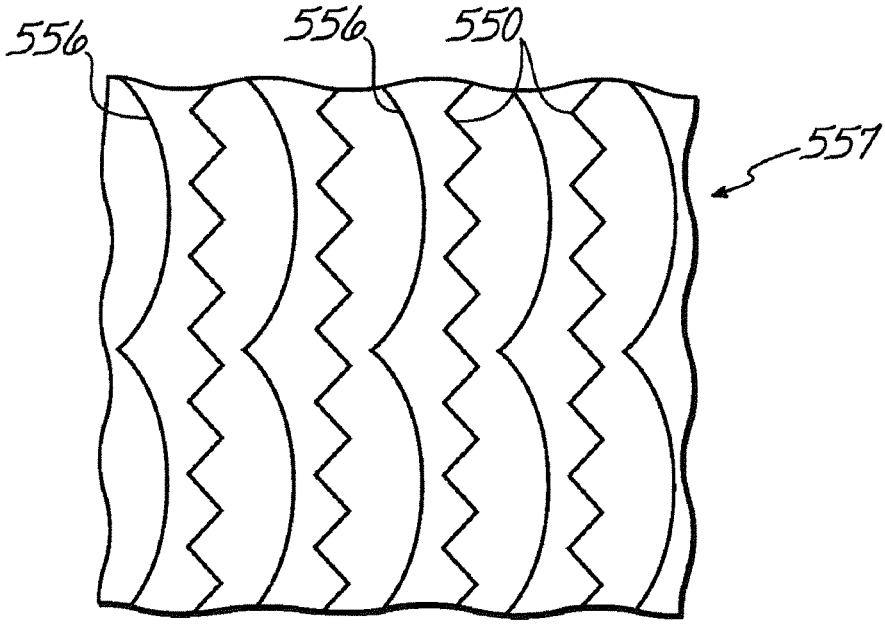
FIG. 7L is a diagram illustrating a portion of a combination of the continuous quilted patterns of FIGS. 7H and 7K.

Another continuous pattern 556, illustrated in FIG. 7K, can be combined with the continuous pattern 550 of FIG. H to produce a combination pattern 557 as illustrated in FIG. 7L. The combination pattern 557 that is made up of the two continuous pattern s550 and 556 can be quilted by sewing the pattern 550 with one bridge, for example bridge 21, and sewing the pattern 556 with the other bridge, bridge 22. In so sewing, one or both bridges 21 and 22 can be kept in fixed longitudinal positions while sewing while sewing the two continuous patterns 550 and 556 simultaneously on a continuously advancing web. Alternatively, one or both of the bridges 21, 22 can be moving longitudinally during all or part of their sewing time while sewing. Transverse motion of the bridges 21, 22 as well as the stitching speed of the heads on the two bridges can be varied relative to each other and in coordination with the longitudinal movement of the web or bridges, in a manner most efficient to acceptably produce the patterns 550 and 556 and the combination pattern 557.

Figure 7M:
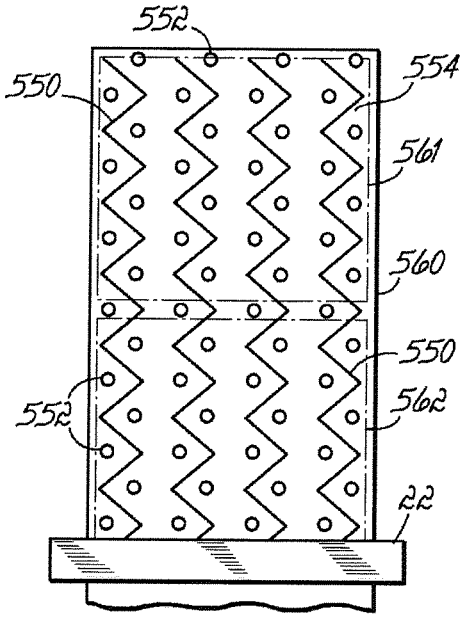
FIG. 7M is a diagram showing a length of web spanning more than one quilted panel on which is quilted a combination pattern of which at least one is continuous.
Figure 7N:
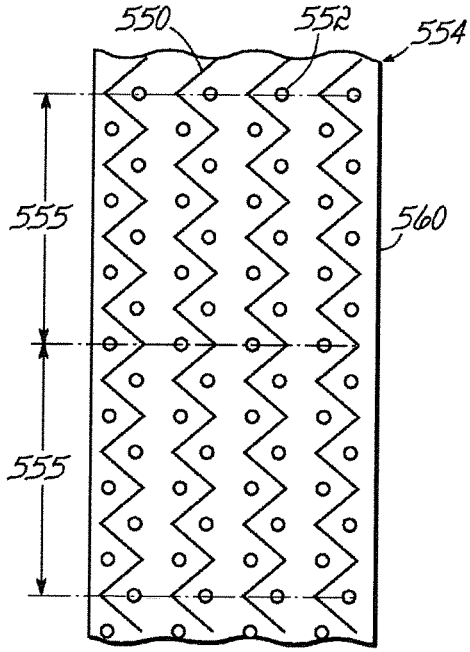
FIGS. 7N-7P are diagrams showing selected embodiments of the web of FIG. 7M.
Figure 7O:
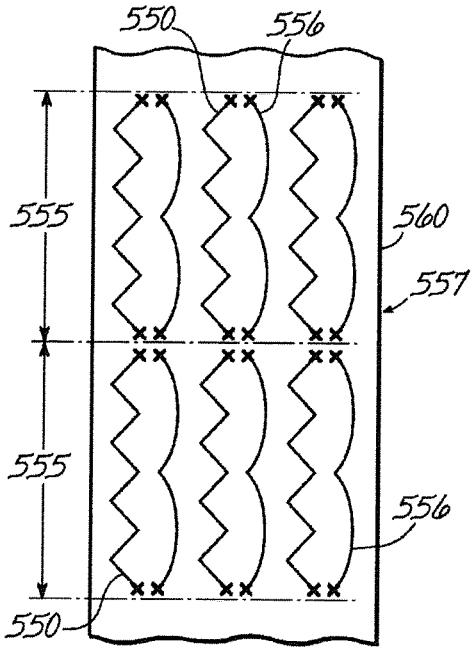
Figure 7P:
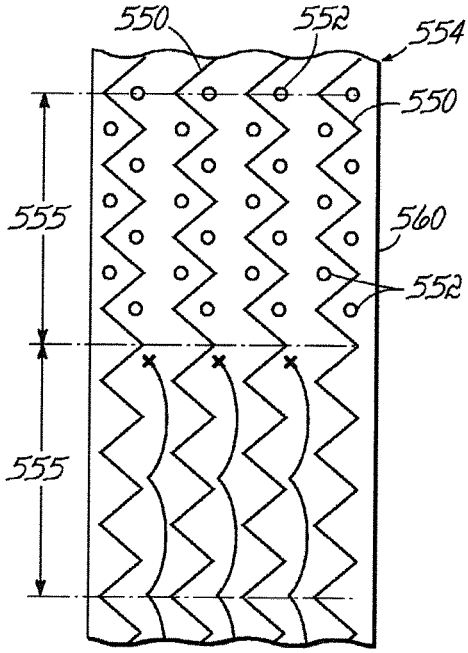

The combination patterns 554 and 557 can extend across a length of web 560 that is longer than one panel length, or that includes at least one quilted panel 561 and at least a portion 562 of another panel upstream of the panel 561 emerging from a quilting station, as illustrated in FIG. 7M. The web length 560 extends from the upper bridge 22 downstream to a panel cutoff or take-up roll. Such combination patterns can be sewn on a web at high speed and efficiently, providing a high product through-put. For example, as illustrated in FIG. 7N, pattern 554 extends without interruption along a length of a web of multi-layered material 560 from one panel length 555 to another, before the individual panel lengths 555 are eventually cut from the web to form individual mattress cover panels that are quilted with combination patterns 554. The continuous pattern component 550 can be sewn continuously along the multi-panel lengths of the web without cutting the treads and without sewing tack stitch sequences, thus allowing high speed production. FIG. 7O illustrates pattern 557 along a length of a web of multi-layered material 560 extending substantially the lengths of each of a plurality of panel lengths 555, but with the threads tacked between each of the panels. The pattern component 550 also can be sewn efficiently. FIG. 7P illustrates continuous pattern component 550 sewn along a multi-panel length web with the combined pattern changing from pattern 552 to pattern 556 between panels while the pattern 550 continues unchanged on a length of the web 560. The intermediate quilted product webs 560 are most useful for the efficient production of quilted panels having combination patterns of which at least one is continuous.

Figure 9:
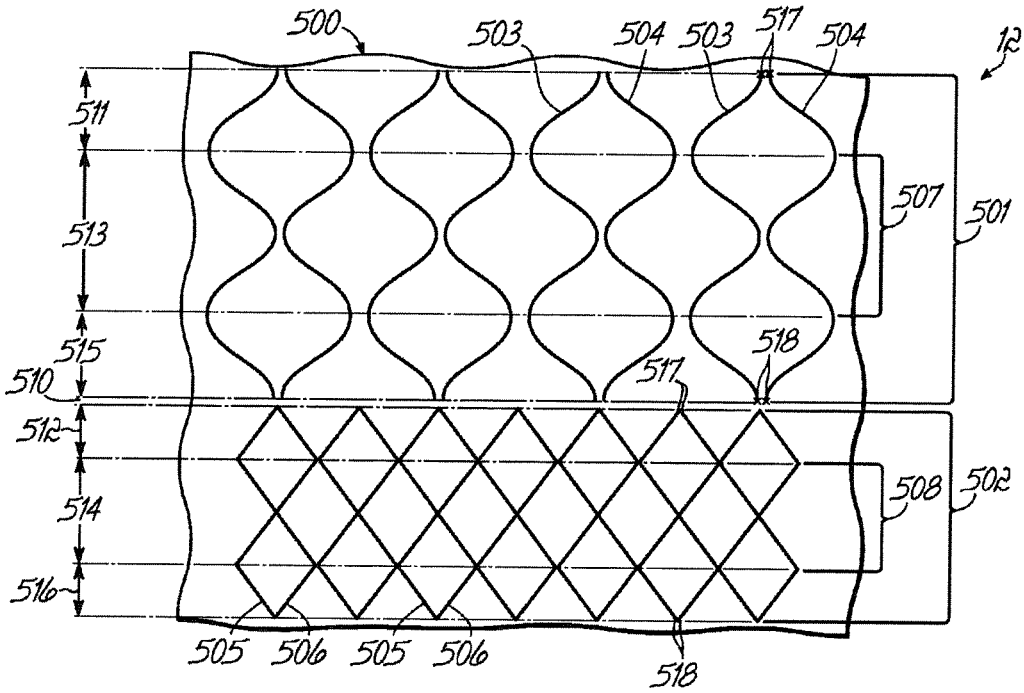
FIG. 9 is a diagram illustrating a combination pattern made up of closely spaced diverse patterns quilted according to one embodiment of the present invention.

With the quilting machine 10 described herein, other patterns can be sewn that have either not been possible or practical with machines of the prior art. For example, FIG. 9 shows a section 500 of the quilted web 12 on which two pattern sections 501 and 502 have been quilted. Both of these patterns are selected as continuous, unidirectional patterns for simplicity, but the principles discussed in connection with the sewing of these patterns can be combined with the principles discussed above in connection with many of the patterns of FIGS. 7A-7G to produce other, more complex patterns and combinations of patterns to provide advantages of additional features and sewing techniques. The patterns 501 and 502 on the web section 500 have some common characteristics as well as some distinctive properties. Both are continuous unidirectional patterns of types that have been each separately produced on fixed-needle, multi-needle quilting machines where the same pattern extends from one of a panel to the other. The pattern 501, for example, is referred to as an "onion" pattern, which is formed of alternating, generally-sinusoidal curves 503 and 504. These curves 503,504 may be considered as identical but 180 degrees out of phase, so that they converge and diverge to produce the illustrated onion pattern 501. The pattern 502 is referred to as a "diamond" pattern, and is formed of alternating, zig-zag lines 505 and 506. These lines or curves 505 and 506 may be also considered as identical but 180 degrees out of phase, so that they too converge and diverge to produce the illustrated diamond pattern 502. The two curves 503, 504 of the pattern 501 are made up of pattern repeat cycles 507, while the two curves 505, 506 of the pattern 502 are made up of repeat cycles 508. The two patterns 501 and 502 are separated by a small length 510 of the web 12.

Each of the patterns 501 and 502 may be considered as being made up of (1) a starting length 511 and 512, respectively, that is spanned by 180 degrees, or half, of a pattern repeat cycle, (2) an intermediate length 513 and 514, respectively, that is spanned by one or more 360 degree, or full, pattern repeat cycles, and (3) an ending length 515 and 516, respectively, that is also spanned by 180 degrees of a pattern repeat cycle. These lengths 511-516 are described for a web 12 that moves upward in FIG. 9 through the machine 10 and is quilted from top to bottom in the figure. Each curve of the patterns 501 and 502 begins with a tack stitch sequence 517 and ends with a tack stitch sequence 518. The tacked beginnings and ends of these curves and the longitudinal proximity of the end tacks 518 of one pattern and the beginning tacks 517 of the next pattern are particularly advantageous features of this aspect of the present invention. The length 210 of web 12 between the patterns 501 and 502 may be less than the length of 180 degrees of the pattern, even substantially less, for example, 90 degrees, 15 degrees or zero degrees. This inter-pattern length 210 may be present on a panel where the panel is made of two of the same or different patterns, such as both of the patterns 501 and 502 as illustrated, or may be present at the boundary between two panels. Where the inter-pattern length 210 lies on the boundary between two patterns, the panels may be cut in this region, thereby minimizing or eliminating waste of the material of the web 12 between the panels. In FIG. 9, each of the patterns 501 and 502 is shown as two pattern cycles long, with each respectively made up of one half-cycle long starting length 511 or 512, one full-cycle long intermediate length 513 or 514, and one half-cycle long ending length 515 or 516.

While each of the patterns 501 and 502 can be sewn on prior art multi-needle quilting machines such as described in U.S. Pat. No. 5,154,130, there are limitations, as can be appreciated by reference to FIG. 9A. This is in part because, with the conventional multi-needle quilting machines, multiple rows of needles are mounted on a common rigid sewing head structure on which the needles are fixed and the rows are constrained to a fixed distance apart, with all of the needles of all of the rows stitching simultaneously and maintaining the fixed relationship determined by their arrangement on the sewing head structure. The simultaneous stitches are formed by the needles of a first row, at positions 521, spaced a transverse distance 522 from each other, and needles of a second row, at positions 523, spaced a transverse distance 524 from each other, with the rows being spaced a longitudinal distance 525 apart. This needle arrangement defines the relative dimensions of the components, particularly in the longitudinal direction, of the onion designs of the pattern 501 in FIG. 9A. Similar dimensional limitations are the result of the needle positions 526 transversely spaced a distance 527 on the first bar and needle positions 528 spaced a distance 529 on the second bar. The transverse spacings 527 and 529 need not be, and in FIG. 9A are not, the same for pattern 502 as the spacings 522 and 524 for pattern 502 in FIG. 9A. The longitudinal spacing 525 of the rows is the same for patterns 501 and 502 due to structural limitations of the equipment. These distances 525, 527 and 529 define the dimensions of the components of the diamond designs of the pattern 502 in FIG. 9A.

The transition from stitching the pattern 501, which, as shown in FIG. 9A, uses four needles per bar for each of two needle bars, to stitching the pattern 502, which, as shown uses seven needles per bar for each of the two needle bars, requires a change of needle settings. With at least most machines of the prior art, needle setting change is typically a manual operation. Alternatively, pattern 502 could be replaced with a pattern limited to those that use the same four needles as pattern 501, such as a pattern having four rather than seven rows of diamonds, so that no needle change would be required to change from pattern 501 to pattern 502. Further, since all of the needles of a fixed needle machine start and stop sewing at the same time, regardless of which row on the sewing head they occupy, the start and stop positions of pattern curves 503 and 504, which are sewn by needles on different rows and located at positions 521 and 523, respectively, are necessarily longitudinally spaced a distance 525 apart, leaving a half-length portion of one of the only curves 503 or 504 occupying a length of the web equal to the distance 525 at both the beginning and end of each of the patterns 501 and 502. This results in a production of a length 530 of scrap material or waste equal to two lengths 525 between adjacent patterns on the web 12, which must be cut off and discarded. This, in turn, requires that the pattern extend to the cut upstream and downstream ends of the panel. This eliminates the ability of producing a panel having a pattern spaced from the ends of the panel with the curves of the pattern that are sewn by different needle bars starting and stopping at the same point. Further, transverse alignment of tack stitches sewn by needles of different needle bars has not been known. In addition, the combination of equipment and techniques of the prior art have not been provided for the quilting of panels having two patterns with curves that start and stop in alignment and that are closely spaced to each other on the same panel, as illustrated in FIG. 9.

According to one embodiment of the invention, a pattern as illustrated in FIG. 9 is produced on a modified multiple-needle quilting machine. Such a pattern has the limitation that the repeat length 507 for pattern 501 is generally the same as the repeat length 508 for the pattern 502. In this embodiment, a multi-needle quilting machine such as that of U.S. Pat. No. 5,154,130 is provided with automatically retractable or selectable needles, so that one bar of needles may be disabled while another bar of needles is sewing. In addition, such a multi-needle quilting machine has the ability to reverse the relative motion of the web 12 relative to the bars or bridges that carry the sewing heads. While the method is explained herein for a machine in which the sewing heads are longitudinally fixed relative to a machine frame through which the web 12 moves longitudinally forward and, at least for short distances backward, the explanation applies to machines in which the sewing heads are fixed in an array on a bridge with which they can move longitudinally together relative to the material. The method is illustrated by reference to FIGS. 9B-9I.

Figure 9B:
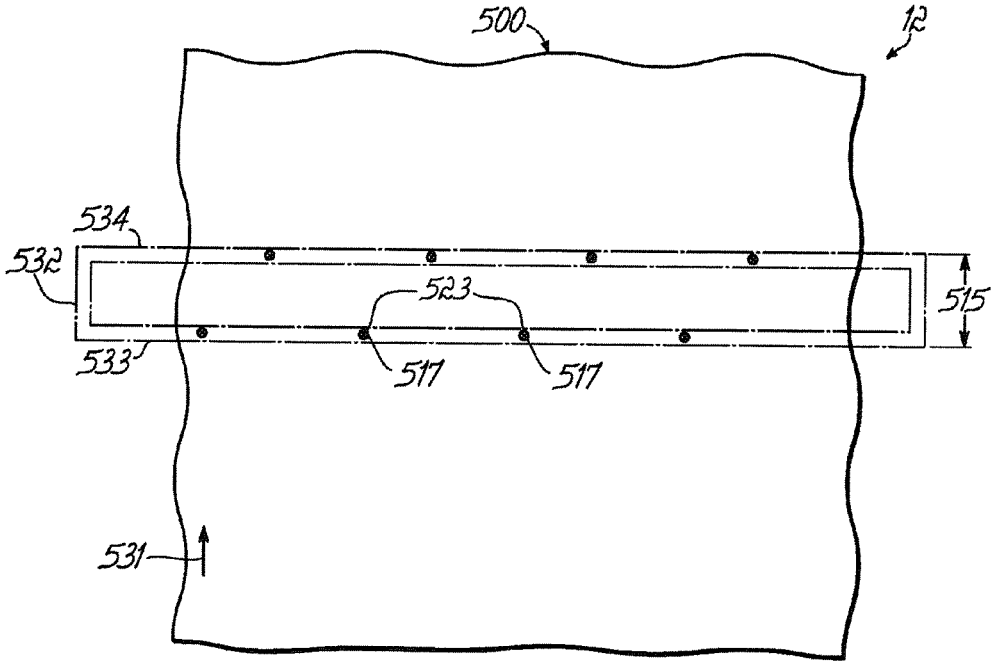
FIGS. 9B-9N are diagrams illustrating steps in quilting processes for quilting the combination pattern of FIG. 9.
Figure 9A:
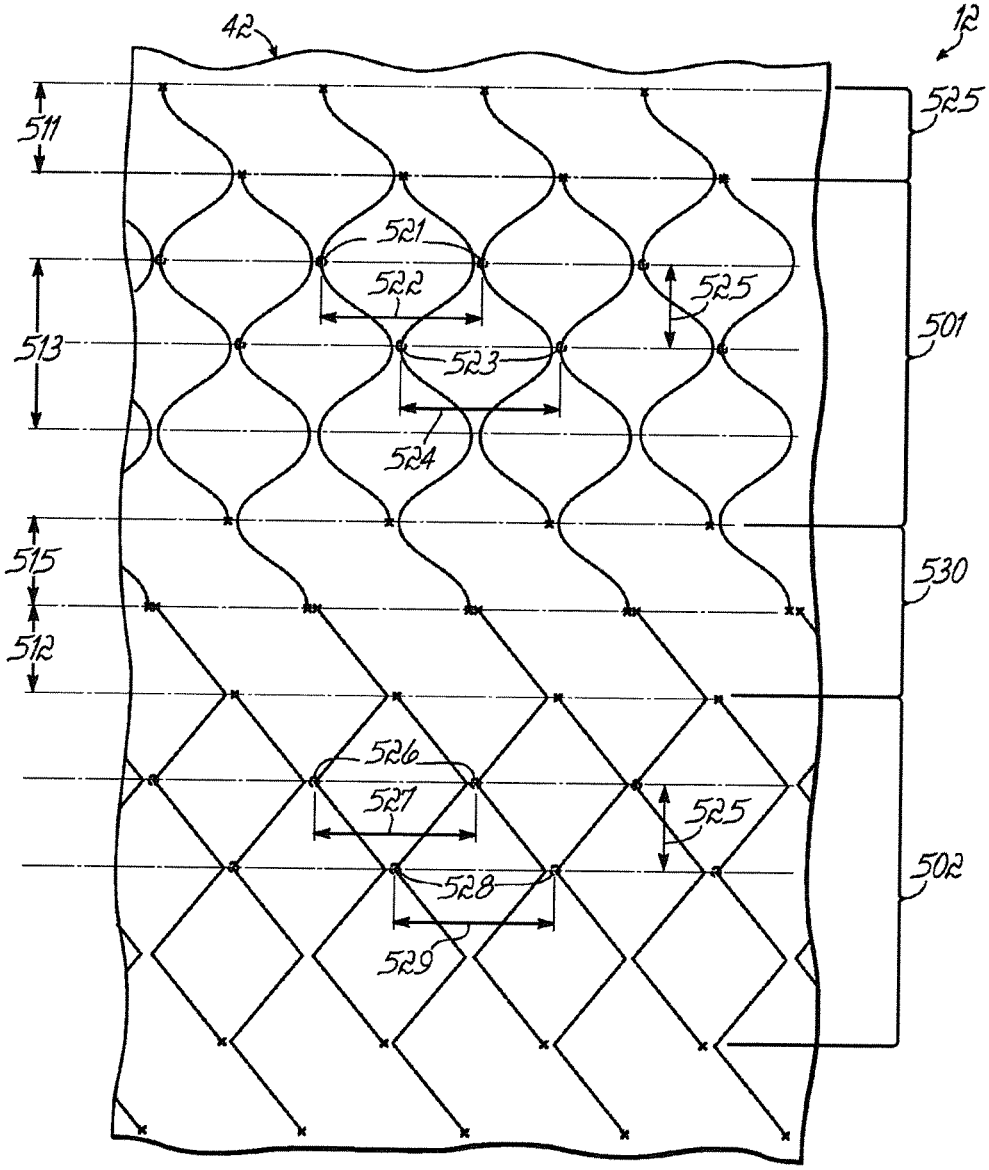
PRIOR ART FIG. 9A
FIG. 9A is a diagram illustrating a combination pattern quilted on machines of the prior art.
Figure 9C:
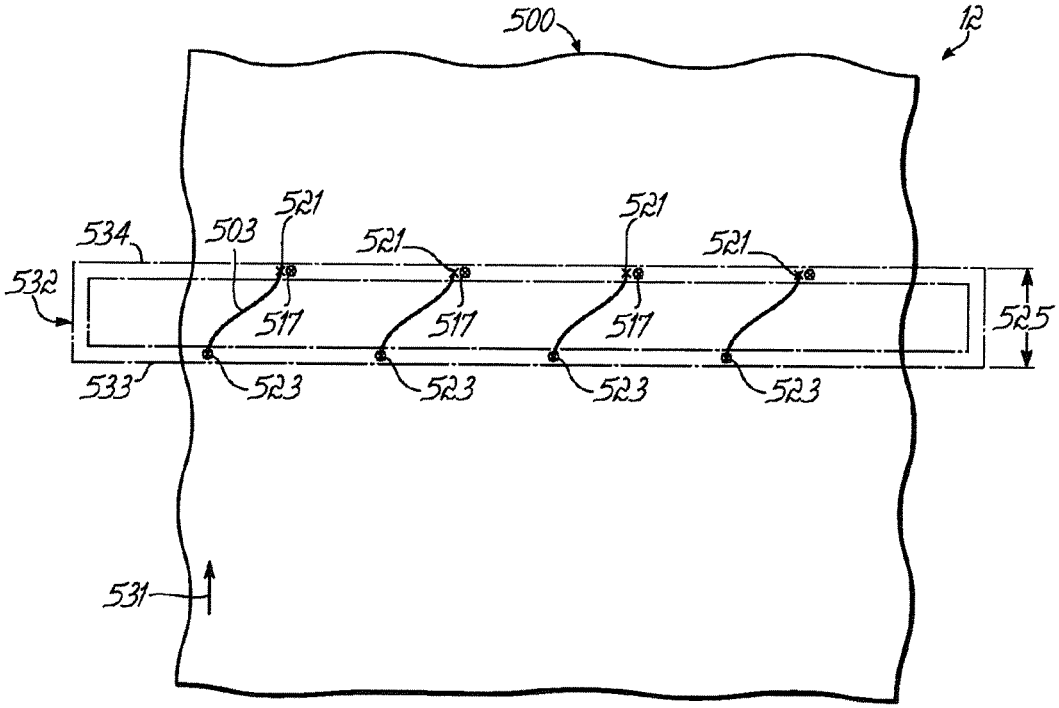
Figure 9D:
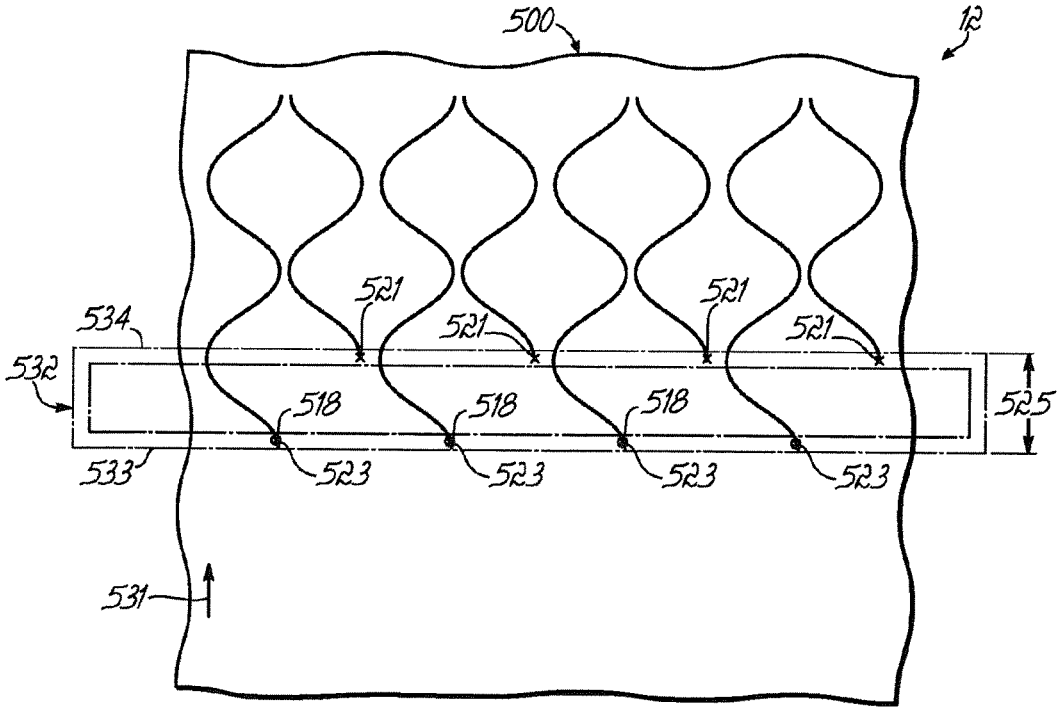
Figure 9E:
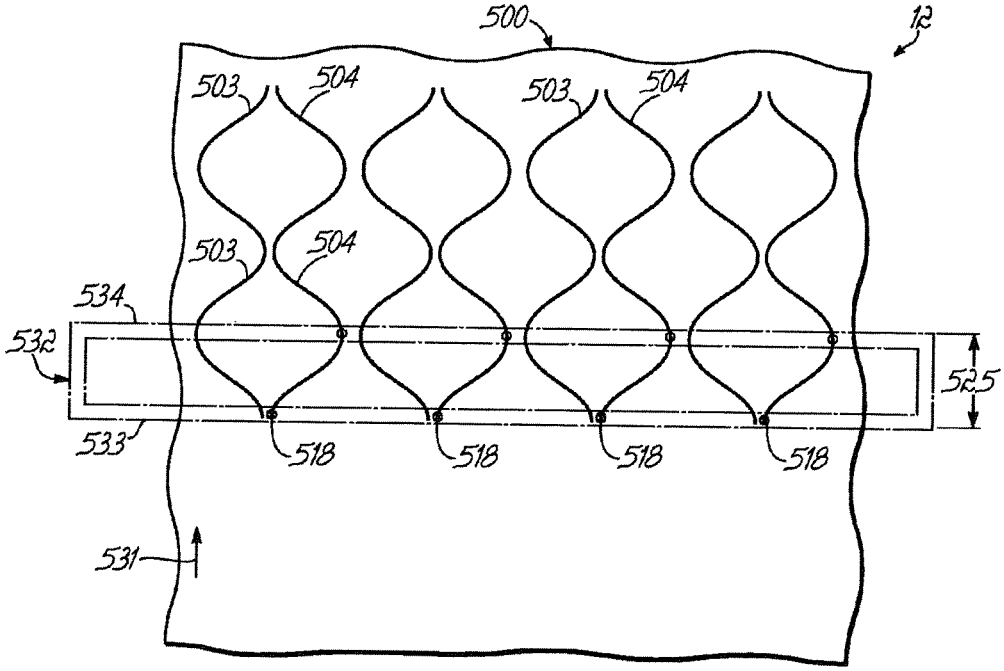

Referring to FIG. 9B, a web 12 is advanced in the direction of the arrow 531 through a quilting station having a needle bar array 532 that includes an upstream needle bar 533 and a downstream needle bar 534. The needle bars 533 and 534 are at a fixed distance 525 apart. The needles of the upstream needle bar 533 begin sewing pattern curves 503 by sewing tack stitch sequences 517 at needle positions 523. After the web 12 has advanced a distance 525, as illustrated in FIG. 9C, the needles of the downstream bar 534 are activated and begin sewing the pattern curves 504 by sewing tack stitch sequences 517 at needle positions 521 to begin sewing curves 504 at start positions that align at the same longitudinal position as the beginnings of curves 503. Then the web 12 is advanced further as both bars 533 and 534 of needles stitch curves 503 and 504 simultaneously until the position of FIG. 9D is reached, at which points tack stitch sequences 518 are sewn, the thread is cut and the needles at positions 523 on bar 533 are disabled. Sewing then continues with the needles at positions 521 on bar 534 until the web is at the position illustrated in FIG. 9E. At this position of the web 12, the needles of bar 534 sew tack stitch sequences 518, then the threads are cut and the needles of bar 534 are disabled, whereupon the pattern 501 is completed.

Figure 9F:
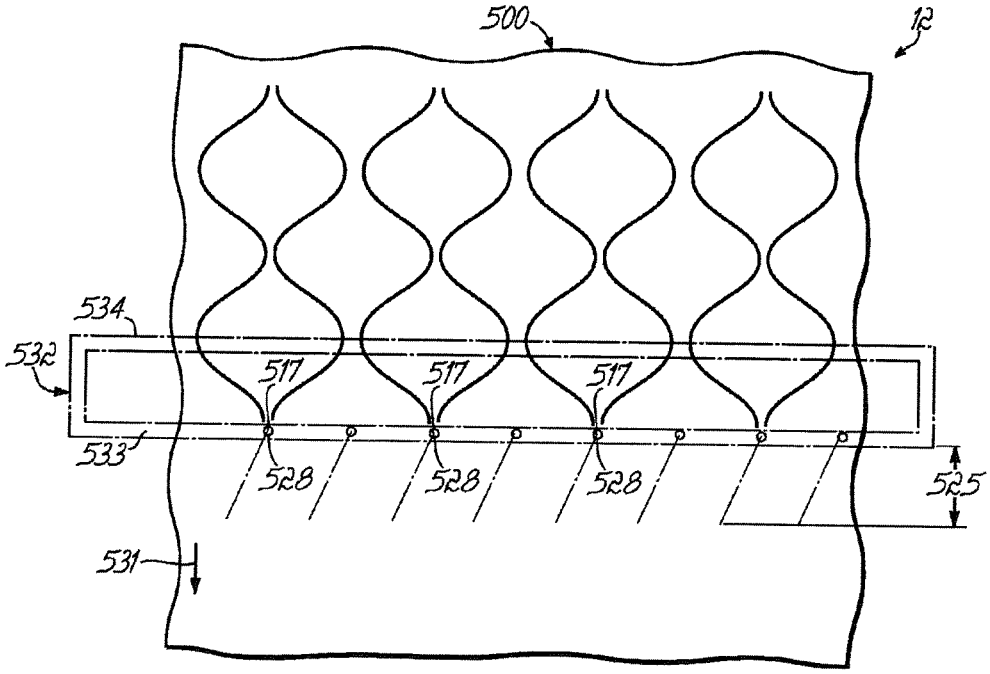

At this point the machine is ready to sew pattern 502, except that the web 12 has advanced past the upstream bar 533 and must be backed-up a distance 525 to the position shown in FIG. 9F so that pattern 502 can be sewn in a sequence similar to that for sewing pattern 501 described above in connection with FIGS. 9B-9E. For sewing pattern 502, needles at positions 528 on bar 534 are activated to sew tack stitch sequences 517 to start curves 505 which they begin to sew as the web 12 advances a distance 525. The pattern 502 can thus be started at a distance 510 from the end of pattern 501 without material waste. Then, when at the position shown in FIG. 9G, needles at positions 526 on bar 534 are activated to sew tack stitch sequences 517 for the start of curves 506. Then the web 12 is advanced further as both bars 533 and 534 of needles stitch curves 503 and 504 simultaneously until the position of FIG. 9H is reached, at which points tack stitch sequences 518 are sewn, the thread is cut and the needles at positions 528 on bar 533 are disabled. Sewing then continues with the needles at positions 526 on bar 534 until the web is at the position illustrated in FIG. 9I. At this position of the web 12, the needles of bar 534 sew tack stitch sequences 518, then the threads are cut and the needles of bar 534 are disabled, whereupon the pattern 502 is completed. If another pattern 501 or 502 is to be sewn close to the completed pattern 502, again the web 12 will have to be reversed a distance 525 to the start of the next pattern.

Figure 9G:
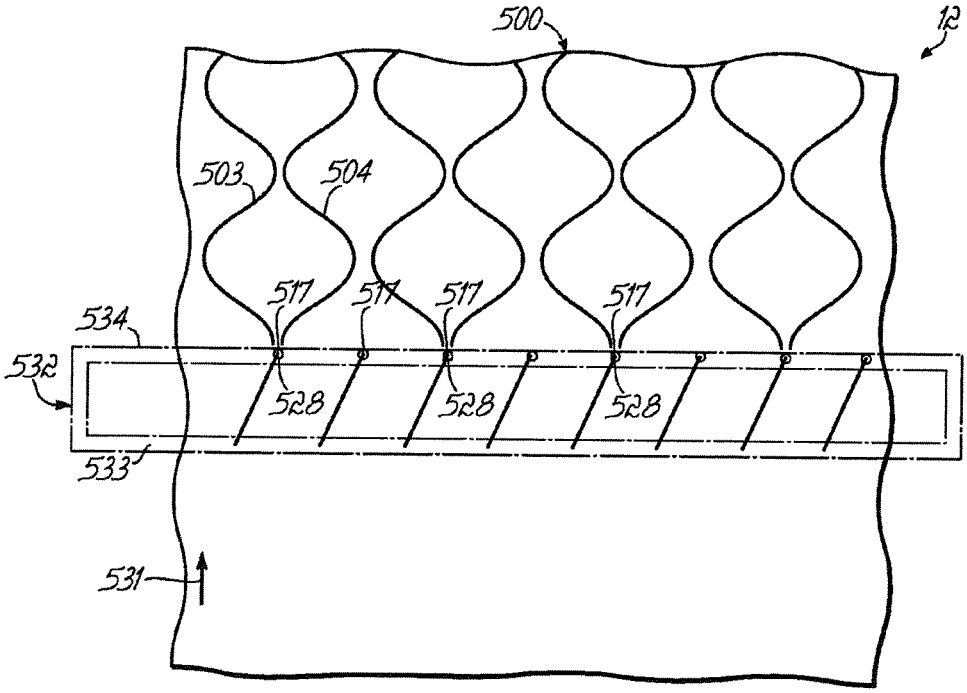
Figure 9H:
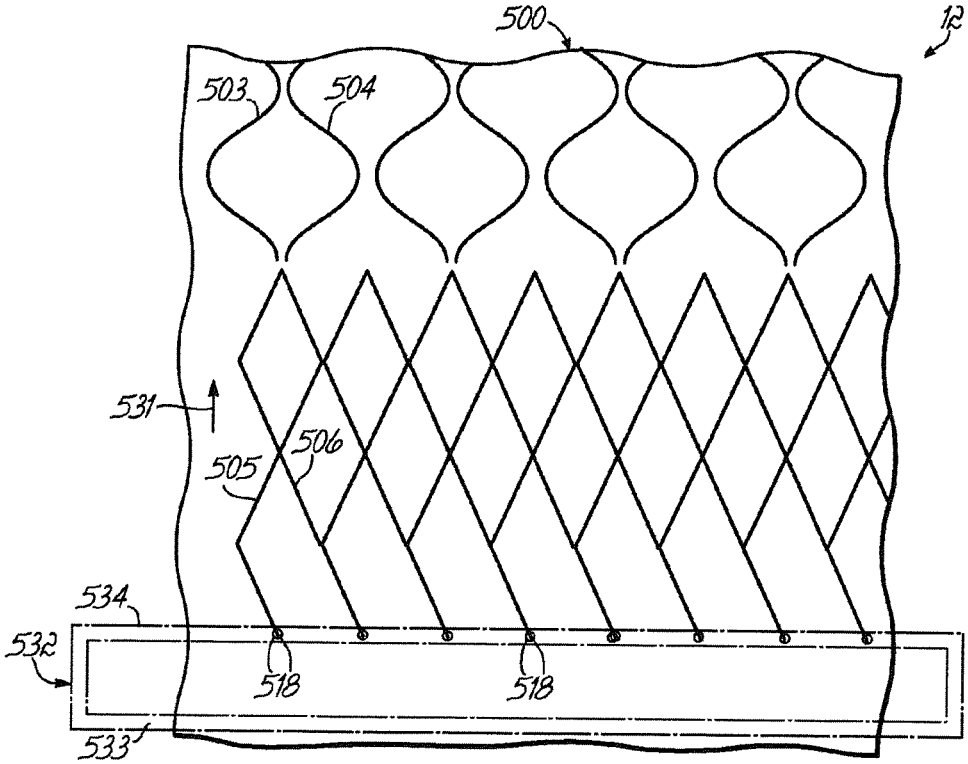
Figure 9I:
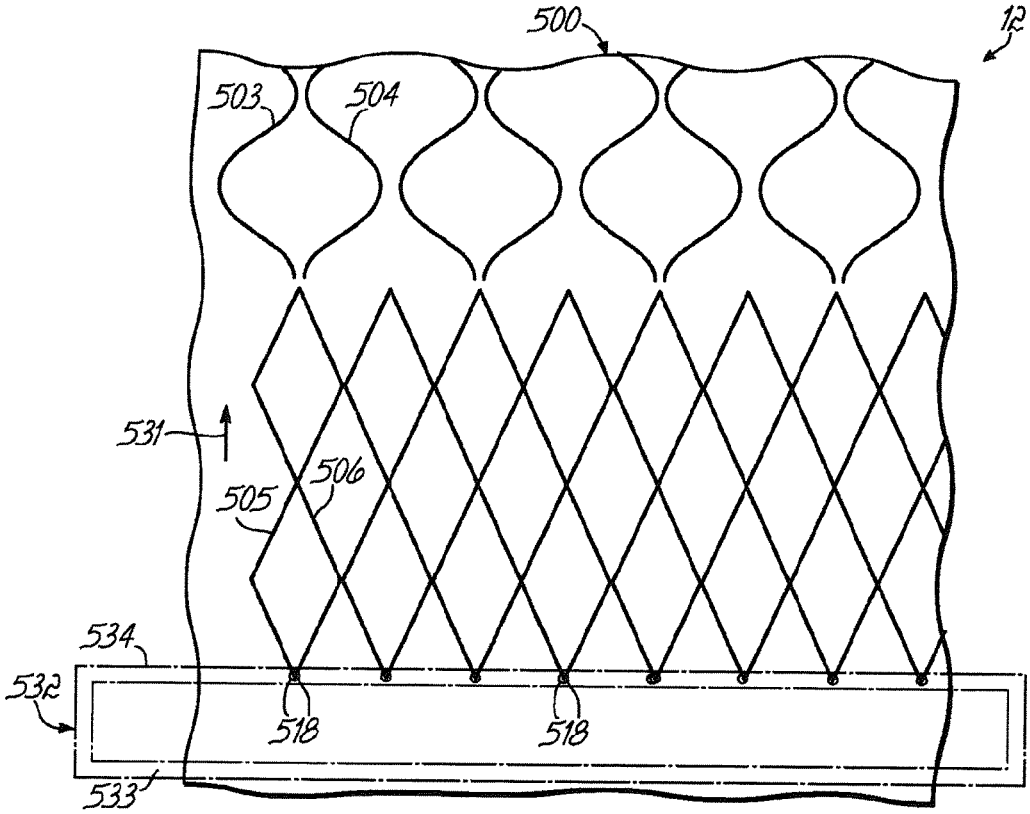

Because the needle bars 533 and 534 move together, when making the tack stitch sequences 517 in FIGS. 9C and 9G and the tack stitch sequences 518 in FIGS. 9D and 9H, the needles of the other bar will be active, and, as a result, tack stitch sequences will be sewn midway in the curves being sewn with those other needles. This may be aesthetically undesirable. As an alternative, these needles could be deactivated without cutting the threads, which cause undesirable thread handling problems with possible slack in the thread sequence or missed stitches resulting. For these and other reasons, sewing pattern combinations having the properties of patterns 501 and 502 as illustrated in FIG. 9 is preferably performed with the quilter 10, as described below in reference to FIGS. 9J-9N.

Figure 9J:
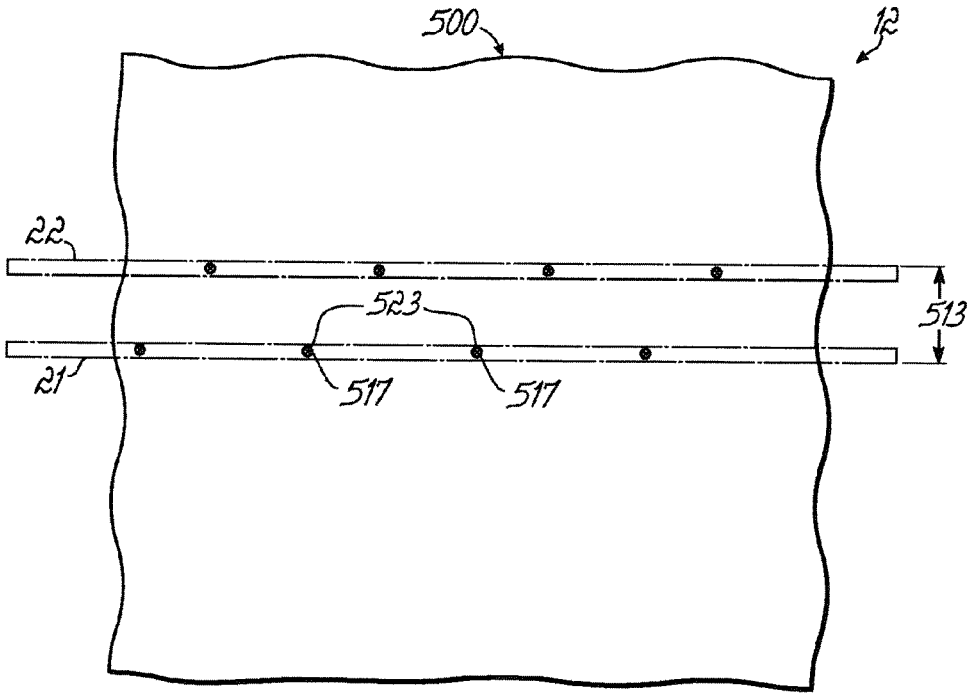
Figure 9K:
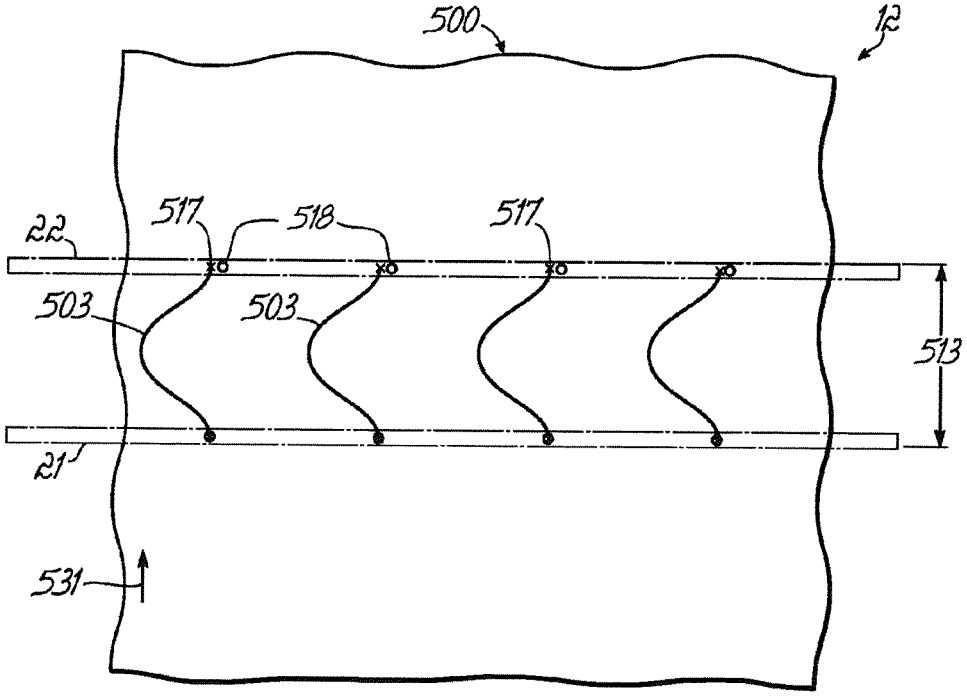
Figure 9L:
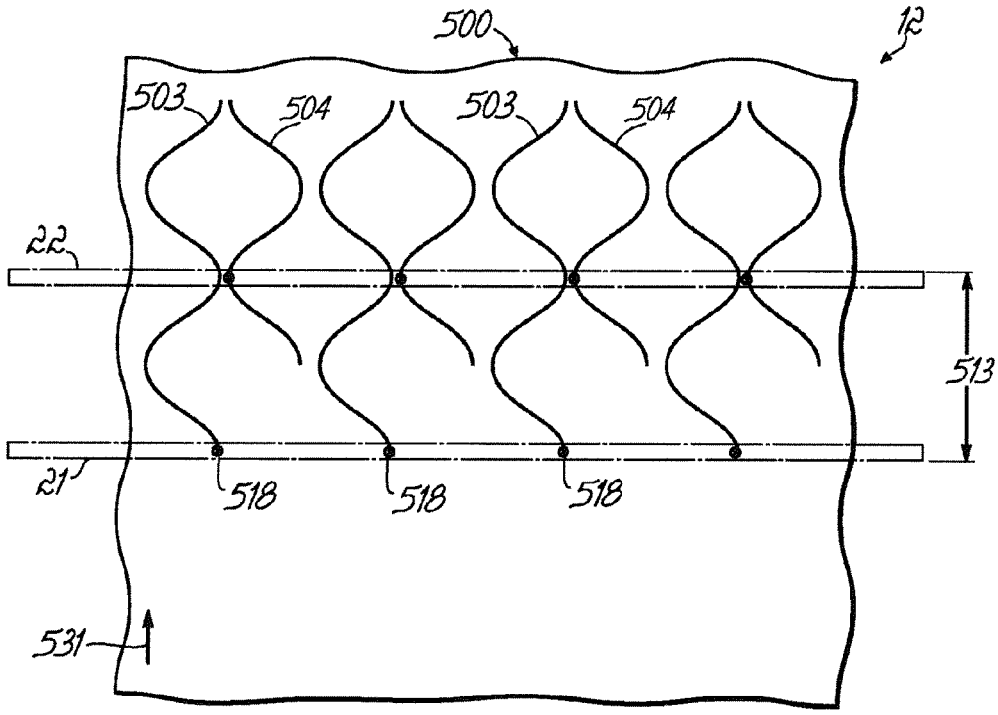

The combination of patterns 501 and 502 shown in FIG. 9 can be sewn more simply and with greater flexibility with the quilting machine 10 described above. FIG. 9J shows the bridges 21 and 22 of the machine 10 in arbitrary start positions in the middle of their travel ranges, sufficiently high on the frame to allow for some downward travel. The sewing may start with the needles of the lower bridge 21 stitching tack stitch sequences 517 at the beginnings of curves 503 of pattern 501. Then the lower bridge 21 begins to sew the curves 503 while moving downwardly with the web 12 stationary while upper bridge 22 moves downwardly to the same starting position, to the positions shown in FIG. 9K. This motion could be accompanied by, or replaced by, upward motion of the web 12. When at the starting positions, the needles of upper bridge 22 then stitch tack stitch sequences 518 at the beginnings of curves 504. Because the sewing heads on the bridges 21 and 22 can operate independently, the tack stitch sequences 518 can be sewn by upper bridge 22 while the lower bridge 21 continues uninterruptedly to stitch normal stitches of the curves 503. Furthermore, the distance that the lower bridge 21 moves downwardly can be any distance within its travel range that allows enough clearance for the upper bridge 22 to be placed at the starting position. By moving downward a full pattern cycle 513, for example, the curves 503 and 504 can be stitched with the bridges 21 and 22 moving transversely in the opposite directions, using the web-distortion reduction method described above.

Figure 9M:
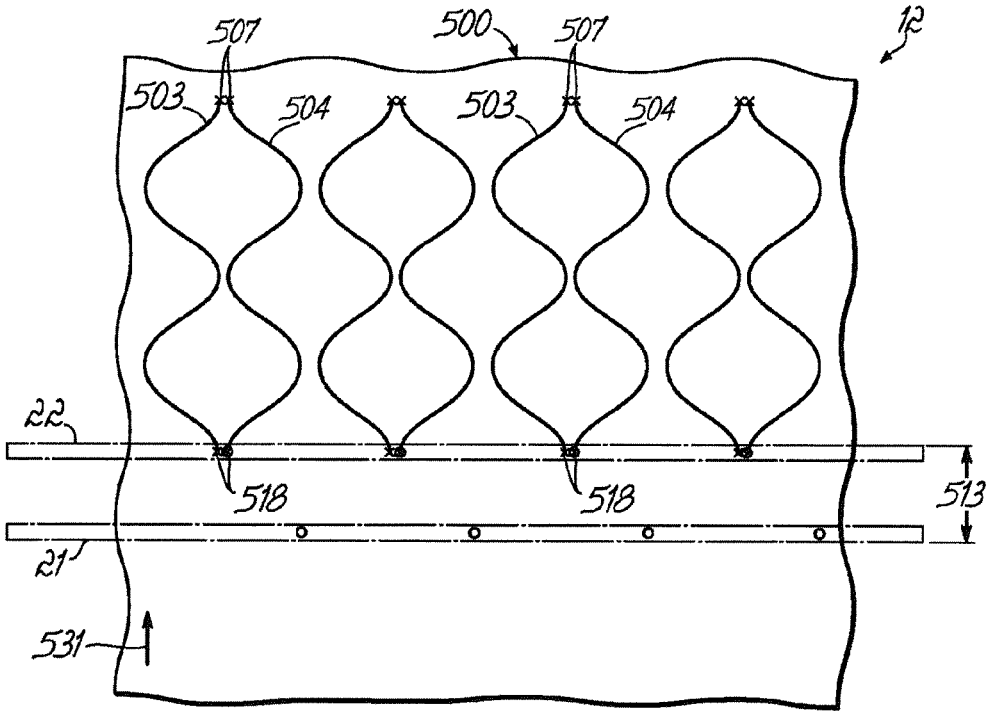

Then, with the bridges 21 and 22 longitudinally stationary, the web 12 moves upward and the curves 503 and 504 are stitched to the end of the pattern, as illustrated in FIG. 9M. On the way to this state, the web 12 passes through the position shown in FIG. 9L, where the end of the curves 503 are reached, and tack stitch sequences 518 are stitched by the bridge 21. This tack stitching sequence can be carried out with the web 12 moving continuously and the curves 504 being stitched without interruption by the bridge 22, as additional transverse and longitudinal movements are being made by bridge 21.

After pattern 501 is complete, as illustrated in FIG. 9M, the web 12 is stopped and the bridges 21 and 22 move upward until the bridge is at the same starting position that is shown in FIG. 9J. The needle heads are then activated or deactivated, as necessary, to prepare for the stitching of the new pattern. In this case, three intervening sewing heads are activated, one between each of the four heads that were activated for the stitching of pattern 501, so that all seven heads can stitch pattern 502. Then, the stitching of pattern 502 proceeds in the same general manner as did the stitching of pattern 501.

Figure 9N:
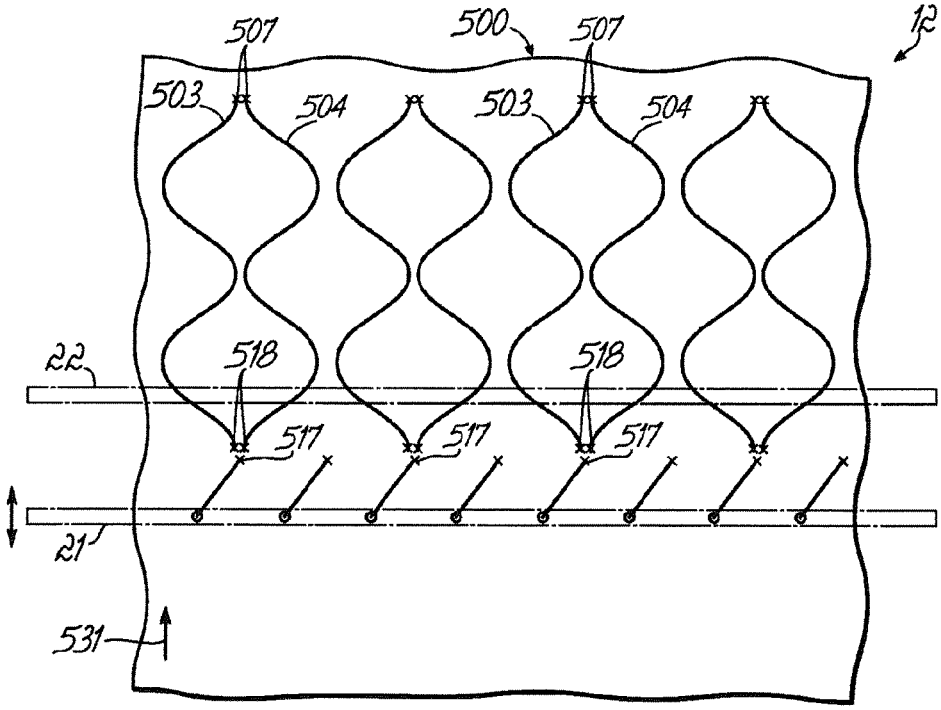

Alternatively, with the machine 10, the lower bridge 21 can proceed immediately after completing curves 503 of pattern 501 to begin stitching curves 505 of pattern 502, even while upper bridge 22 is still stitching curves 504 of pattern 501. This is illustrated in FIG. 9N. When two bridges are sewing different patterns, the controller 19 of the machine 10 controls the bridge motion, the web motion and the sewing head drives in such a way as to maintain a programmed stitch density, for example seven stitches per inch being typical, for the curves being stitched by both bridges. Usually this can be done by holding one bridge longitudinally stationary as the web moves at a constant feed rate or the heads on the stationary bridge stitch at a constant stitching rate, while compensating movements are made by controlling the other bridge and the sewing heads on the other bridge.

While the description of FIGS. 9-9M has been described in connection with continuous, unidirectional patterns, this has been done to more clearly illustrate certain features and principles. These features and principles can be used with other pattern features, such as those described in connection with FIGS. 7-7G. Where such patterns might include bidirectional longitudinal motions, the principles of the methods of FIGS. 9-9M may be the same net longitudinal forward or backward motions to such other patterns or pattern features.

Panel cutting can be synchronized with the quilting. When a point on the length of the web at which the panel is to be transversely cut from the web 12 reaches the cutoff knife head 72, the web feed rolls 18 stop the web 12 and the cut is made. Sewing can continue uninterrupted by replacing the upward motion of the web with downward motion of a bridge. This is anticipated by the controller 19, which will cause the web 12 to be advanced by the rollers 18 faster than the sewing is taking place to allow the bridge to move upward enough so it is enough above its lowermost position to allow it to sew downward for the duration of the cutting operation while the web is stopped.

The illustrated embodiments of multi-needle quilting machines set forth above provide several axes of motion that differ from those of conventional multi-needle quilting machines. Some embodiments of these quilting machines have two or more bridges that are capable of separate or independent control, each bridge being provided with a row of sewing needles that may be driven together, each separately or independently, or in various combinations. Each bridge may have an independently controllable drive for reciprocating the sewing elements, the needles and loopers. The drive is most practically a rotary input, as from a rotary shaft, that operates the reciprocating elements. Independent operation of the drives on each of the bridges can allow for independent sewing operation of the sewing heads or groups of sewing heads, or the idling of one or more heads, while one or more others is sewing.

It has been shown that each sewing head, including each needle head and each looper head, can be linked to a common rotary drive through an independently controllable clutch that can be operated by a machine controller to turn the heads on or off, thereby providing pattern flexibility. The heads are typically configured in sewing element pairs, each needle head with a corresponding similarly modular looper head. While the heads of each pair can be individually turned on or off, they are typically turned on and off together, either simultaneously or at different phases in their cycles, as may be most desirable. Alternatively, only the needle heads may be provided with selective drive linkages, while the looper heads may be linked to the output of a drive motor so as to run continuously. This linkage may be direct and permanent, or may be adjustable, switchable or capable of being phased in relation to the needle drive, such as by providing a differential drive mechanism in the looper drive train. When direct drive is employed, the looper head drive may be linked to an input drive shaft through a gear box, rather than a clutch. Each of the looper heads may be further provided with an alignment disk on the looper drive shaft to allow precise phase setting of each looper head relative to the other looper heads or the needle drive when the looper head is installed in the machine. Further, each looper head housing may be provided with adjustments in two dimensions in a plane perpendicular to the needle to facilitate alignment of the looper head with a corresponding needle head upon looper head installation.

As described above, in order to reduce the likelihood of missed stitches, particularly at startup of a pattern following the cutting of the looper thread, a split-start control method is provided for avoiding missed stitches at startup. The split start feature is one use of a feature that allows the needle and looper drives to be decoupled and moved separately. With the split-start feature, the initial motion of the needle and looper proceed separately upon startup so as to render the pickup of the stitches predictable. This is achieved by insuring that the looper picks up, that is passes through, a top-thread loop before the needle picks up or passes through a bottom thread loop triangle.

With a split-start method, with the mechanism stopped with the needle in top-dead-center position in its cycle with the looper extended, and with the needles and loopers locked and in phase, the elements are unlocked and the looper can be advanced in its cycle. The advance can be, for example, 180 degrees to the looper's retracted position or by some lesser amount that is enough to insure that the looper thread triangle is not in the path of the needle. Fifteen degrees to twenty degrees, for example 17 degrees, can be sufficient. Then the needle can be advanced a like amount to bring it in phase with the looper, insuring that the needle will miss the looper thread triangle or loop in the looper thread on its first penetration of the material for a pattern. Then the elements are relocked. Upon further advancing of the elements, the looper will thereupon pick up the needle thread loop before a looper thread loop is picked up by the needle.

In accordance with certain principles of the present invention, a split start may be executed using a single drive servo for the needles and loopers. A phase shifting mechanism is provided to accomplish this with both needles and loopers being driven from the same motor. Further, in accordance with other principles of the invention, the phase of the loopers may be advanced relative to that of the needles, then the loopers and needles may be moved together while maintaining the phase difference between them, then the loopers and needles may be brought back into phase by retracting the loopers, for example, or by slowing or stopping the loopers relative to the needles while the needles catch up, from which point the cycle can continue with the needles and loopers in phase.

Where, as illustrated, a multi-needle quilting machine 10 includes two moveable and independently operable bridges 21 and 22, each having thereon a plurality of separately controllable needle heads 25 and a corresponding plurality of looper heads 26, the speed of the needle heads 25 may be controlled by a controller controlling the operation of a needle drive servo 67 that drives a common needle drive shaft 32 on the bridge 21. Similarly, the speed of the looper heads 26 may be controlled by the controller controlling the operation of a looper drive servo 69 on the bridge 21, that drives the common looper belt drive systems 37 on one of the bridges. The sewing heads 25, 26 on different bridges 21, 22 can be driven at different rates by different operation of the two servos 67 and the two servos 69 on the respective bridges. The needle heads 25 and looper heads 26 on the same bridges 21, 22, however, are usually run at the same speed and in synchronism to cooperate in the formation of stitches, although these may be phased slightly with respect to each other for proper loop take-up, needle deflection compensation, or other purposes.

Certain embodiments are provided with separate drive servos for the needle head assemblies 25 and the looper head assemblies 26 for each respective bridge. In particular, each bridge includes a needle drive servo 67, separately controllable by a signal from the controller 19 which drives shaft 32, which, in turn, drives all of the needle head assemblies 25 on the respective bridge, with each needle head assembly 25 being selectively engageable through a clutch 100, also operated by signals from the controller 19. Also, each bridge further includes a looper drive servo 69, also separately controllable by a signal from the controller 19, which drives a belt 37, which, in turn, drives all of the looper head assemblies 26 on the respective bridge, with each looper head assembly 26 being selectively engageable through a similar clutch 210, also operated by signals from the controller 19. The separate drives 67 and 69 can be controlled separately to facilitate the split-start feature, as well as needle deflection compensation, or for other control refinements. With the split-start feature using the separate drives 67 and 69, at startup when starting a pattern after a thread cut, the loopers can be advanced with the needles held at top dead center, then the needles operated through a similar portion of a cycle, wherein the needle will miss the triangle or loop in the looper thread upon its descent. Then the needle and looper are resynchronized and driven together, whereupon the looper will pick up the needle thread in the next cycle.

According to one embodiment, the needle and looper drives can be decoupled when at the starting position of FIG. 5P, which is similar to that of FIG. 5L, and the needle can be held in its top dead center position. The looper drive is then advanced one-half cycle, to move the looper 216 to the position illustrated in FIG. 5Q, thereby retracting the looper 216 out of the path of the needle 132. Then the looper drive is held in its half cycle position while the needle drive is activated to lower the needle 132 to its half cycle position, which leaves the needle 132 clear of the bottom thread 224, as illustrated in FIG. 5R. Then the needle and looper drives are again coupled together and advanced together in synchronization, whereupon the looper 216 begins to take up the needle loop in approximately the three-quarter position of the stitch cycle, as illustrated in FIG. 5S, and proceeds from there to the full cycle position as illustrated in FIG. 5T. Then the elements continue to move through the next cycle, where the formation of stitches can be seen, as illustrated in FIGS. 5U through 5X.

In FIG. 6H, an end portion or tongue 49 of a bridge 21 or 22 is illustrated in which the needle drive motor 67 is linked to drive both the needle head assemblies 25 and looper head assemblies 26 of the same bridge. The servo 67 directly drives the output shaft 32, which is the needle drive input shaft for that bridge. The shaft 32, in turn, drives a cog belt 32a that drives a looper drive input shaft 37a, which takes the place of the looper drive belt 37 in previously described embodiments. With this embodiment, needles 132 and loopers 216 are driven together, and are not separately controlled or phased. Because the stitching elements are mechanically linked, power failures and other malfunctions are less likely to result in mechanical damage to the machine. Nonetheless, the ability to separately control needle and looper heads can be reinstated by retaining the looper drive servo 69 while linking its output to the shaft 37a through a differential drive or phase shifter 69a, which can be added between the belt drive 32a and the looper drive shaft 37a.

Figure 6J:
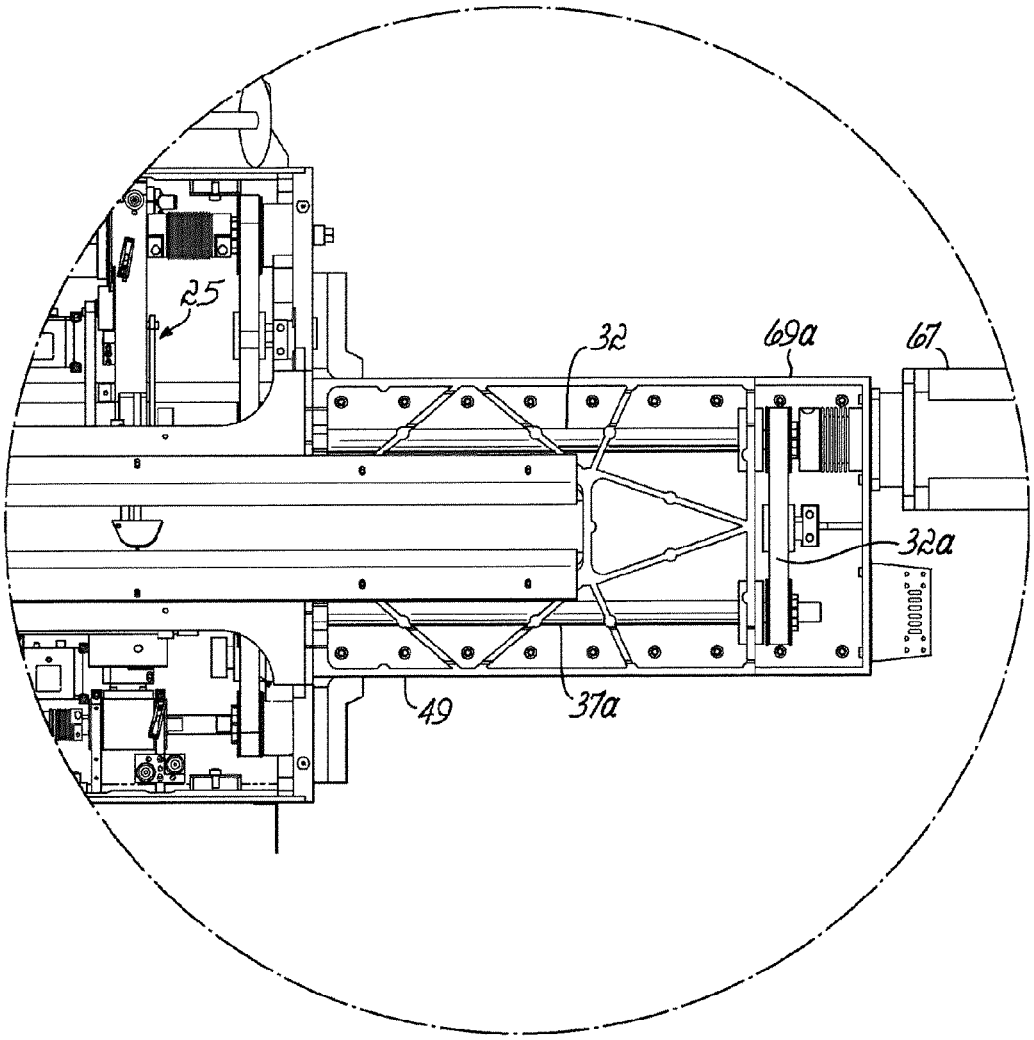
FIG. 6J is a top view of a bridge with a differential drive according to certain embodiments of the invention.
Figure 6K:
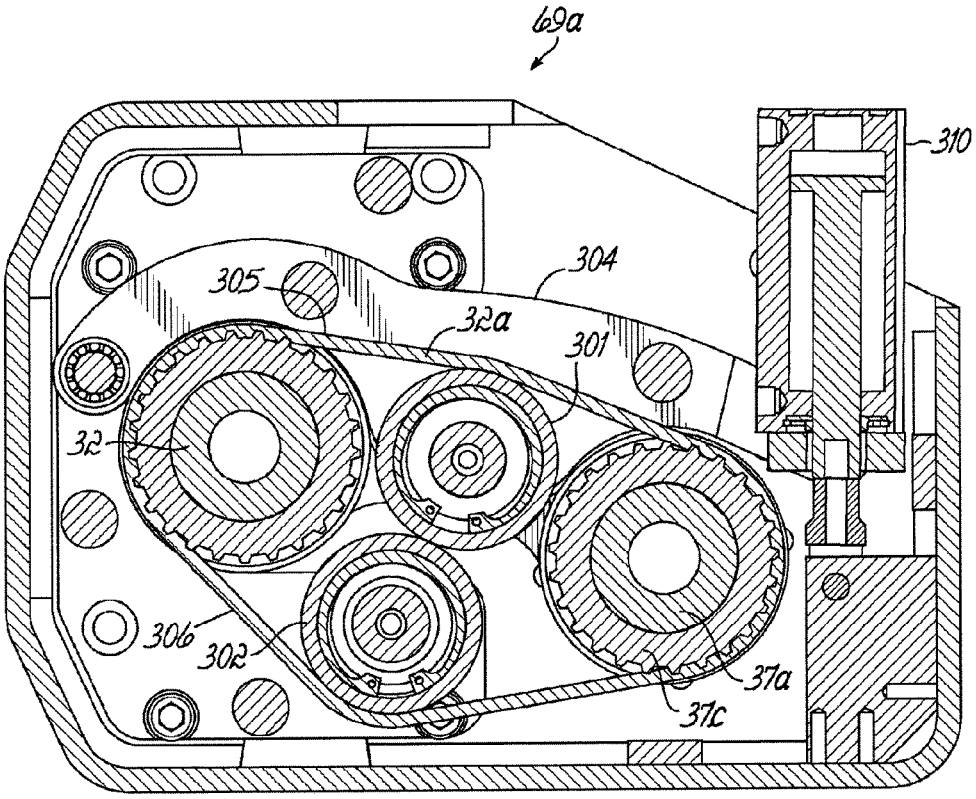
FIG. 6K is a cross-sectional view through a portion of FIG. 6J showing needles and loopers in phase.
Figure 6L:
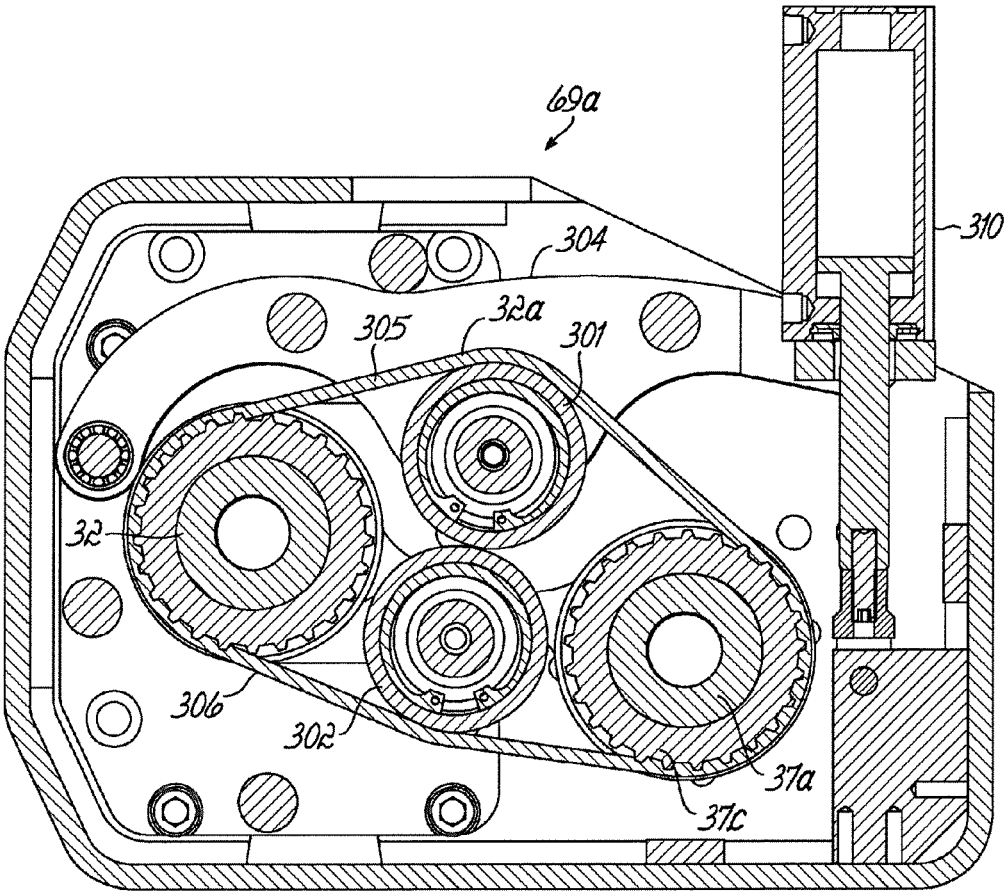
FIG. 6L is a cross-sectional view similar to FIG. 6K showing needles and loopers in phase out of phase for a split-start.
Figure 6M:
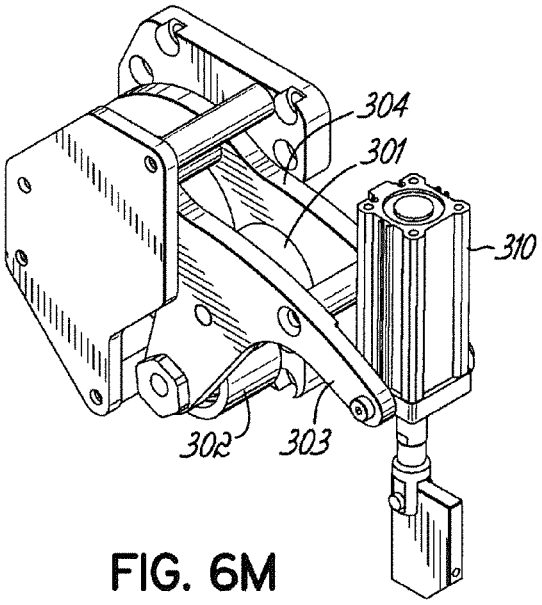
FIG. 6M is a disassembled perspective view showing a phase shifter differential drive component in detail.

In FIGS. 6J-6M, in which FIG. 6J is a top view of a bridge 21 with the differential drive 69a included, servo motor 67 directly drives the shaft 32 to operate the needle heads 25. The differential drive 69a includes a transfer drive belt 32a connected between the needle drive shaft 32 and the input shaft 37a of the looper drive belt assembly 37 which drives the looper heads 26. FIG. 6K, which is a cross-sectional view through the phase shifter 69a, shows the shifter 69a in its default condition in which the shafts 32 and 37a are synchronized to drive the needle heads 25 and looper heads 26 in phase. The phase shifter 69a is shown in detail in FIG. 6M.

A pair of idler pulleys 301 and 302 is mounted between a pair of idler plates 303 and 304 to spread the loop of the belt 32a, to locate less slack in the belt 32a on the higher tension side 305 of a drive pulley 37c on the looper drive shaft 37a than on the low tension side 306. A pneumatic linear actuator 310 is linked between the housing of the phase shifter 69a and the idler plates 303,304 to pivot the plates when actuated to the position shown in FIG. 6L, which moves the slack in the belt 32a to the high tension side 305 of the pulley 37c, which rotates the looper drive shaft 32a forward, advancing the phase of the looper heads 26 in relation to the needle heads 25. This is configured to advance the looper approximately 25 degrees in its cycle. At the start of a pattern after threads have been cut, with the needles in top dead center, the actuator 310 is actuated to advance the loopers 25 degrees, then the needle and looper are operated through 180 degrees while maintaining the phase shift, then the loopers are resynchronized with the needles by deactuating the actuator 310 and reversing the loopers 25 degrees, whereupon the needles will have descended without picking up the triangle or looper thread loop. Then the needles and loopers are advanced in synch, whereupon the loopers pick up the needle thread loops in the next half cycle.

A number of other motions will achieve the same result. For example, if the actuator 310 is a servo motor, the loopers can be stopped at the advanced phase angle 180 degrees, for example, as the needles are advancing from 155 degrees to 180 degrees, thereby resynchronizing the needles and loopers without reversing the direction of the loopers 26. While a 25 degree phase shift is suitable for some designs of quilting machines, other shifts might be more appropriate for other machine designs. The splitting of the needle and looper drive upon startup, as described, avoids the missing of stitches upon startup. The splitting of the needle and looper drive cycles has other uses, such as in facilitating thread trimming. The use of the split-start feature can eliminate the need for the thread deflectors 430 shown in FIG. 5Y. The illustrated phase shifting actuator provides a simple and reliable device, which operates to switch the phase relationship of the loopers between an in-phase setting and a setting at which the loopers are a fixed portion of a cycle ahead of the needles. Use of a variable differential drive or separate servo motors for needles and loopers would provide increasing degrees of flexibility in phasing the loopers relative to the needles, and would allow moving both elements simultaneously at different speeds through their cycles.

The split-start feature may be combined in different ways with other features when starting to sew a pattern. The wipe cycle, described in connection with FIGS. 5H-5J is one of them. After jumping to the starting point of a new pattern or pattern element, the needle thread tails are lying on the face of the material, extending from the needles through the holes in the pressure foot plates along the fabric. The wipe cycle is a way to remove these tails by pulling them to the backside of the material. The machine can be made to operate in alternative modes that either employ or omit such a wipe cycle. Where product quality is preferred, the wipe cycle is used to totally remove the needle thread tails from the face of the product. This can increase the quilting time of from 2 to 20 percent, depending on the pattern and the configuration of the machine. Alternatively, a high speed, lower quality mode can be provided for customers or products that can tolerate some thread tails. To reduce quilting time, split start motions can be carried in part while the bridges or web are advancing between patterns.

With the wipe cycle used in combination with a split-start, a split start should be carried out after the wipe cycle. However, an execution of a split-start cycle before a wipe cycle can increase the reliability and predictability of the wipe cycle, but such a wipe cycle should still be followed by a further split-start cycle, since the effect of the first split-start cycle on the thread positions at the beginning the stitch sequence is undone by the wipe cycle. The result of the combination of split-start and wipe cycles is that two cycles of the stitching elements reliably form the first stitch of a sequence without a visible top-thread tail.

The first stitch is usually the first stitch of a beginning tack stitch sequence, which may be an intermittent stitch sequence as described above. Such intermittent tack stitches include strings of stitches usually beginning with one or more long stitches then transitioning through progressively shorter stitches into a series of continuous stitches sewn with a standard sinusoidal needle motion. The preferred tack stitch sequence may differ for different quilted products. The difference may be in the number of stitches in the tack sequence as well as in the combination of different stitches that make up a particular tack stitch sequence. For example, stiffer or thicker quilted products may call for a different tack stitch sequence than more flexible or thinner quilted products. The type of tack stitch to be applied to a particular product may be applied by the controller in response to information stored in the product database. Data in the product database may directly specify the tack stitch needed or the controller may apply a lookup scheme or algorithm to derive or otherwise determine the tack stitch sequence for which the particular product calls.

The product database may also contain other product-based parameters. In addition to the tack stitch sequence, for example, the desired wipe cycle path or distance may differ from product to product, and the controller may base the wipe cycle to be executed on data read from or derived from the product record. The product records in the product database typically include the identification of the pattern to be quilted, the material combination that will make up the material web, and the size of the panels. To this information may be added, or from this information may be derived, the product-based features set forth above and below.

Another product-based parameter may include the positioning of the thread for thread trimming at the end of a pattern. For example, to make it easier to contact the threads with the thread cutter blade and to clamp the looper thread at the end of a pattern, a bridge movement may be executed that moves the bridges in a particular direction relative to the stitching elements. Such a movement may, for example, move the bridges up a predetermined distance. This movement would pull the stitch hole down relative to the needle plate and position the threads against a particular spot on the lower edge of the needle hole in the needle plate. These threads would extend directly from this spot to the looper, making their location predictable and making the proper contact of the threads with the cutting element reliable. The amount of bridge motion desired to accomplish this may depend on the product being quilted. For example, a bridge movement of a greater distance is required with thicker material than with thinner material to position the thread in the best position for cutting. Such distance can be read or derived from data in the product database.

Another product-based feature is one that modifies thread pull-off so as to prevent the needle thread from being pulled from the needle under certain conditions. With some materials, for example thin materials, the material does not provide enough friction on the thread tail to insure that needle thread is pulled from the needle thread supply spool upon startup. Therefore, for products formed of such material, extra bridge motion is added to the thread pull-off. This leaves additional needle thread slack at the needle, reducing the drag caused by the needle thread spool on the needle thread. The addition of this extra bridge movement is added based on data read from or derived from the product database.

The sewing of extra stitch lines to provide material stability is also a product-based feature that can be read from or derived front the product database. For example, a series of stitches, referred to herein as a "stabilization line", may be helpful on certain types of tack-and-jump products that might carry one of the sewing head pairs off one side of the material. Such a stabilization line would be sewn along an edge of the material for patterns in which the sewing heads might move off that edge. The stitch line would guard against head catching or snagging the edge of one or more material layers as the head moves back onto the material.

For example, the need to sew a stabilization line can arise where a web is registered to the left side of the machine (facing downstream from the front). In this case, the leftmost head of a bridge will move close to, but not off of, the left edge of the material as the bridge shifts transversely. The rightmost head can, however, move off the right edge of the material when the bridge shifts to the right. After doing so, when the bridge returns to the left, the heads that moved off the material can snag the material. The sewing of a stabilization line longitudinally along the right edge of the web to join the loose layers of material together can avoid the snagging of the material. The line of stitches along the right edge of the web holds the layers together so the top layer or layers of material aren't free to be caught by the returning head.

This feature is only needed on certain types of patterns, namely tack and jump pattern arrays in which the heads move transversely off the edge of the web when the head is not sewing. The feature is product based, and involves sewing pattern logic that adds the longitudinal stabilization line to be sewn when the web is advancing downstream relative to the bridges, including when the bridges are descending on the frame and moving upstream relative to the web, and the pattern is one that takes the rightmost head or heads off the edge of the machine. The stabilization line sewing feature is normally turned off, but is automatically enabled from the product database for products needing the stabilization line.

When the stabilization line feature is on, whenever the bottom-most or upstream bridge is moving below or upstream of the leading end of the sewn stabilization line or the sewn pattern, which is usually when the web is moving up relative to the bridge in the illustrated embodiments, a head at the right end of the bridge is caused by the controller to sew the stabilization line along the right edge of the web. The line can be sewn between pattern components and from the end of the last pattern until the bridges and material are repositioned to the next pattern zero.

Those skilled in the art will appreciate that the application of the present invention herein is varied, that the invention is described in preferred embodiments, and that additions and modifications can be made without departing from the principles of the invention.

The following is claimed:

1. A method of operating a quilting machine having at least one stitching element pair that each includes a needle and a looper, to control needle thread tails on the needle side of a chain stitch quilted material having a needle side and a looper side, the method comprising:

with a needle at a starting point on the material and in a retracted position spaced from the needle side of the material and a needle thread tail extending from each needle entirely on the needle side of the material, initiating a thread tail wipe cycle by operating a programmed controller to reciprocate the needle through a stitch cycle and back to the retracted position to poke the needle thread through the material to the looper side of the material at the starting point on the material; then further operating the controller to advance a looper through a loop in the needle thread so that the needle thread extends from the needle and around the looper on the looper side of the material, then through the material with the needle thread tail remaining on the needle side of the material; then with the tension applied to the needle thread, further operating the controller to impart relative movement between the needle and the material, in a path from and back toward the starting point, in a direction parallel to the material a distance sufficient to pull the needle thread until the needle thread tail is pulled to the looper side of the material; then with the thread tail on the looper side of the material, operating the controller to drive the stitching element pair to sew a chain stitch sequence in the material.

2. The method of claim 1 further comprising:

operating the controller to drive the stitching element pair to sew a tack stitch sequence at the end of the chain stitch sequence and then to move the needle to the retracted position; then operating the controller to activate a thread trimming mechanism on the looper side of the material to trim both the needle thread and a looper thread and producing a needle thread tail on the looper side of the material;

with the tension applied to the needle thread, further operating the controller to impart relative movement between the needle and the material in a direction parallel to the material to position the needle at a second starting point on the material and to pull the needle thread until the needle thread tail is pulled out of the material to the needle side of the material; then with a needle at the second starting point on the material and in a retracted position spaced from the needle side of the material and a needle thread tail extending from each needle entirely on the needle side of the material, initiating a thread tail wipe cycle by operating a programmed controller to reciprocate the needle through a stitch cycle and back to the retracted position to poke the needle thread through the material to the looper side of the material at a starting point on the material; then further operating the controller to advance a looper through a loop in the needle thread so that the needle thread extends from the needle and around the looper on the looper side of the material, then through the material with the needle thread tail remaining on the needle side of the material; then with the tension applied to the needle thread, further operating the controller to impart relative movement between the needle and the material, in a path from and back toward the second starting point, in a direction parallel to the material a distance sufficient to pull the needle thread until the needle thread tail is pulled to the looper side of the material; then with the thread tail on the looper side of the material, operating the controller to drive the stitching element pair to sew a second chain stitch sequence in the material.

3. The method of claim 2 wherein the quilting machine is a multi-needle quilting machine having a plurality of stitching element pairs each that include a needle and a looper, wherein:

the initiating of the thread tail wipe cycles is performed with each of a plurality of needles at respective starting points and in retracted positions spaced from the needle side of the material with each needle having a needle thread tail extending from the needle on the needle side of the material, by operating the programmed controller to reciprocate the needles simultaneously through a stitch cycle and back to the retracted position to poke the needle threads through the material to the looper side of the material at the respective starting points on the material;

the further operating of the controller to advance the looper includes operating the controller to advance each of a plurality of loopers through loops in respective needle threads so that the needle threads extend from the needles and around the loopers on the looper side of the material, then through the material with the needle thread tails remaining on the needle side of the material;

the further operating of the controller to impart relative movement includes further operating the controller, with tension applied to the needle threads, to impart relative movement between each of the needles and the material, in paths from and back toward the respective starting points, in a direction parallel to the material a distance sufficient to pull the needle threads until the needle thread tails are pulled to the looper side of the material; and the operating of the controller to drive the stitching element pair includes operating the controller, with the thread tails on the looper side of the material, to drive each of the stitching element pairs to sew a respective one of a plurality of chain stitch sequences in the material.

4. The method of claim 1 wherein the quilting machine is a multi-needle quilting machine having a plurality of stitching element pairs each that include a needle and a looper, wherein:

the initiating of the thread tail wipe cycles is performed with each of a plurality of needles at respective starting points and in retracted positions spaced from the needle side of the material with each needle having a needle thread tail extending from the needle on the needle side of the material, by operating the programmed controller to reciprocate the needles simultaneously through a stitch cycle and back to the retracted position to poke the needle threads through the material to the looper side of the material at the respective starting points on the material;

the further operating of the controller to advance the looper includes operating the controller to advance each of a plurality of loopers through loops in respective needle threads so that the needle threads extend from the needles and around the loopers on the looper side of the material, then through the material with the needle thread tails remaining on the needle side of the material;

the further operating of the controller to impart relative movement includes further operating the controller, with tension applied to the needle threads, to impart relative movement between each of the needles and the material, in paths from and back toward the respective starting points, in a direction parallel to the material a distance sufficient to pull the needle threads until the needle thread tails are pulled to the looper side of the material; and the operating of the controller to drive the stitching element pair includes operating the controller, with the thread tails on the looper side of the material, to drive each of the stitching element pairs to sew a respective one of a plurality of chain stitch sequences in the material.

5. The method of claim 1 wherein:

the path is a line, an arc, a triangle or some other combination of lines and arcs.

6. The method of claim 1 wherein:

the movement is imparted by moving of the needles relative to the material and holding the material stationary relative to the machine.

7. The method of claim 1 further comprising:

following the stitching of the patterns, operating the plurality of stitching element pairs to sew tack stitch sequences; then with the [top] *needle* threads extending from [top] *needle*-thread supply spools through [top] *needle*-thread tensioners through the needles and into the material, releasing tension on the [top] *needle* threads and pulling off slack in the [top] *needle* threads between the supplies and the needles; then imparting relative movement between the needles and the material that is sufficient to pull the slack in the [top] *needle* threads through the each needle to add thread tails between the needles and the material; then cutting the [top] *needle* threads on the looper side of the material to create [top] *needle*-thread tails extending from the needle through the material to the looper side of the material; then imparting relative movement between the needles and the material that is sufficient to pull the [top] *needle* thread tails from the material to the needle side of the material and locating the needles at new starting locations relative to the material; then with each of a plurality of needles at the new starting locations and in retracted positions spaced from the needle side of the material with the needle thread tails extending from the needles on the needle side of the material, reciprocating the needles through a stitch cycle and back to the retracted positions to poke the needle threads through the material to below the material around respective loopers with ends of the thread tails remaining on the needle side of the material; then with the tension applied to the needle threads, imparting relative movement between the needles and the material by a distance sufficient to pull the needle threads until the needle thread tails are pulled to the looper side of the material but insufficient to pull the needle thread tails out of the material.

8. The method of claim 1 wherein the imparting of the relative movement between the needles and the material proceeds along a path that is dependent on and differs in accordance with different patterns or quilted material properties.

9. The method of claim 1 wherein the imparting of the relative movement between the needles and the material proceeds along a path that is dependent on and differs in accordance with different patterns or quilted material properties.

10. A method of operating a multi-needle quilting machine having a plurality of stitching element pairs each that include a needle and a looper, to control needle thread tails on the needle side of a chain stitch quilted material having a needle side and a looper side, the method comprising:

with each of a plurality of needles in retracted positions spaced from the needle side of the material to be quilted and with a needle thread tail extending from each needle on the needle side of the material, reciprocating the needles through a first stitch cycle and back to the retracted positions to poke the needle threads through the material to the looper side of the material where each needle thread has a loop that is entered by a looper of the respective stitching element pair while ends of the thread tails remain on the needle side of the material; then with the tension applied to the needle threads, pulling the needle threads until the ends of the needle thread tails are pulled to the looper side of the material; then with the needle thread tails *pulled* to the [needle] *looper* side of the material, operating the plurality of stitching element pairs to sew a plurality of chain stitch sequences in the material.

11. The method of claim 10 further comprising:

providing an option, selectable by a user of a quilting machine, for enabling or disabling the method so as to either reduce or eliminate needle thread tails with the method enabled, or alternatively to provide higher speed machine operation with the method disabled.

12. The method of claim 10 further comprising:

cutting the [top] *needle* threads with a plurality of thread trimming devices, each including a thread trimming mechanism situated one at each looper so as to be operable, when actuated, to cut a looper thread and the needle thread.

13. A multi-needle quilting machine comprising:

a frame;

a plurality of chain stitching element pairs, each pair including a needle mounted to reciprocate through quilting material from the front side of a quilting material plane and a cooperating looper mounted to oscillate with respect to the needle on the back side of the quilting material plane to form chain stitches with a needle thread extending through the needle and a looper thread extending through the looper;

a motion system operative to move the material longitudinally relative to the frame *in the quilting material plane,* and to impart relative transverse movement between the stitching element pairs and the material;

a plurality of thread trimming devices, each including a thread trimming mechanism situated one at each [looper] *chain stitching element pair* so as to be operable, when actuated, to cut a [looper] *needle* thread; [and]

a programmed controller operative to control the stitching element pairs, the motion system and the thread trimming devices*, the controller being programmed to operate the thread trimming devices, the chain-stitching element pairs, and the motion system to:*

*cut needle threads extending from a plurality of needles; then*

*pull thread tails of the cut needle threads to a needle side of the material on the front side of the quilting material plane; then*

*poke a plurality of the cut needle threads through the material to a looper side of the material on the back side of the quilting material plane while the thread tails thereof remain on the needle side of the material, then*

*move needles relative to the material to pull, from the needle side of the material, tails of the cut needle threads extending therefrom, then*

*sew chain stitch sequences with the plurality of cut needle threads.*

14. The quilting machine of claim 13 wherein:

the controller is programmed to [perform a thread tail wipe cycle] *pull the thread tails* by initiating the wipe cycle with [each of a plurality of] needles in retracted positions spaced from the needle side of the material and with a needle thread tail extending from each needle on the needle side of the material and operating the stitching element pairs to reciprocate the needles through a first stitch cycle and back to the retracted positions to poke the needle threads through the material to the looper side of the material where each needle thread has a loop that is entered by a looper of the respective stitching element pair while ends of the thread tails remain on the needle side of the material, [then with tension applied to the needle threads,] imparting relative movement of the needles parallel to the material to pull the needle threads until the ends of the needle thread tails are pulled [to the looper] *from the needle* side of the material, then [with the needle thread tails to the needle side of the material,] operating the plurality of stitching element pairs to sew a plurality of chain stitch sequences in the material.

15. The quilting machine of claim 13 wherein:

each thread trimming mechanism is situated at a looper so as to be operable, when actuated, to cut both the needle thread and the looper thread extending from the material.

16. The quilting machine of claim 15 further comprising:

a plurality of thread tail wipers on the front side of the *quilting* material *plane*, one proximate the needle at each stitching element pair, that activates to pull the needle thread tail from the material to the [front] *needle* side thereof when the needle thread is cut.

17. The quilting machine of claim 13 wherein:

the trimming mechanisms are selectively operable, when actuated, to selectively cut individual [looper] *needle* threads.

18. The quilting machine of claim 13 wherein:

each thread trimming mechanism is operable, when actuated, *to cut a looper thread and* to clamp the end of the cut looper thread extending from the looper.

19. The quilting machine of claim 13 wherein:

each thread trimming device includes linkage for moving the thread trimming mechanism thereof between a thread cutting position adjacent the looper and a rest position remote from the looper.

20. The quilting machine of claim 13 wherein:

each thread trimming mechanism is situated at a looper so as to be operable, when actuated, to cut both the needle thread and the looper thread extending from the material;

the trimming mechanisms are selectively operable, when actuated, to selectively cut individual *needle and* looper threads;

each thread trimming mechanism is operable, when actuated, to clamp the end of the cut looper thread extending from the looper; and each thread trimming device includes linkage for moving the thread trimming mechanism thereof between a thread cutting position adjacent the looper and a rest position remote from the looper.

*21. A method of operating a quilting machine having at least one pair of stitching elements that each includes a needle and a looper, to control needle thread tails on the needle side of a chain stitch quilted material having a needle side and a looper side, the method comprising:*

*with a needle at a starting point on the material and in a retracted position spaced from the needle side of the material and a needle thread tail extending from each needle entirely on the needle side of the material, performing a thread tail wipe cycle by:*

*operating a programmed controller to reciprocate the needle to poke the needle thread through the material to the looper side of the material at the starting point on the material; and*

*further operating a programmed controller to advance a looper through a loop in the poked needle thread at the starting point on the looper side of the material so that the needle thread extends from the needle and around the looper on the looper side of the material and then through the material with the needle thread tail remaining on the needle side of the material; then*

*with tension applied to the needle thread, further operating the controller to impart relative movement between a stitching element and the material, in a path from and back toward the starting point, a distance sufficient to pull the needle thread until the needle thread tail is pulled from the needle side of the material; then*

*operating the controller to drive the pair of stitching elements to sew a chain stitch sequence in the material.*

*22. The method of claim 21 wherein:*

*the path is a line, an arc, a triangle or some other combination of lines and arcs.*

*23. The method of claim 21 wherein:*

*the movement is imparted by moving of a stitching element relative to the material and holding the material stationary relative to the machine.*

*24. The method of claim 21 further comprising:*

*operating the controller to drive the pair of stitching elements to sew a tack stitch sequence at the end of the chain stitch sequence and then to move the needle to the retracted position; then*

*operating the controller to activate a thread trimming mechanism on the looper side of the material to trim at least the needle thread and produce a needle thread tail on the looper side of the material;*

*further operating the controller to impart relative movement between the needle and the material in a direction parallel to the material to position the needle at a second starting point on the material and to pull the needle thread until the needle thread tail is pulled out of the material to the needle side of the material; then*

*with a needle at the second starting point on the material and in a retracted position spaced from the needle side of the material and a needle thread tail extending from each needle entirely on the needle side of the material, initiating a thread tail wipe cycle by operating a programmed controller to reciprocate the needle to poke the needle thread through the material to the looper side of the material at the starting point on the material;*

*further operating a programmed controller to advance a looper through a loop in the poked needle thread at the starting point on the looper side of the material so that the needle thread extends from the needle and around the looper on the looper side of the material and then through the material with the needle thread tail remaining on the needle side of the material; then*

*with tension applied to the needle thread, further operating the controller to impart relative movement between a stitching element and the material, in a path from and back toward the starting point, a distance sufficient to pull the needle thread until the needle thread tail is pulled from the needle side of the material; then*

*operating the controller to drive the pair of stitching elements to sew a second chain stitch sequence in the material.*

*25. The method of claim 24 wherein the quilting machine is a multi-needle quilting machine having a plurality pairs of stitching elements that each include a needle and a looper, wherein:*

*each initiating of a thread tail wipe cycle is performed with each of a plurality of needles at respective starting points and in retracted positions spaced from the needle side of the material with each needle having a needle thread tail extending from the needle on the needle side of the material, by operating the programmed controller:*

*to reciprocate the needles simultaneously through the material and back to the needle side of the material to poke the needle threads through the material to the looper side of the material at the respective starting points on the material,*

*to advance each of a plurality of loopers through loops in respective needle threads on the looper side of the material so that the needle threads extend from the needles and around the loopers and then through the material with the needle thread tails remaining on the needle side of the material, and*

*to impart relative movement between each of the material and a stitching elements, in paths from and back toward the respective starting points, a distance sufficient to pull the needle threads until the needle thread tails are pulled from the needle side of the material; and*

*the operating of the controller to drive the pair of stitching elements includes operating the controller, with the thread tails on the looper side of the material, to drive each of the pairs of stitching elements to sew a respective one of a plurality of chain stitch sequences in the material.*

*26. The method of claim 21 wherein the quilting machine is a multi-needle quilting machine having a plurality of pairs of stitching elements that each includes a needle and a looper, wherein:*

*each of the thread tail wipe cycles is performed with each of a plurality of needles at respective starting points and in retracted positions spaced from the needle side of the material with each needle having a needle thread tail extending from the needle on the needle side of the material, by:*

*operating the programmed controller to reciprocate the needles simultaneously through the material and back to the needle side of the material to poke the needle threads through the material to the looper side of the material at the respective starting points on the material, and*

*further operating of the controller to advance each of a plurality of loopers through loops in respective needle threads so that the needle threads extend from the needles and around the loopers on the looper side of the material, then through the material with the needle thread tails remaining on the needle side of the material, then*

*further operating the controller to impart relative movement between each of the needles and the material, in paths from and back toward the respective starting points, a distance sufficient to pull the needle threads until the needle thread tails are pulled from the needle side of the material; and*

*the operating of the controller to drive the pair of stitching elements includes operating the controller to drive each of the pairs of stitching elements to sew a respective one of a plurality of chain stitch sequences in the material.*

*27. The method of claim 26 further comprising:*

*following the stitching of the patterns, operating the plurality of pairs of stitching element to sew tack stitch sequences; then*

*with the needle threads extending from needle-thread supply spools through needle-thread tensioners, through the needles and into the material, releasing tension on the needle threads and pulling off slack in the needle threads between the supplies and the needles; then*

*with tension applied to the needle threads, imparting between the material and the needles relative movement that is sufficient to pull the slack in the needle threads through each needle to add thread tails between the needles and the material; then*

*cutting the needle threads on the looper side of the material to create needle-thread tails extending from the needle through the material to the looper side of the material; then*

*pulling needle threads to pull the needle thread tails from the material to the needle side of the material and locating the needles at new starting locations relative to the material.*

*28. The method of claim 26 wherein the imparting of the relative movement between the stitching elements and the*

*material proceeds along a path that is dependent on and differs in accordance with different patterns or quilted material properties.*

*29. The method of claim 21 wherein the imparting of the relative movement between the stitching element and the material proceeds along a path that is dependent on and differs in accordance with different patterns or quilted material properties.*

*30. A method of operating a multi-needle quilting machine having a plurality of pairs of stitching elements including a needle and a looper, to control needle thread tails on the needle side of a chain stitch quilted material having a needle side and a looper side, the method comprising:*

*with each of a plurality of needles in retracted positions spaced from the needle side of the material and with a needle thread tail extending from each needle on the needle side of the material, reciprocating the needles through the material to the looper side and back to needle side to poke the needle threads through the material to the looper side of the material; and*

*hooking the loops on the looper side of the material while ends of the thread tails remain on the needle side of the material; then*

*imparting relative movement between the material and the needles or loopers or both to pull the needle threads until the ends of the needle thread tails are pulled from the needle side of the material; then*

*with the needle thread tails pulled from the needle side of the material, operating the plurality of pairs of stitching elements to sew a plurality of chain stitch sequences in the material.*

*31. The method of claim 30 further comprising:*

*providing an option, selectable by a user of the quilting machine, to either reduce or eliminate needle thread tails steps of the method enabled, or alternatively to provide higher speed machine operation with step of pulling the needle threads disabled.*

*32. The method of claim 30 further comprising:*

*after sewing the chain stitch sequences in the material, cutting the needle threads on the looper side of the material and pulling the thread tails to the needle side of the material.*

*33. A multi-needle quilting machine comprising:*

*a plurality of pairs of chain stitching elements, each pair including a needle mounted to reciprocate through quilting material from the front side of a quilting material plane and a cooperating looper mounted to oscillate with respect to the needle on the back side of the quilting material plane to form chain stitches with a needle thread extending through the needle and a looper thread extending through the looper;*

*a motion system operative to impart relative movement between the pairs of stitching elements and the material;*

*a thread trimming mechanism operable, when actuated, to cut needle threads from the material;*

*a control system operative to control the pairs of stitching elements, the motion system and the thread trimming mechanism;*

*the control system being programmed, with each of a plurality of the needles spaced from the needle side of the material with a needle thread tail extending from each needle on the needle side of the material, to:*

*reciprocate the needles through the material and back to the needle side of the material to poke needle threads through the material to the looper side of the material, and*

*engage a loop in each of the needle threads on the looper side of the material while ends of the thread tails remain on the needle side of the material, then*

*with tension applied to the needle threads, impart movement between stitching elements and the material to pull needle threads until the ends of the needle thread tails are pulled from the needle side of the material, then,*

*with the needle thread tails pulled from the needle side of the material, operating the motion system and the plurality of pairs of stitching element to sew a plurality of chain stitch sequences in the material.*

*34. The quilting machine of claim 33 the control system is programmed to:*

*reciprocate the needles through the material and back to the needle side of the material to poke with each a needle thread through the material to the looper side of the material where each needle thread has a loop that is entered by a looper of the respective pair of stitching elements while ends of the thread tails remain on the needle side of the material, then with tension applied to the needle threads, imparting relative movement of the needles parallel to the material to pull the needle threads until the ends of the needle thread tails are pulled to the looper side of the material, then with the needle thread tails pulled to the looper side of the material, operating the plurality of pairs of stitching element to sew a plurality of chain stitch sequences in the material.*

*35. A method of positioning thread tails in a multi-needle quilting machine comprising:*

*with each of a plurality of needles in a retracted position spaced from a material to be sewn and with a needle-thread tail extending from each needle on a needle side of the material, operating the needles in a stitching cycle to poke the needle-threads through the material to form a loop in each needle thread on a looper side of the material opposite the needle side where the it is caught by a looper; then*

*executing a thread pulling motion to pull the needle-thread tail from the needle side of the material but insufficient to pull the needle-thread tail out of the material; then*

*resuming operation of the needles in a series of stitching cycles to stitch chain-stitch sequences in the material.*

*36. The method of claim 35 wherein:*

*the executing of the thread pulling motion includes imparting relative movement between the needles and the material in a path parallel to the material to pull the needle thread tails from the needle side of the material.*

*37. The method of claim 35 wherein:*

*the path is a line, an arc, a triangle or some other combination of lines and arcs.*

*38. The method of claim 35 wherein:*

*the imparting of relative movement includes holding the material stationary and moving the needles relative to the stationary material.*

*39. The method of claim 35 wherein:*

*after stitching the chain stitch sequences, with the needle threads each extending from a needle side supply and through a needle-thread tensioner to the needle, releasing tension on the needle threads and pulling off slack in the needle thread between the supply and the needle; then*

*moving the needles a short distance relative to the material that is sufficient to pull the slack in the needle threads through the needles to add a length of thread tail between the needle and the material; and then*

*cutting the needle threads on the looper side of the material to create the needle-thread tails extending from the needles through the material to the looper side of the material.*

*40. The method of claim 39 further comprising:*

*with the needle-thread tails extending from the needles through the material to the looper side of the material and with the tension applied to the needle threads, moving the needles relative to the material a distance sufficient to pull the needle-thread tails to the needle side of the material.*

*41. A multi-needle quilting machine comprising:*

*a frame configured to support a multi-layered material in a quilting material plane having a front side and a back side;*

*a plurality of chain stitching element pairs, each pair including a needle mounted to reciprocate through quilting material from the front side of a quilting material plane and a cooperating looper mounted to oscillate with respect to the needle on the back side of the quilting material plane to form chain stitches with a needle thread extending through the needle and a looper thread extending through the looper;*

*a motion system operative to move the material longitudinally relative to the frame in the quilting material plane and to impart relative movement between the stitching element pairs and the material in directions parallel to the plane;*

*a plurality of thread trimming devices, each including a thread trimming mechanism situated one at each looper so as to be operable, when actuated, to cut a needle thread; and*

*a controller operative to control the stitching element pairs, the motion system and the thread trimming devices, the controller being programmed to impart relative movement between the stitching element pairs and the material in directions parallel to the plane along a path that is sufficient to pull tails of the needle-threads from the front side of the material but insufficient to pull the tails of the needle-threads out of the material to the front side thereof.*

*42. The quilting machine of claim 41 wherein:*

*the controller is programmed: (1) to initiate the imparting of the relative movement with each of a plurality of needles in retracted positions spaced from the needle side of the material and with a needle thread tail extending from each needle on the needle side of the material and operating the stitching element pairs to reciprocate the needles through a first stitch cycle and back to the retracted positions to poke the needle threads through the material to the looper side of the material where each needle thread has a loop that is entered by a looper of the respective stitching element pair while ends of the thread tails remain on the needle side of the material, then (2) with tension applied to the needle threads, to impart relative movement of the needles parallel to the material to pull the needle threads until the ends of the needle thread tails are pulled to the looper side of the material, then (3) with the needle thread tails to the needle side of the material, to operate the plurality of stitching element pairs to sew a plurality of chain stitch sequences in the material.*

* * * * *

UNITED STATES PATENT AND TRADEMARK OFFICE

CERTIFICATE OF CORRECTION

PATENT NO. : RE44,885 E
APPLICATION NO. : 13/475412
DATED : May 13, 2014
INVENTOR(S) : Michael A. James et al.

It is certified that error appears in the above-identified patent and that said Letters Patent is hereby corrected as shown below:

Title Page, Column 2

Under heading "Abstract", Line 2, "imparts" should be ---impart---.

In the Specification:

Column 3

Line 51, "have" should be ---has---.

Column 4

Line 43, "formations" should be ---formation---.

Column 9

Line 21, "is driven" should be ---are driven---.

Column 11

Line 15, "proceeding" should be ---proceeds---.

Column 14

Lines 24-25, "with a moving" should be ---with moving---.

Column 16

Line 61, "pervious roll" should be ---previous roll---.

Signed and Sealed this
Sixteenth Day of September, 2014

Michelle K. Lee

Michelle K. Lee
*Deputy Director of the United States Patent and Trademark Office*

Column 18

Line 12, “mounted across on the” should be ---mounted on the---.

Line 35, “are driven” should be ---is driven---.

Column 20

Line 53, “drive assembly” should be ---drive assemblies---.

Line 66, “is not material” should be ---are not material---.

Column 25

Line 40, insert a --,-- after “triangle”.

Column 27

Line 23, “needle near” should be ---needle is near---.

Column 28

Line 29, “spacing the looper” should be ---spacing of the looper---.

Line 33, “improve” should be ---improves---.

Column 30

Line 20, “are carried out” should be ---is carried out---.

Line 63, “bridges 21, 22 are” should be ---bridges 21, 22 is---.

Column 31

Line 5, “two of vertical” should be ---two vertical---.

Line 23, “19 move” should be ---19 to move---.

Line 24, before the word “each”, insert --of--.

Column 32

Line 6, after “center position”, insert --)--.

Line 27, “move with” should be ---moves with---.

Column 36

Line 29, “77 are” should be ---77 is---.

Column 38

Line 51, "applicant's" should be ---applicants'---.

Column 39

Line 17, "patterns 951" should be ---pattern 951---.

Lines 26-27, "patterns 952" should be ---pattern 952---.

Column 40

Line 42, delete the word "sewn".

Line 60, "pattern s550" should be ---patterns 550---.

Line 64, delete the second occurrence of "while sewing".

Column 44

Line 41, "which cause" should be ---which causes---.

Column 45

Line 11, "end of the curves" should be ---ends of the curves---.

Column 49

Line 46, "beginning the stitch" should be ---beginning of the stitch---.

In the Claims:

Column 53

Line 66, delete the word "the" after the word "through".

Column 54

Line 2, "*needle*-thread" should be ---*needle* thread---.

Column 57

Line 45, "*plurality* pairs" should be ---*plurality of pairs*---.

Line 67, "*and a stitching elements*" should be ---*and stitching elements*---.

Column 60

Line 13, "*claim 33 the*" should be ---*claim 33 wherein the*---.

Line 27, "*stitching element*" should be ---*stitching elements*---.

Line 38, "*where the it*" should be ---*where it*---.